(12) United States Patent
Infanger

(10) Patent No.: US 8,768,810 B2
(45) Date of Patent: Jul. 1, 2014

(54) DYNAMIC ASSET ALLOCATION USING STOCHASTIC DYNAMIC PROGRAMMING

(76) Inventor: Gerd Infanger, Palo Alto, CA (US)

(*) Notice: Subject to any disclaimer, the term of this patent is extended or adjusted under 35 U.S.C. 154(b) by 1825 days.

(21) Appl. No.: 11/804,692

(22) Filed: May 18, 2007

(65) Prior Publication Data
US 2008/0010181 A1    Jan. 10, 2008

Related U.S. Application Data

(60) Provisional application No. 60/801,841, filed on May 19, 2006.

(51) Int. Cl.
*G06Q 40/00* (2012.01)
*G06Q 40/06* (2012.01)

(52) U.S. Cl.
CPC ............... *G06Q 40/00* (2013.01); *G06Q 40/06* (2013.01)
USPC .......................................... 705/36 R; 705/35

(58) Field of Classification Search
CPC ............................... G06Q 40/00; G06Q 40/06
USPC ............................................................ 705/36
See application file for complete search history.

(56) References Cited

U.S. PATENT DOCUMENTS

| | | | | |
|---|---|---|---|---|
| 5,774,881 A * | 6/1998 | Friend et al. | ................. | 705/36 R |
| 5,918,217 A * | 6/1999 | Maggioncalda et al. | ... | 705/36 R |
| 6,012,044 A * | 1/2000 | Maggioncalda et al. | ... | 705/36 R |
| 6,055,517 A * | 4/2000 | Friend et al. | ................. | 705/36 R |
| 6,061,662 A * | 5/2000 | Makivic | ....................... | 705/36 R |
| 6,078,904 A * | 6/2000 | Rebane | ......................... | 705/36 R |
| 6,799,167 B1 * | 9/2004 | Gullen et al. | ................ | 705/36 R |
| 7,062,458 B2 * | 6/2006 | Maggioncalda et al. | ... | 705/36 R |
| 7,249,081 B2 * | 7/2007 | Shearer et al. | ............... | 705/36 R |
| 7,310,615 B2 * | 12/2007 | Lewis | ............................... | 705/35 |
| 7,349,878 B1 * | 3/2008 | Makivic | ............................ | 705/37 |
| 7,577,597 B1 * | 8/2009 | Allison et al. | ................... | 705/35 |
| 7,593,880 B2 * | 9/2009 | Chalermkraivuth et al. | ... | 705/36 R |
| 7,596,523 B2 * | 9/2009 | Sobel et al. | ................... | 705/36 R |
| 2002/0038271 A1 * | 3/2002 | Friend et al. | ..................... | 705/36 |
| 2003/0028466 A1 * | 2/2003 | Jenson et al. | .................... | 705/36 |
| 2003/0233301 A1 * | 12/2003 | Chen et al. | ........................ | 705/36 |

(Continued)

OTHER PUBLICATIONS

Dempster, MAH, Dynamic Stochastic Programming for Asset Liability Management, University Finance Seminar, Judge Institute of Management, University of Cambridge, Oct. 22, 2004.*

(Continued)

*Primary Examiner* — Narayanswamy Subramanian
*Assistant Examiner* — Asha Puttaiah
(74) *Attorney, Agent, or Firm* — William C. Milks, III

(57) ABSTRACT

A system and method are disclosed for capturing the full dynamic and multi-dimensional nature of the asset allocation problem through applications of stochastic dynamic programming and stochastic programming techniques. The system and method permit one to consider many rebalancing periods, many asset classes, dynamic cash flows, and a general representation of investor risk preference. The system and method further provide a novel and general framework for representing investor preference by representing utility by directly modeling risk aversion as a function of wealth. The system and method demonstrate how the optimal asset allocation depends on the investment horizon, wealth, and the investor's risk preference and how optimal asset allocation therefore changes over time depending on cash flow and the returns achieved. Examples of dynamic strategies for various typical risk preferences and multiple asset classes are described showing how dynamic asset allocation leads to superior results compared to static or myopic techniques.

14 Claims, 51 Drawing Sheets

Investment example: initial $100k plus $15k per year, 20-year horizon: exponential utility, investment strategy

(56) References Cited

U.S. PATENT DOCUMENTS

| | | | |
|---|---|---|---|
| 2004/0111349 | A1* | 6/2004 | Charnley, Jr. .................. 705/36 |
| 2005/0004856 | A1* | 1/2005 | Brose et al. .................... 705/35 |
| 2005/0187849 | A1* | 8/2005 | Bollapragada et al. ......... 705/36 |
| 2006/0200400 | A1* | 9/2006 | Hunter et al. ............... 705/36 R |

OTHER PUBLICATIONS

Adaci, J.: Combining Stochastic Linear Programming and Dynamic Programming to Solve Multiperiod Portfolio Problems, Dissertation, 1996, Department of Operations Research, Stanford University.

Bell, D.: One Switch Utility Functions and a Measure of Risk, Management Science, 1988, pp. 1412-1424, 24, No. 12.

Bernoulli, D.: Specimen Theoriae Novae de Mantua Sortis, em Conunentarii Academiae Scientiarum Imperiales Petropolitanae pp. 175-192, 1738, 5. Translated by L. Sommer: Exposition of a New Theory on the Measurement of Risk, *Econometrica*, 1954. pp. 22-36, 22.

Blake, D., et al.: Asset Allocation Dynamics and Pension Fund Performance, Journal of Business, 1999, pp. 429-461,vol. 72, No. 4.

Bodie, Z. and D.B. Crane: Personal Investing: Advice, Theory, and Evidence, Financial Analyst Journal, 1997, pp. 13-23, vol. 53, No. 6.

Brennan, M., et al.: Strategic Asset Allocation, Journal of Economic Dynamics and Control, 1998, pp. 1377-1403, 21.

Brennan, M., et al.: The Use of Treasury Bill Futures in Strategic Asset Allocation Programs, in W.T. Ziemba and J. Mulvey (Eds.), *World Wide Asset and Liability Modeling*, 1998, pp. 205-228, Cambridge University Press, Cambridge.

Carino, D.R.: The Russel-Yasuda Kasai Model: An Asset-Liability Model for a Japanese Insurance Company Using Multistage Stochastic Programming, Interfaces,1994, pp. 29-49, vol. 24, No. 1.

Chopra, V.K., and W.T. Ziemba: The Effect of Errors in Mean, Variances and Covariances on Optimal Portfolio Choice, Journal of Portfolio Management, Winter, 1993, pp. 6-11.

Chopra, V.K.: Improving Optimization, Journal of Investing, 1993, pp. 51-59, vol. 2, No. 3.

Collomb, A. and G. Infanger: The Impact of Serial Correlation of Asset Returns on Dynamic Asset Allocation Strategies, SOL Technical Report, 2005.

Connor, G.: Sensible Return Forecasting for Portfolio Management, Financial Analysts Journal, 1997, pp. 44-51, September/October.

Constantinides, G.M., Rational Asset Prices, The Journal of Finance, 2002, pp. 1567-1591, vol. 57, No. 4.

Cox, J.C., and C. Huang: Optimal Consumption and Portfolio Policies When Asset Prices follow a Diffusion Process, Journal of Economic Theory, 1999, pp. 33-83, October, 49.

Dantzig, G.B. and P.W. Glynn: Parallel Processors for Planning Under Uncertainty, Annals of Operations Research, 1990, 1-21, 22.

Dantzig, G.B. et al.: Large-Scale Stochastic Linear Programs: Importance Sampling and Benders Decomposition, in: C. Brrzinski, U. Kulisch (Eds.): *Computational and Applied Mathematics I—Algorithms and Theory*, 1992, pp. 111-120, Proceedings of the 13th IMACS World Congress, Dublin, Ireland, Jul. 1991, North Holland.

Dantzig, G.B. and G. Infanger: Multi-Stage Stochastic Linear Programs for Portfolio Optimization, Annals of Operations Research, 1993, pp. 59-76, vol. 45.

Dembo, R., and Mausser, H.: The Put/Call Efficient Frontier, Algo Research Quarterly, 2000, pp. 13-25, vol. 3, No. 1.

De Farias, D.P. and B. Van Roy: The Linear Programming Approach to Approximate Dynamic Programming, Operations Research, pp. 850-865, vol. 51, No. 6.

Faig, M.: How do Households Invest Their Wealth, Report, Centre de Recerca en Economia Interactional, 2002, Generalitat de Catalunya, Universitat Pompeu Fabra.

Frauendorfer, K.: Barycentric Scenario Trees in Convex Multistage Stochastic Programming, Mathematical Programming, 1996, pp. 277-293, vol. 75.

Friend, I., and M. Blume: The Demand for Risky Assets, American Economic Review 65, 1975, pp. 900-922, No. 5.

Golub, B., et al.: A stochastic programming model for money management, European Journal of Operational Research, 1995, pp. 282-296, vol. 85.

Grinold, R.: Mean Variance and Scenario Based Approaches to Portfolio Selection, Journal of Portfolio Management, Winter, 1999, pp. 10-22.

Hakansson, N.H.: On Myopic Portfolio Policies, With and Without Serial Correlation of Yields, Journal of Business, 1971, pp. 324-344, vol. 44, No. 3.

Hiller, R.S., et al.: Stochastic Dedication: Designing Fixed Income Portfolios Using Massively Parallel Benders Decomposition, Management Science, 1993, pp. 1422-1438, vol. 39.

Infanger, G.: DECIS User's Guide, 1997, Dr. Gerd Infanger, 814 Loma Verde Ave, Palo Alto, CA 94303.

Infanger, G.: Monte Carlo (Importance) Sampling within a Benders Decomposition Algorithm for Stochastic Linear Programs, Annals of Operations Research, 1992, pp. 41-67, vol. 39.

Infanger, G., and D. Morton: Cut Sharing for Multistage Stochastic Linear Programs with Interstage Dependency, Mathematical Programming, 1996, pp. 241-256, 75.

Kahnemann, D., and A. Tversky: Prospect Theory: An Analysis of Decisions Under Risk, Econometrica, 1979, pp. 263-291, No. 47, vol. 2.

Kallberg, K.G., and W.T. Ziemba: Comparison of Alternative Utility Functions in Portfolio Selection Problems, Management Science, 1983, pp. 1257-1276, 29.

Kusy, M.I., and W.T. Ziemba: A Bank Asset and Liability Management Model, Operations Research, 1986, pp. 356-376, vol. 35.

Levy, H.: Portfolio Performance and the Investment Horizon, Management Science, 1972, pp. B-645-B-653, vol. 18, No. 12.

MacLean, L., Y. Zhao, and W. Ziemba: Dynamic Portfolio Selection with Process Control, Journal of Banking and Finance, special issue edited by P. Krokhmal, R.T. Rockafellar, and S. Uryasev, forthcoming, 2005.

MacLean, L., et al.: Time to Wealth Goals in Capital Accumulation, Quantitative Finance, to appear, 2005.

Markowitz, H.: Portfolio Selection, The Journal of Finance, 1952, 77-91, 7.

Markowitz, H.: The Value of a Blank Check, Journal of Portfolio Management, Summer, 1994, pp. 82-91.

Merton, R. C.: Continuous-Time Finance, 1990, Blackwell Publishing, 350 Main Street, Malden, MA 02148-5020, USA.

Michaud, R.O.: The Markowitz Optimization Enigma: Is "Optimized" Optimal?, Financial Analysts Journal, 1989, pp. 31-42, January/February.

Mossin, J.: Optimal Multiperiod Portfolio Policies, Journal of Business, 1968, pp. 215-229.

Mulvey, J.M.: Stochastic Network Programming for Financial Planning Problems, Management Science, 1992, pp. 1642-1664, vol. 38.

Musumeci, J., and J. Musumeci: A Dynamic Programming Approach to Multiperiod Asset Allocation, Journal of Financial Services Research 15, 1999, pp. 5-21, No. 1.

Nielsen, S., and S.A. Zenios: A Stochastic Programming Model for Funding Single-Premium Deferred Annuities, Mathematical Programming, 1996, pp. 177-200, vol. 75.

Pratt, J.W.: Risk Aversion in the Small and in the Large, Econometrica, 1964, pp. 122-136, vol. 32.

Rubinstein, M.: A Strong Case for Generalized Logarithmic Utility Model as the Premier Model of Financial Markets, The Journal of Finance, 1976, pp. 551-571, vol. 31, No. 2.

Samuelson, P.: Lifetime Portfolio Selection by Dynamic Stochastic Programming, Review of Economics and Statistics, 1969, pp. 239-246, 51.

Tobin, J.: Liquidity Preference as Behavior Towards Risk, Review of Economic Studies, 1958, pp. 65-86, vol. 25, No. 2.

Treynor, J. L.: Time Diversification, Journal of Investment Management, 2003, pp. 36-47, vol. 2, No. 3.

Zenios, S.A.: A Model for Portfolio Management with Mortgage-Backed Securities, Annals of Operations Research, 1993, pp. 337-356, vol. 43.

Ziemba, W.T., C. Parkan, and R. Brooks-Hill: Calculation of Investment Portfolios with Risk Free Borrowing and Lending, Management Science, 1974, pp. 209-222, vol. 21, No. 2.

(56) References Cited

OTHER PUBLICATIONS

Campbell, J.Y., and Viceira, L.M.: Strategic Asset Allocation, 2002, Oxford University Press, Oxford, NY, Chapter 5, pp. 107-138.
Gunthorpe, D., and Levy, H.: Portfolio Composition and the Investment Horizon, Financial Analyst Journal, 1994, pp. 51-66, January-February.
Hanoch, G., and Levy, H.: The Efficiency Analysis of Choices Involving Risk, Review of Economic Studies, 1969, pp. 335-346, vol. 36, No. 107.
Infanger, G.: Stochastic programming for funding mortgage pools, Quantitative Finance, Apr. 2007, pp. 189-216, vol. 7, No. 2.
Infanger, G.: Managing Risk Using Multi-Stage Stochastic Optimization, 1999.

* cited by examiner

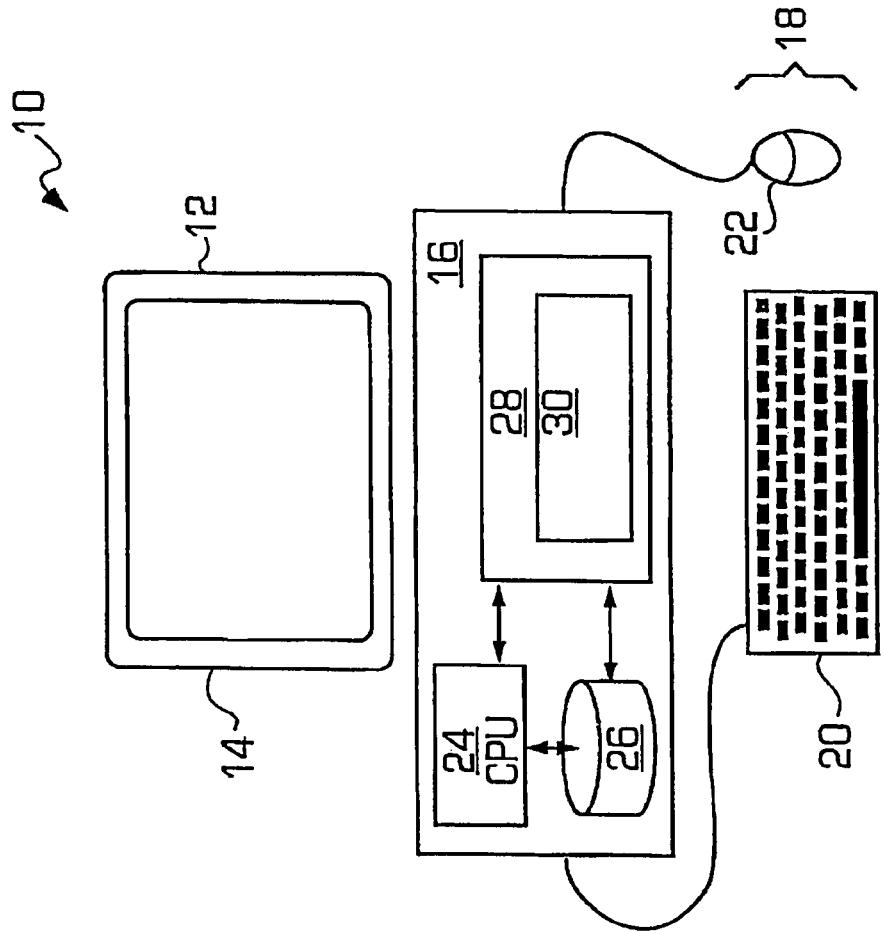
Figure 1: Block diagram of an exemplary system in accordance with a preferred embodiment of the present invention implemented on a personal computer

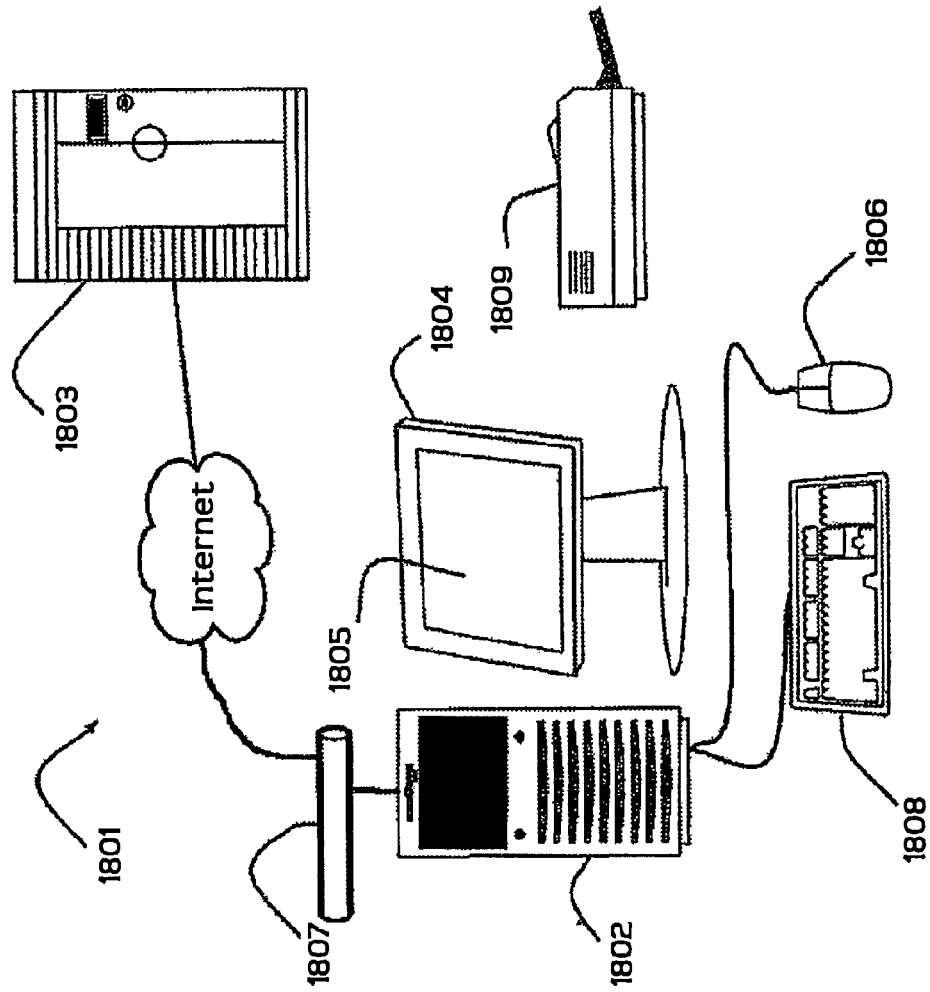
Figure 2: Block diagram of an exemplary system in accordance with an alternative embodiment

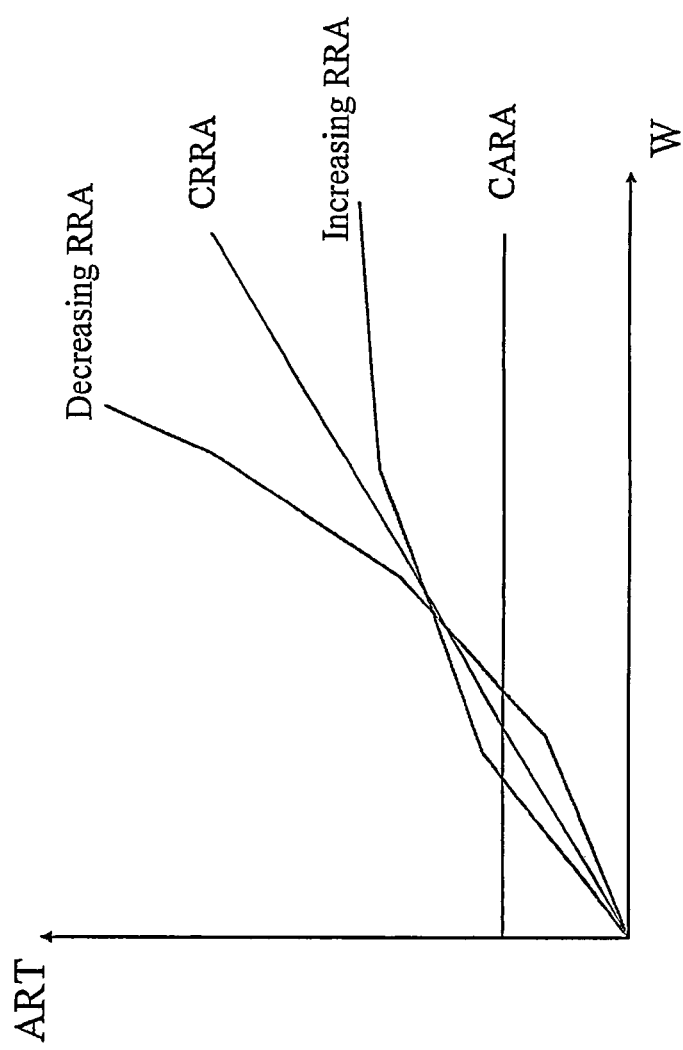
Figure 3: Modeling risk aversion

Figure 4: Investment example: initial $100k plus $15k per year, 20-year horizon: exponential utility, investment strategy

Figure 5: Investment example: initial $100k plus $15k per year, 20-year horizon: exponential utility, simulations

Figure 6: Investment example: initial $100k plus $15k per year, 20-year horizon: increasing relative risk aversion, investment strategy

Figure 7: Investment example: initial $100k plus $15k per year, 20-year horizon: increasing relative risk aversion, simulations

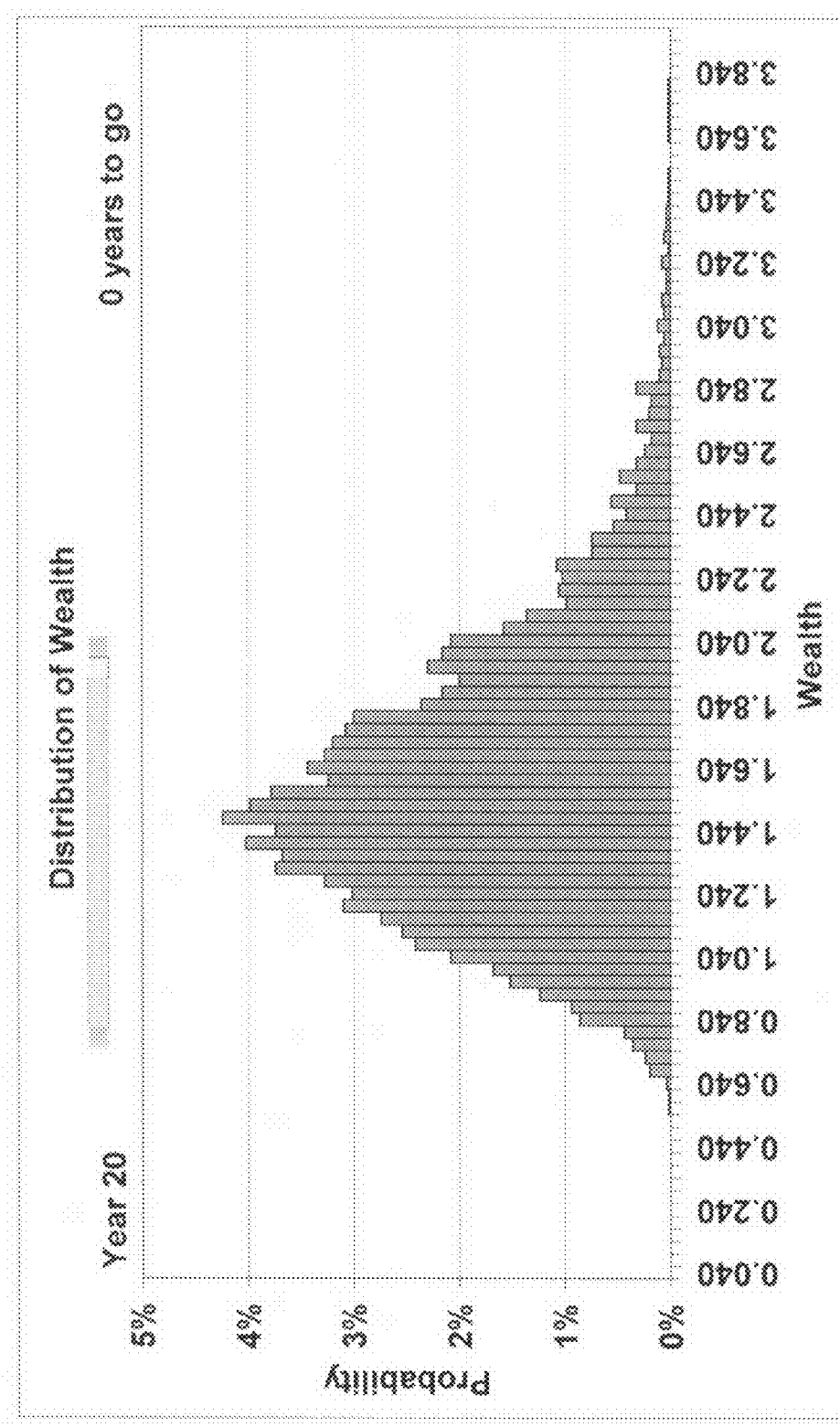

Figure 8: Investment example: initial $100k plus $15k per year, 20-year horizon: decreasing relative risk aversion, investment strategy

Figure 9: Investment example: initial $100k plus $15k per year, 20-year horizon: decreasing relative risk aversion, simulations

Figure 10: Investment example: initial $100k plus $15k per year, 20-year horizon: quadratic utility, investment strategy

Figure 11: Investment example: initial $100k plus $15k per year, 20-year horizon: quadratic utility, simulations

Figure 12: Investment example: 10-year horizon: downside risk at the end of the investment horizon, quadratic, investment strategy

Figure 13: Investment example: 10-year horizon: downside risk at the end of the investment horizon, quadratic, simulations

Figure 14: Investment example: 10-year horizon: downside risk at each period, quadratic, investment strategy

Figure 15: Investment example: 10-year horizon: downside risk at each period, quadratic, simulations

DYNAMIC ASSET ALLOCATION USING STOCHASTIC DYNAMIC PROGRAMMING

CROSS-REFERENCE TO RELATED PATENT APPLICATION

This application relates to U.S. Provisional Patent Application No. 60/801,841 filed on May 19, 2006, entitled DYNAMIC ASSET ALLOCATION, which is hereby incorporated by reference in its entirety by this reference.

BACKGROUND OF THE INVENTION

Field of the Invention

The present invention relates generally to a system and method for asset and liability management and, more particularly, to a system and method for providing dynamic asset allocation. Specifically, various embodiments of the present invention provide a system and method for providing dynamic asset allocation for portfolio optimization.

REFERENCES

[1] Brooke, A., Kendrik, D. and Meeraus, A. (1988): *GAMS, A Users Guide*, The Scientific Press, South San Francisco, Calif.

[2] Adaci, J. (1996): Combining Stochastic Linear Programming and Dynamic Programming to Solve Multiperiod Portfolio Problems, Dissertation, Department of Operations Research, Stanford University.

[3] Arrow, K. J. (1971): *Essays on the Theory of Risk Bearing*, Markham, Chicago.

[4] Bell, D. (1988): One Switch Utility Functions and a Measure of Risk, *Management Science*, 24, no. 12, pp. 1412-1424.

[5] Bellman, R. (1957): *Dynamic Programming*, Princeton University Press, Princeton, N.J.

[6] Bernoulli, D. (1738) Specimen Theoriae Novae de Mensura Sortis, em Commentarii Academiae Scientiarum Imperiales Petropolitanae 5, pp. 175-192. Translated by L. Sommer (1954): Exposition of a New Theory on the Measurement of Risk, *Econometrica* 22, pp. 22-36.

[7] Blake, D., Lehman, B. N. and A. Timmermann (1999): Asset Allocation Dynamics and Pension Fund Performance, *Journal of Business*, vol. 72, no. 4, pp. 429-461.

[8] Bodie, Z. and D. B. Crane (1997) Personal Investing: Advice, Theory, and Evidence, *Financial Analyst Journal*, vol. 53, no. 6, pp. 13-23.

[9] Brennan, M., S. Schwartz, and R. Lagnado (1998): Strategic Asset Allocation, *Journal of Economic Dynamics and Control*, 21, pp. 1377-1403.

[10] Brennan, M., S. Schwartz, and R. Lagnado (1998): The Use of Treasury Bill Futures in Strategic Asset Allocation Programs, in W. T. Ziemba and J. Mulvey (Eds.), *World Wide Asset and Liability Modeling*, Cambridge University Press, Cambridge, pp. 205-228.

[11] Campbell, J. Y., and L. M. Viceira (2002): *Strategic Asset Allocation*, Oxford University Press, Oxford, N.Y.

[12] Carino, D. R., T. Kent, D. H. Myers, C. Stacy, M. Sylvanus, A. L. Turner, K. Watanabe, and W. T. Ziemba (1994): The Russel-Yasuda Kasai Model: An Asset-Liability Model for a Japanese Insurance Company Using Multistage Stochastic Programming, *Interfaces*, vol 24, no. 1, pp. 29-49.

[13] Chopra, V. K., and W. T. Ziemba (1993): The Effect of Errors in Mean, Variances and Covariances on Optimal Portfolio Choice, *Journal of Portfolio Management*, Winter, pp. 6-11.

[14] Chopra, V. K. (1993): Improving Optimization, *Journal of Investing*, vol. 2, no 3, pp. 51-59.

[15] Collomb, A. and G. Infanger (2005): The Impact of Serial Correlation of Asset Returns on Dynamic asset Allocation Strategies, SOL Technical Report, 2005.

[16] Connor, G. (1997): Sensible Return Forecasting for Portfolio Management, *Financial Analysts Journal*, September/October, pp. 44-51.

[17] Constantinides, G. M. (2002) Rational Asset Prices, *The Journal of Finance*, vol. 57, no. 4, pp. 1567-1591.

[18] Cox, J. C., and C. Huang (1999): Optimal Consumption and Portfolio Policies When Asset Prices follow a diffusion Process, *Journal of Economic Theory*, 49 (October), pp. 33-83.

[19] Dantzig, G. B. and P. W. Glynn (1990): Parallel Processors for Planning Under Uncertainty, *Annals of Operations Research* 22, 1-21.

[20] Dantzig, G. B. and G. Infanger (1992): Large-Scale Stochastic Linear Programs: Importance Sampling and Benders Decomposition, in: C. Brezinski, U. Kulisch (Eds.): *Computational and Applied Mathematics I—Algorithms and Theory*, Proceedings of the 13th IMACS World Congress, Dublin, Ireland, July 1991, North Holland, pp. 111-120.

[21] Dantzig, G. B. and G. Infanger (1993): Multi-Stage Stochastic Linear Programs for Portfolio Optimization, *Annals of Operations Research*, vol. 45, pp. 59-76.

[22] Dembo, R. and Mausser, H. (2000): The Put/Call Efficient Frontier, Algo Research Quarterly, vol. 3, no. 1, pp. 13-25.

[23] De Farias, and D. P. and B. Van Roy, The Linear Programming Approach to Approximate Dynamic Programming, *Operations Research*, vol. 51, no. 6, pp. 850-865.

[24] Dimson E., P. Marsh and M. Staunton (2002): *Trumph of the Optimists: 101 Years of Global Investment Returns*, Princeton University Press, Princeton, N.J.

[25] Faig, M. (2002): How do Households Invest Their Wealth, Report, Centre de Recerca en Economia Interactional, Generalitat de Catalunya, Universitat Pompeu Fabra.

[26] Frauendorfer, K. (1996): Barycentric Scenario Trees in Convex Multistage Stochastic Programming, *Mathematical Programming*, vol. 75, pp. 277-293.

[27] Friend, I. and M. Blume (1975): The Demand for Risky Assets, *American Economic Review* 65, no 5, pp. 900-922.

[28] Golub, B., M. Holmer, R. McKendal, L. Pohlman and S. A. Zenios (1995): A stochastic programming model for money management, *European Journal of Operational Research*, vol. 85, pp. 282-296. 1995.

[29] Grinold, R. (1999): Mean Variance and Scenario Based Approaches to Portfolio Selection, *Journal of Portfolio Management*, Winter, pp. 10-22.

[30] Gunthorpe, D. and Levy, H. (1994) Portfolio Composition and the Investment Horizon, *Financial Analyst Journal*, January-February, pp. 51-56.

[31] Hakansson, N. H. (1971): On Myopic Portfolio Policies, With and Without Serial Correlation of Yields, *Journal of Business*, vol. 44, no. 3, pp. 324-334.

[32] Hanoch, G. and H. Levy (1969): The Efficiency Analysis of Choices Involving Risk, *Review of Economic Studies*, vol. 36, no. 107, pp. 335-346.

[33] Hiller, R. S. and J. Eckstein (1993): Stochastic Dedication: Designing Fixed Income Portfolios using Massively Parallel Benders Decomposition, *Management Science*, vol. 39, no. 11, pp. 1422-1438.

[34] Infanger, G. (1994): *Planning Under Uncertainty—Solving Large-Scale Stochastic Linear Programs*, The Scientific Press Series, Boyd and Fraser.

[35] Infanger, G. (1997): *DECIS User's Guide*, Dr. Gerd Infanger, 814 Loma Verde Ave, Palo Alto, Calif. 94303.

[36] Infanger, G. (1999): Managing Risk using Multi-Stage Stochastic Optimization, Report SOL 99-2, Dept of Operations Research, Stanford University, CA, and The Institute for Quantitative Research in Finance ("the Q-Group"), INQUIRE—United Kingdom, and INQUIRE—Europe, Proceedings of the Autumn 2000 Joint Conference.

[37] Infanger, G. (1992): Monte Carlo (Importance) Sampling within a Benders Decomposition Algorithm for Stochastic Linear Programs, *Annals of Operations Research*, vol. 39, pp. 41-67.

[38] Infanger, G. and D. Morton (1996): Cut Sharing for Multistage Stochastic Linear Programs with Interstage Dependency, *Mathematical Programming*, 75, pp. 241-256.

[39] Kahnemann, D. and A. Tversky (1979): Prospect Theory: An Analysis of Decisions Under Risk, *Econometrica*, no. 47, vol. 2, pp. 263-291.

[40] Kallberg, J. G. and W T Ziemba (1981): Remarks on Optimal Portfolio Selection, in *Methods of Operations Research*, 44, G. Bamberg and O. Opitz, Eds., Oelgeschlager, Gunn and Hain, pp. 507-520.

[41] Kallberg, K. G. and W. T. Ziemba (1983): Comparison of Alternative Utility Functions in Portfolio Selection Problems, *Management Science*, 29, pp. 1257-1276.

[42] Kallberg, J. G. and W T Ziemba (1984): Mis-specification in Portfolio Selection Problems in *Risk and Capital*, G. Bamberg and K. Spreemann, Eds., Springer-Verlag, pp. 74-87.

[43] Kusy, M. I. and W. T. Ziemba (1986): A Bank Asset and Liability Management Model, *Operations Research*, vol. 35, pp. 356-376.

[44] Keeney, R. and H. Raiffa (1976): *Decisions with Multiple Objectives*, John Wiley and Sons.

[45] Levy H. (1972): Portfolio Performance and the Investment Horizon, *Management Science*, vol. 18, no. 12, pp. B-645-B-653.

[46] Markowitz, H. (1952): Portfolio Selection, *The Journal of Finance*, 7, 77-91.

[47] Markowitz, H. (1994): The Value of a Blank Check, *Journal of Portfolio Management*, Summer, pp. 82-91.

[48] McLean, L., Y. Zhao, and W. Ziemba (2005): Dynamic Portfolio Selection with Process Control, *Journal of Banking and Finance*, special issue edited by P. Krokhmal, R. T. Rockafellar, and S. Uryasev, forthcoming.

[49] McLean, L., W. Ziemba and Y. Li (2005): Time to Wealth Goals in Capital Accumulation, *Quantitative Finance*, to appear.

[50] Merton, R. C. (1969) *Lifetime Portfolio Selection under Uncertainty: the Continuous-Time Case*, review of *Economics and Statistics*, Vol. 51, No. 3, pp. 247-259.

[51] Merton, R. C. (1990) *Continuous-Time Finance*, Blackwell Publishing, 350 Main Street, Malden, Mass. 02148-5020, USA.

[52] Michaud, R. O. (1989): The Markowitz Optimization Enigma: Is "Optimized" Optimal?, *Financial Analysts Journal*, January/February, pp. 31-42.

[53] Mossin, J. (1968): Optimal Multiperiod Portfolio Policies, *Journal of Business* pp. 215-229.

[54] Mulvey, J. M. and H. Vladimirou (1992): Stochastic Network Programming for Financial Planning Problems, *Management Science*, vol. 38, pp. 1642-1664.

[55] Musumeci, J. and J. Musumeci (1999): A Dynamic Programming Approach to Multiperiod Asset Allocation, *Journal of Financial Services Research* 15, no. 1, pp. 5-21.

[56] Nielsen, S. and S. A. Zenios (1996): A Stochastic Programming Model for Funding Single-Premium Deferred Annuities", *Mathematical Programming*, vol. 75, pp. 177-200.

[57] Pratt, J. W., (1964): Risk Aversion in the Small and in the Large, *Econometrica*, vol. 32, pp. 122-136.

[58] Rubinstein, M. (1976): A Strong Case for Generalized Logarithmic Utility Model as the Premier Model of Financial Markets, *The Journal of Finance*, vol 31, no. 2, pp. 551-571.

[59] Samuelson, P. (1969): Lifetime Portfolio Selection by Dynamic Stochastic Programming, *Review of Economics and Statistics*, 51, pp. 239-246.

[60] Siegel, J. (2002): *Stocks for the Long Run: The Definitive Guide to Financial Market Returns and Long-Term Investment Strategies*, New York, McGraw-Hill Trade.

[61] Tobin, J. (1958): Liquidity Preference as Behavior Towards Risk, *Review of Economic Studies*, vol. 25, no. 2, pp. 65-86.

[62] Treynor, Jack L. (2003) Time Diversification, *Journal of Investment Management*, vol. 2, no. 3, pp. 36-47.

[63] Von Neumann, J. and O. Morgenstern (1944): *Theory of Games and Economic Behavior*, Princeton University Press, Princeton, N.J.

[64] Wallace, S. W. and W. T. Ziemba (eds.) (2005): *Applications of Stochastic Programming*, SIAM—Mathematical Programming Society, Philadelphia, Pa.

[65] Zenios, S. A. (1993): A Model for Portfolio Management with Mortgage-Backed Securities, *Annals of Operations Research*, vol. 43, pp. 337-356.

[66] Ziemba, W. T. (1974): Choosing Investment Portfolios When the Returns have Stable Distributions, in P. L. Hammer and G. Zoutendijk, (Eds.) *Mathematical Programming in Theory and Praxis*, North Holland, Amsterdam, pp. 443-482.

[67] Ziemba, W. T., C. Parkan and R. Brooks-Hill (1974): Calculation of Investment Portfolios with Risk Free Borrowing and Lending, *Management Science*, vol. 21, no. 2, pp. 209-222.

[68] Ziemba, W. T. (2003): *The Stochastic Programming Approach to Asset, Liability, and Wealth Management*, The Research Foundation of AIMR, Charlottesville, Va. 22903.

Description of the Prior Art

A major investment decision for individual and institutional investors alike is to choose between different asset classes, i.e., equity investments and interest-bearing investments. The asset allocation decision determines the ultimate risk and return of a portfolio. The asset allocation problem is frequently addressed either through a static analysis, based on Markowitz' mean-variance model, or dynamically, but often myopically, through the application of analytical results for special classes of utility functions, e.g., Samuelsons fixed-mix result for constant relative risk aversion. See, Samuelson, P. (1969) [59].

Considered in more detail, Markowitz (1952) [46], in his seminal work, pointed out that the returns of a portfolio are random parameters and that for the evaluation of a portfolio, one should consider both its expected returns and its risk, where for representing risk he used the portfolios variance.

His mean-variance analysis laid the foundations for modern finance and our understanding as to how markets work. Mean-variance analysis is referred to as modern portfolio theory, whereas post-modern portfolio theory considers extensions including skewed distributions and asymmetric risk measures.

The major decision of an investor regarding his/her portfolio is to choose the allocation between different asset classes, especially between equity investments and interest-bearing investments. Strategic asset allocation determines the ultimate expected rate of return and risk of an investor's portfolio, see, e.g., Blake et al. (1999) [7]. For individuals and institutional investors alike, it is usually a long-term decision and its analysis should include all financial aspects, e.g., wealth, current and future cash flows, and financial goals. Inflation, as well as liquidity considerations (to plan for the unexpected), should be part of the analysis.

In the long run, equity investments have grown at a faster rate than other assets such as bonds, T-bills, and inflation, see, e.g., Siegel (2002) [60], Constantinides (2002) [17], and Dimson, Marsh and Staunton (2002) [24]. However, in the short run, the risk is significant and may lead to negative returns. Even in the long run, equity investments can be quite risky, and as we have painfully observed during the recent downturn from 2000 till 2003 as well as in bear markets before, equity investments can quickly lose a significant portion of their value interest-bearing investments have exhibited lower returns in the long run, barely exceeding inflation, but with less risk, making them possibly a better vehicle for the short-term. It is clear that one needs to determine the right balance between the asset classes, and this balance depends on how much risk an investor is willing to assume and may change over time due to changes in wealth, needs, goals and market conditions. It is well known that strategic asset allocation has a far greater impact on the overall performance of an investor's portfolio than, for example, the selection of individual securities.

The question of how the length of the investment horizon impacts the optimal asset allocation is an important theoretical and practical question, which has been discussed in the academic literature for more than 30 years. The answers to this question vary significantly depending on the assumptions made. For example, Levy (1972) [45] and Gunthorpe and Levy (1994) [30] discussed portfolio performance and composition versus investment horizon in a mean-variance framework. Practitioners tend to recommend a larger allocation towards stocks as the investment horizon increases. This is often argued under the name of "time diversification", and is based on the argument that if stocks are distributed independently and identically in each time period according to a log normal distribution, the distribution over many periods as the product of log normals is also log normal and the mean and the variance of the logarithm of the return distribution grows proportionally with the length of the investment period. Since the standard deviation of the log returns then grows with the square root of the horizon, the probability of capital loss decreases as time increases, and stocks become more favorable as the time horizon increases. Using this argument with a reasonable assumption of a 10% mean and 15% volatility, annually, one may verify that after an investment horizon of about seven years, the return on stocks exceeded with 95% probability is positive. It would take 13 years to arrive at a positive return exceeded with 99% probability.

Time diversification often includes a broader view of human capital, suggesting that the capital represented by an individual's ability to work and generate wages should also enter the equation. Consequently, at the beginning of one's professional life, most of one's capital is the potential of generating future income through labor, which is considered to be not risky, while at the end of one's professional career, most capital lies in one's financial assets (in the retirement account, but also real estate, stocks, etc.), and the ability to work and to generate income becomes a lesser part of the total capital. Thus, it is argued that at the beginning of one's career, the small amount in financial assets should be invested in a more risky allocation and gradually reduced to a less risky allocation at retirement, when all assets are the financial assets generated during the lifetime. Based on time diversification arguments, a common rule of thumb used by practitioners is to invest in stocks the percentage resulting from 100—age, thus a 30 year old should invest about 70% of his portfolio into stocks, and a 60 year old about 40%. These arguments only use time as the explaining factor and the corresponding strategies do not react to investment performance.

Treynor (2003) [62] on time diversification puts forward the question of how each year's investment choices influence the wealth accumulated at the end of one's career. This perspective concludes that the impact of each year's dollar gains and losses on terminal wealth depend on the riskless rate, and one should time diversify in such a way that the risk evaluated in terminal dollars should be constant over the investment horizon. Therefore, unless investors can predict different returns for each year, the money amount exposed to the stock market should be approximately constant over the life-time.

Samuelson (1969) [59] in his landmark work addressed how much of his/her wealth an individual should either consume or invest at any period in time, assuming no bequest is to be left behind. He proves using a backward dynamic programming recursion that, given the choice of one risky asset and one risk-free asset, for the returns of the risky asset distributed identically and independently (iid) over time, for all income generated through investment, and for individuals valuing their consumption in time according to a power utility function with respect to consumption and maximizing discounted expected utility over the lifetime, it is optimal to invest the same proportion of wealth into stocks in every period, independently of wealth. The same was proved by Merton (1969) [50] in continuous time and later, see Merton (1990) [51], extended to multiple risky assets and various bequest situations. This life-time portfolio and consumption selection prompted an apparent conflict between theoreticians and practitioners, since the advice from Samuelson and Merton is quite different from what financial practitioners tell their clients. The remarkable aspect of Samuelson's and Merton's result is that, under their assumptions about the market and under constant relative risk aversion, the consumption decisions and the investment decisions are independent of each other, and therefore the optimal investment decision is not only invariant with respect to investment horizon but also with respect to wealth. Thus, the result translates directly to the investment problem only, where one wants to maximize the utility of final wealth at the end of the investment horizon, by allocating and re-allocating at each period along the way. The result follows directly from the utility function used, stipulating that the (relative) risk aversion of the individual is invariant with respect to wealth.

Optimal multi-period investment strategies based on maximizing expected utility have been analyzed by Mossin (1968) [53]. Mossin's research attempted to isolate the class of utility functions of terminal wealth which result in myopic utility (value) functions for intermediate wealth positions. Myopic means that these functions are independent of returns beyond the current period. Thus, it would be sufficient to analyze only the current optimization problem to arrive at an optimal multi-period investment strategy. Mossin concluded that logarithmic functions (for general asset distributions) and power functions (for serially independent asset distributions) are completely myopic. He also contended that, if there is a riskless asset (whose return is known for the entire investment horizon), and a risky one, all utility functions for which the risk tolerance is linear in wealth (HARA) would lead to partial myopia as one would optimally invest in any period as if in all further periods the investment were to be made in the riskless asset, and complete myopia would exist if the risk-free rate were to be zero. However, Hakansson (1971) [31] demonstrated that, for the HARA case, even when asset returns are serially independent, no myopic strategies are optimal, except for the highly restricted case of a complete absence of any restrictions on short sales and borrowing. A percentage margin requirement, an absolute limit on borrowing, or a reasonable lending constraint such that the borrowed money would have to be repaid would not lead to a myopic strategy. Thus, in the presence of such restrictions only the power and logarithmic utility functions would lead to myopia. Furthermore, if asset returns are serially correlated, only the logarithmic utility function would result in a myopic policy. Later, Cox and Huang (1989) [18] presented an analytical solution based on diffusion processes for the consumption-investment problem with HARA utility function and wealth and consumption constrained to be nonnegative. Later, an approach using approximate analytical solutions has been developed by Campbell and Viciera (2002) [11], based on perturbations of known exact solutions.

In summary, a logarithmic utility function results in a myopic portfolio strategy, both for serially dependent and independent asset return distributions; a power utility function results in a myopic strategy only in the case of serially independent asset returns distributions; and a HARA utility function results in a myopic strategy only for serially independent asset return distributions and only in a non-realistic setting of complete absence of borrowing and short-selling constraints. All other utility functions do not result in myopic investment strategies for any return distributions.

More recently, numerical dynamic portfolio optimization techniques have been developed that permit one to determine the asset allocation strategy that maximizes an investor's expected utility. These new approaches are based on stochastic dynamic programming and stochastic programming and promise to accurately solve for various types of utility functions and asset return processes.

The stochastic programming approach can efficiently solve the most general models, where transaction costs need to be considered, and the returns distributions have general serial dependency. The stochastic programming approach also lends itself well to the more general asset liability management problem (ALM). Here, liabilities in addition to assets need to be considered. This problem is faced by pension funds and insurance companies. Besides assets, pension plans need to consider retirement obligations, which may depend on uncertain economic and institutional variables, and insurance companies need to consider uncertain pay-out obligations due to unforseen and often catastrophic events. Asset liability models are most useful when both asset returns and liability pay-outs are driven by common, e.g., economic, factors. In this case ALM represents the only approach that can take into account directly the joint distribution of asset returns and liability cash flows. Lenders operating in the secondary mortgage market also face a certain kind of ALM problem, when deciding on re-financing their (pools of) mortgages by issuing a portfolio of bonds, callable or non-callable with various maturities. Here the assets are the mortgages bought from banks and the liabilities are the bonds issued, see e.g., Infanger (1999) [36].

Traditional stochastic programming uses scenario trees to represent possible future events. The trees may be constructed by a variety of scenario generation techniques, with the emphasis on keeping the resulting tree thin but representative of the event distribution in order to arrive at a computationally tractable problem. Often, in later decision stages of the model, only a very small number of scenarios is used as a representation of the distribution leading to very thin sub-trees. Thus, the emphasis is on obtaining a good first-stage solution rather than obtaining an entire accurate policy. Early applications of stochastic programming for asset allocation are discussed in Mulvey and Vladimirou (1992) [54], formulating financial networks, and Golub et al. (1995) [28]. Early applications of stochastic programming for dynamic fixed-income strategies are discussed in Zenios (1993) [65], discussing the management of mortgage-backed securities, Hillier and Eckstein (1993) [33], and Nielsen and Zenios (1996) [56]. Early practical applications of stochastic programming for asset liability management are reported in Kusy and Ziemba (1986) [43] for a bank and in Carino et al. (1994) [12] for an insurance company. Ziemba (2003) [68] gives a summary of the stochastic programming approach for asset liability management. An approach based on partitioning the probability space and calculating deterministic bounds was developed by Frauendorfer (1996) [26], and used for bond management and asset liability management. The book edited by Wallace and Ziemba (2005) [64] gives publicly available stochastic programming code. Stochastic programming software can be best used from within a modeling system, for example, GAMS (Brooke et al. (1988) [1]) provides DECIS (Infanger (1997) [35]) as an integrated stochastic programming solver.

Monte Carlo sampling is an efficient technique to go when representing multi-dimensional distributions. An approach, referred to as decomposition and Monte Carlo sampling, uses Monte Carlo (importance) sampling within a decomposition for estimating Benders cut coefficients and right-hand sides. This approach has been developed by Dantzig and Glynn (1990) [19] and Infanger (1992) [37]. Dantzig and Infanger (1993) [21] show how the approach of decomposition and importance sampling could be used for solving multi-period asset allocation problems. The success of the sampling within the decomposition approach depends on the type of serial dependency of the stochastic parameter processes, determining whether or not cuts can be shared or adjusted between different scenarios of a stage. Infanger (1994) [34] and Infanger and Morton (1996) [38] show that for serial correlation (in form of autoregressive processes) of stochastic parameters, unless in the right hand side of the (linear) program, cut sharing is difficult for more than three decision stage problems. However, for serially independent stochastic parameters, the approach is very efficient for solving problems with many decision stages.

Monte Carlo pre-sampling uses Monte Carlo sampling to generate a tree, much like the scenario generation methods referred to above, and then employs a suitable method for solving the sampled (and thus approximate) problem. Infanger (1999) [36] used the pre-sampling approach for representing the mortgage funding problem. This approach combines optimization and simulation techniques to represent a 360 month problem by four decision stages (initial, after a year, after 5 years, and at the end of the horizon) that are subject to optimization and by pre-defined decision rules representing intermediate decisions. The paper also provides an efficient way to independently evaluate the solution strategy as a result from solving the multi-stage stochastic program to obtain a valid upper bound on the objective. The pre-sampling approach is general in terms of modeling and solving stochastic processes with serial dependency; however, it is limited in the number of decision stages, since problems with many decision stages become computationally difficult. Assuming a reasonable sample size for representing the decision tree, problems with up to four decision stages are meaningfully tractable. Thus, if one were to represent asset allocation problems with many time (rebalancing) periods, one needed to represent more than one time period in one decision stage and define rules as to how to manage the assets and liabilities between decision stages. For example, one could assume buy and hold between decision stages and allow for rebalancing at the decision stages. In many situations this is considered a sufficiently accurate approximation of all future recourse decisions. A stochastic programming approach using pre-sampling has been employed by Collomb and Infanger (2005) [15] to analyze the impact of serial dependency on the solution of dynamic asset allocation problems. Instead of pre-defining rebalancing periods up-front, the rebalancing decision may be modeled as depending on certain conditions occurring. For example, Mc Lean, Yao and Ziemba (2005) [48] model portfolio rebalancing as conditioned on prices exceeding or going below certain levels, and Mc Lean, Ziemba and Li (2005) [49] model portfolio rebalancing when certain wealth goals are met.

When the focus is on obtaining optimal policies and transaction costs are not the primary issue, stochastic dynamic programming proves to be a very effective approach. Stochastic dynamic programming based on Bellman's (1957) [5] dynamic programming principle has been used for the derivation of the theoretical results obtained for the HARA class of utility functions discussed above. For general monotone increasing and concave utility functions, no analytical solutions are available. However, stochastic dynamic programming can be used as an efficient numerical algorithm when the state space is small, say, up to three or four state variables. This limitation in the number of state variables is well known as the "curse of dimensionality" in dynamic programming. Recently, new methods of value function approximations, see, e.g., De Farias and Van Roy (2003) [23] show promise for problems with larger state spaces; however, it is unclear at this point in time how accurately these methods will approximate the solution of the asset allocation problem. Stochastic dynamic programming as a numerical algorithm has been used by Musumeci and Musumeci (1999) [55], representing results with two asset classes, one stock index and a risk free asset, where in the dynamic programming procedure they condition on the amount of wealth invested in the risky asset. Earlier, Jeff Adaci (1996) [2] (in a Ph. D. thesis supervised by George Dantzig and the applicant) conditioned on wealth and thus set the stage for multiple asset classes, but reported results also only for two asset classes and a few periods. Brennam, Schwartz and Lagnado (1998) [9] and (1998) [10] proposed a dynamic model using discrete state approximations including four state variables.

Thus, it would be desirable to provide a dynamic asset allocation system and method that overcome the above limitations and disadvantages of conventional asset allocation systems and techniques and permit one to determine the asset allocation strategy that maximizes an investors expected utility. It would also be desirable to provide a dynamic asset allocation system and method based on stochastic dynamic programming and stochastic programming and to accurately solve for various types of utility functions and asset return processes. It is to these ends that the present invention is directed. The various embodiments of the present invention provide many advantages over conventional portfolio management approaches and systems.

SUMMARY OF THE INVENTION

One embodiment of the dynamic asset allocation system and method in accordance with the present invention provides many advantages over conventional portfolio management systems and techniques, which make the dynamic asset allocation system and method in accordance with various embodiments of the present invention more useful to portfolio managers. For example, various embodiments of the dynamic asset allocation system and method in accordance with the present invention provide an efficient approach for solving the asset allocation problem under general utility functions, many time periods (decision stages), and many asset classes. The dynamic asset allocation system and method in accordance with the present invention incorporate the properties of various utility functions and present a general framework for modeling utility. The dynamic asset allocation system and method in accordance with the present invention provides multi-period portfolio choice and presents a novel method based on stochastic dynamic programming and Monte Carlo sampling. Accordingly, the various embodiments of the present invention provide a methodology and a system that optimize portfolio management. The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing:

FIG. 1 is a block diagram of an exemplary system in accordance with a preferred embodiment of the present invention implemented on a personal computer;

FIG. 2 is a block diagram of an exemplary system in accordance with an alternative embodiment of the present invention implemented on a personal computer coupled to a web or Internet server;

FIG. 3 illustrates the modeling of risk aversion;

DETAILED DESCRIPTION OF THE PREFERRED EMBODIMENTS

Figure 4A:
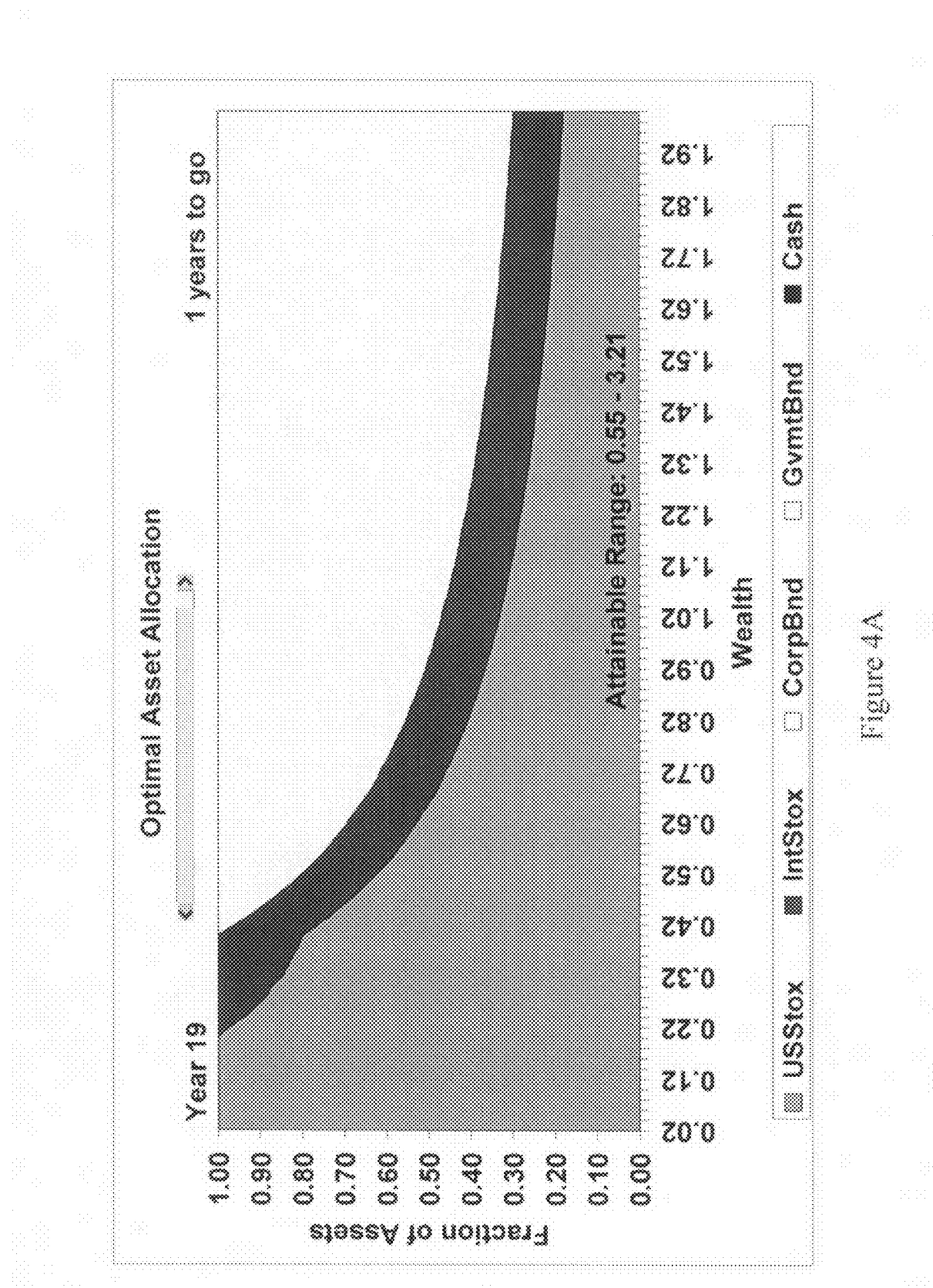
FIG. 4 illustrates the investment example of initial $100 k plus $15 k per year, 20-year horizon with exponential utility and depicts the investment strategy.

The present invention is particularly applicable to a computer-implemented software-based dynamic asset allocation system for optimized portfolio management, and it is in this context that the various embodiments of the present invention will be described. It will be appreciated, however, that the dynamic asset allocation system and method in accordance with the various embodiments of the present invention have greater utility, since they may be implemented in hardware or may incorporate other modules or functionality not described herein. FIG. 1 is a block diagram illustrating an example of a dynamic asset allocation system 11 for portfolio optimization in accordance with one embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, such as printers, scanners, and the like. The processing unit 16 may further include a central processing unit (CPU) 24 (e.g., a Pentium 4 3.4 MHz and 2 GB of RAM), a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain a dynamic asset allocation tool 30 for portfolio optimization. The dynamic asset allocation tool 30 may be implemented as one or more software modules that are executed by the CPU 24. In accordance with various contemplated embodiments of the present invention, the dynamic asset allocation system 11 may also be implemented using hardware and may be implemented on different types of computer systems, such as client/server systems, Web servers, mainframe computers, workstations, and the like. Thus, in accordance with another embodiment of the present invention, the dynamic asset allocation system 11 is implemented via a hosted Web server. A system using a hosted Web server, generally indicated by the numeral 1801, is shown in FIG. 2.

The system 1801 preferably comprises a Web-based application accessed by a personal computer 1802, as shown in FIG. 2. For example, the personal computer 1802 may be any personal computer having at least two gigabytes of random access memory (RAM), using a Web browser, preferably MICROSOFT® Internet Explorer 6.0 browser or greater. In this example, the system 1801 is a 128-bit SSL encrypted secure application running on a MICROSOFT® Windows Server 2003 operating system or Windows Server 2000 operating system or later operating system available from Microsoft Corporation located in Redmond, Wash. The personal computer 1802 also comprises a hard disk drive preferably having at least 40 gigabytes of free storage space available. The personal computer 1802 is coupled to a network 1807. For example, the network 1807 may be implemented using an Internet connection. In one implementation of the system 1801, the personal computer 1802 can be ported to the Internet or Web, and a server 1803. The network 1807 may be implemented using a broadband data connection, such as, for example, a DSL or greater connection, and is preferably a T1 or faster connection. The graphical user interface of the system 1801 is preferably displayed on a monitor 1804 connected to the personal computer 1802. The monitor 1804 comprises a screen 1805 for displaying the graphical user interface provided by the system 1801. The monitor 1804 may be a 15" color monitor and is preferably a 1024×768, 24-bit (16 million colors) VGA monitor or better. The personal computer 1802 further comprises a 256 or more color graphics video card installed in the personal computer. As shown in FIG. 2, a mouse 1806 is provided for mouse-driven navigation between screens or windows comprising the graphical user interface of the system 1801. The personal computer 1802 is also preferably connected to a keyboard 1808. Preferably, the user can print results using a printer 1809. The system 1801 is implemented as a Web-based application, and data may be shared with additional software (e.g., a word processor, spreadsheet, or any other business application). Persons skilled in the art will appreciate that the systems and techniques described herein are applicable to a wide array of business and personal applications.

Following the empirical evidence about possible investor preference, we propose to model directly in the space of risk aversion rather than first defining a certain type of utility function (which may or may not fit well) and then estimating its parameters. We have found an efficient way of representing the utility function as a piecewise exponential function with K pieces, where each piece represents a certain absolute risk aversion $\alpha_i$, where $i=1, \ldots, K$.

Let $\hat{W}_i$, $i=1, \ldots, K$, be discrete wealth levels representing the borders of each piece i, such that below each $\hat{W}_i$ the risk aversion is $\alpha_i$ and above $\hat{W}_i$ (till $\hat{W}_{i+1}$) the risk aversion is $\alpha_{i+1}$, for all $i=1, \ldots, K$. For each piece i we represent utility using the exponential function. Thus, for $\hat{W}_i \leq W \leq \hat{W}_{i+1}$, $u_i(W_i)=a_i-b_i\exp(-\alpha_i W_i)$ and the first derivative with respect to wealth is $u_i'(W_i)=b_i\alpha_i\exp(-\alpha_i W_i)$. The absolute risk aversions $\alpha_i$ are computed in such a way that they represent the desired function of risk aversion versus wealth. We determine the coefficients of the exponential functions of each piece i by matching function values and first derivatives at the intersections $\hat{W}_i$. Thus, at each wealth level $\hat{W}_i$, representing the border between risk aversion $\alpha_i$ and $\alpha_{i+1}$, we obtain the following two equations $$a_i - b_i e^{-\alpha_i \hat{W}_i} = a_{i+1} - b_{i+1} e^{-\alpha_{i+1} \hat{W}_i}$$

$$b_i \alpha_i e^{-\alpha_i \hat{W}_i} = b_{i+1} \alpha_{i+1} e^{-\alpha_{i+1} \hat{W}_i},$$

from which we calculate the coefficients $a_{i+1}$ and $b_{i+1}$ as $$b_{i+1} = b_i \frac{\alpha_i}{\alpha_{i+1}} e^{(\alpha_{i+1} - \alpha_i)\hat{W}_i}$$

$$a_{i+1} = a_i - b_i\left(1 - \frac{\alpha_i}{\alpha_{i+1}}\right) e^{-\alpha_i \hat{W}_i},$$

where we set arbitrarily $a_1=0$ and $b_1=1$.

The piecewise exponential function may span the whole range of attainable wealth levels. Starting from parameters $a_1=0$ and $b_1=1$ and given risk versions $\alpha_i$, we compute all parameters $a_{i+1}$ and $b_{i+1}$ for each $i=1, \ldots K$.

To test the piecewise approximation, we could set the risk aversion $\alpha_i$ to represent typical utility functions, for example, setting each $\alpha_i=\alpha$ would result in constant absolute risk aversion (CARA) or setting $\alpha_i=\gamma/\hat{W}_i$ would represent constant relative risk aversion (CRRA).

We are now in a position to set the piecewise absolute risk aversions to fit the risk aversion of the investor. Typically, we would model investors as having decreasing absolute risk aversion but either increasing or decreasing relative risk aversion. For example, the relative risk aversion may be increasing or decreasing from $\gamma_0$ at $\hat{W}_0$, to $\gamma_K$ at $\hat{W}_K$. For a constant rate of change $\Delta$ in relative risk aversion, this could be modeled by setting $$\gamma_{i+1} = \gamma_i + \Delta$$

where $$\Delta = \frac{(\gamma_K - \gamma_0)}{(\hat{W}_K - \hat{W}_0)}$$

and $$\alpha_i = \gamma_i / \hat{W}_i.$$

In addition we may wish to represent constant relative risk aversion below $\hat{W}_0$ and above $\hat{W}_K$. In order to do so we append to the piecewise exponential representation on each side a CRRA piece represented by the power function $$u(W) = c \frac{W^{1-\gamma} - 1}{1 - \gamma} + d, \gamma > 1,$$

with its first derivative $u'(W) = cW^{-\gamma}$. We then calculate the parameters of the power function as $$c = b\alpha e^{\alpha \hat{W}} \hat{W}^\gamma$$

$$d = a - be^{\alpha \hat{W}} - c\frac{\hat{W}^{1-\gamma} - 1}{1 - \gamma},$$

where in the formula for obtaining the parameters $c_0$ and $d_0$ for the lower CRRA piece we use $\alpha=\alpha_1$ and $\hat{W}=\hat{W}_0$ and for obtaining $c_K$ and $d_K$ for the upper CRRA piece we use $\alpha=\alpha_K$ and $\hat{W}=\hat{W}_K$. The formulas arise from setting at the intersections at $\hat{W}_0$ and $\hat{W}_K$ the function value and first derivative of the power piece equal to the function value and first derivative of the adjacent exponential piece, respectively.

As result a smooth, monotonically increasing and concave utility function is obtained that approximates arbitrarily closely (depending on the number of pieces used) the function of relative risk aversion representing the investor. FIG. 3 displays the function of absolute risk tolerance versus wealth, for CARA and CRRA as well as two examples of representations of increasing and decreasing relative risk aversion.

The piecewise exponential modeling represents a novel approach to representing an investor's risk aversion. We have found it easier to determine directly the risk aversion of an investor, e.g., by a questionnaire, as compared to determining the utility function by the certainty equivalent method or gain and loss equivalence method of comparing lotteries; see e.g., Keeney and Raiffa (1976) [44].

It can be shown that the multi-period problem is composed of a series of single-period utility maximization problems, where for the last period the actual utility function is used and for all other periods the implied (through the dynamic programming algorithm) "utility-to-go" utility function is employed. Referring to the Samuelson and Merton result discussed above, for the CRRA utility function, all implied utility-to-go functions are also of the type CRRA, with the same risk aversion coefficient $\gamma$. This results in the aforementioned fixed-mix strategies.

For setting up the dynamic optimization problem, let $t=0, \ldots, T$ be discrete time periods, with T the investment horizon. Let $R_t$ be the random vector of asset returns in time periods t. Let $y_t=(y_1, \ldots, y_n)_t$ be the amount of money invested in the different asset classes $i=1, \ldots, n$ at time t. Scalars $W_0$ and $s_t$, $t=0, \ldots, T-1$, represent the initial wealth and possible cash flows (deposits positive and withdrawals negative) over time, respectively.

The following problem states the multi-period investment problem[1]:

[1]T as a superscript always means transpose, while as a subscript T always denotes the last period of the investment horizon.

$$\max E u(e^T y_T)$$

$$e^T y_0 = W_0 + s_0$$

$$-R_{t-1}^T y_{t-1} + e^T y_t = s_t, t=1, \ldots, T$$

$$y_t \geq 0, W_0, s_0, \ldots, s_{T-1} \text{ given}, s_T=0.$$

At the beginning, the initial wealth plus the cash flow ($W_0+s_0$) are invested among the n asset classes. The returns of the investment plus the next cash flow are available for investment at the beginning of the next period. At the beginning of each period during the investment horizon, the investor can freely rearrange the portfolio. At the end of the investment horizon, the final wealth in the portfolio, $W_T$, is evaluated using the utility function $u(W_T)$. Short-selling and borrowing is ruled out, but could be easily introduced into the problem. Asset n could be a risk-free asset, but is treated like any other asset, since no distinction is necessary.

Instead of maximizing the utility of terminal wealth, we could maximize the discounted utilities of wealth in each period, $$\max \sum_{t=1}^T \delta^{-t} u_t(e^T y_t),$$

where $\delta$ represents the discount factor. This concept of an additive discounted utility represents a straightforward extension and proved very useful in controlling, say, downside risk in every period. As an extension, the Kahnemann and Tversky utility could be represented in such a way.

Defining $x_t$, $t=0, T-1$ as the vector of fractions invested in each asset class in each period, we can write $x_t = y_t/(W_t+s_t)$, where we define the wealth available in each period (before adding cash flow) as $W_t$, $W_t = R_{t-1}x_{t-1}(W_{t-1}+s_{t-1})$. We can then write the model as $$\max Eu(W_T)$$

$$e^T x_t = 1, t=0, T-1$$

$$W_{t+1} = R_t x_t(W_t+s_t), t=0, \ldots, T-1$$

$$y_t \geq 0, W_0, s_0, \ldots, s_{T-1} \text{ given}, s_T = 0.$$

Here one can see that for serially independent asset returns wealth is a single state connecting one period with the next. Now we write the problem as the dynamic programming recursion $$u_t(W_t) = \max Eu_{t+1}((W_t+s_t)R_t x_t)$$

$$e^T x_t = 1$$

$$Ax_t = b, l \leq x_t \leq u,$$

where $u_T(W_T) = u(W)$, $W_{t+1} = (W_t+s_t)R_t x_t$, $W_0$ given.

One can now see that the multi-period problem is composed of a series of single-period utility maximization problems, where for the last period the actual utility function is used and for all other periods the implied (through the dynamic programming algorithm) "utility-to-go" utility function is employed.

In practice, we need to resort to Monte Carlo sampling to estimate the expected utility of the single-period utility maximizing problem of each period. Let $R_t^\omega$, $\omega \in S_t^i$, and $R_t^\omega$, $\omega \in S_t^o$, $t=1, \ldots, T-1$ be independent samples of the return distributions for each period $t$. The sample $S_t^i$ includes the in-sample returns used for generating the single-period utility maximization problems and the sample $S_t^o$ represents the out-of-sample return used for evaluating the obtained solution. Using two different samples, one for optimizing and the other for evaluating, prevents optimization bias. We represent the problem as $$\hat{\hat{u}}_t(W_t) = \max \frac{1}{|S_t^i|} \sum_{\omega \in S_t^i} \hat{u}_{t+1}((W_t+s_t)R_t^\omega x_t)$$

$$e^T x_t = 1$$

$$Ax_t = b, l \leq x_t \leq u$$

and we define $$\text{and we define } \hat{u}_t(W_t) = \frac{1}{|S_t^o|} \sum_{\omega \in S_t^o} \hat{\hat{u}}_{t+1}((W_t+s_t)R_t^\omega x_t),$$

where $\hat{u}_T(W_T) = U(W)$, $W_0$ given. We parameterize in $W_k$ to carry out the dynamic programming recursion. Note $\hat{\hat{u}}(.)$ refers to the in-sample estimate, whereas $\hat{u}(.)$ represents the out-of-sample estimate of the utility-to-go function. Depending on the sample size used, the in-sample estimate $\hat{\hat{u}}(.)$ would include a significant amount of optimization bias that consequently would be carried forward between stages, whereas the out-of-sample estimate $\hat{u}(.)$ of the portfolio decision represents an independent evaluation without any optimization bias.

The dynamic optimization problem can now be solved using a backward dynamic programming recursion, conditioning on wealth. Starting at period $T-1$ we parameterize the wealth into K discrete wealth levels, $W_{T-1}^k$, $k=1, \ldots, K$, and solve the period T-1 problem K times using sample $S_{T-1}^i$ and obtain solutions $\hat{x}_{T-1}^k$. We evaluate the obtained solutions by computing $$\hat{u}_{T-1}^k = \frac{1}{|S_{T-1}^0|} \sum_{\omega \in S_{T-1}^0} \hat{u}_T((W_{T-1}^k + s_{T-1})R_{T-1}^\omega x_{T-1})$$

and obtain for each parameterized value $W_{T-1}^k$ a corresponding value of $\hat{u}_{T-1}^k$, which pairs represent K points of the Monte Carlo estimate of the value function $(u_{T-1}(W_{T-1}))$. We interpolate between those points, using an appropriate accurate interpolation technique, to obtain a smooth functional form. The value function $u_{T-1}(W_{T-1})$ in period T-1 is the induced utility function for the period T-2 single-period optimization, and we repeat the process until all optimizations in period 1 are done. Finally, in period 0, the initial wealth is known and we conduct the final optimization using the period 1 value function as implied utility function $u_1(W_1)$. In each period in the backward recursion, we use a different independent sample of large size for the evaluation: thus, the sampling error is small and cancels out over the different rebalancing periods. The sampling-resampling procedure is a crucial part of the solution algorithm, because it prevents the dynamic recursion from carrying forward and accumulating sampling bias when solving for a large number of periods.

In the case of serial dependency of asset returns, we can extend the model and consider the return $R_t|R_{t-1}$ conditioned on the previous period return vector. For example, a vector autoregressive process (VAR(1)) of lag one would fit such a description. In this case we define $$R_t = C + AR_{t-1} + \epsilon,$$

where C is an intercept vector and A is an n×n matrix of coefficients obtained from n least-squares regressions. The problem is stated as $$u_t(W_t, R_{t-1}) = \max Eu_{t+1}((W_t+s_t)R_t|R_{t-1}x_t)$$

$$e^T x_t = 1$$

$$Ax_t = b, l \leq x_t \leq u,$$

where $$u_T(W_T) = u(W), W_{t+1} = (W_t+s_t)R_t|R_{t-1}x_t, W_0, R_{-1} \text{ given}.$$

A general lag one vector autoregressive process with n asset classes requires n+1 state variables and may exceed the limits of the stochastic dynamic programming approach. However, a restricted autoregressive process of lag one with a limited number of predicting variables may well be compuationally tractable and statistically valid. Thus using, say, three predicting variables will lead to four state variables. The resulting dynamic program can still be solved accurately in reasonable time.

For multivariate normally distributed asset returns, we can algorithmically take advantage of the fact that, for monotonically increasing concave utility functions, the optimal solution is mean-variance efficient. Instead of solving the recursive non-linear optimization problem, we can search a pre-computed set of mean-variance efficient solutions for the one maximizing the utility or value-to-go function. To maintain optimality in each stage, we need to ensure that the utility function, $u_t(W_t)$, induced from $\max E\, u_{t+1}((W_t+s_t)R_t x_t)$ given the constraints, is also a monotonically increasing concave function, as is the utility function $u(W)$ at the end of the investment horizon. The dynamic programming based proof of this theorem is omitted. Defining $\eta_{k,t}$ as the return distribution of the kth allocation point $(\mu_{k,t}, \sigma_{k,t})$ on the mean-variance efficient frontier in period t, i.e., $\eta_{k,t}=N(\mu_{k,t}, \sigma_{k,t})$, we can write the dynamic programming recursion as $$u_t(W_t)=\max_k E u_{t+1}((W_t+s_t)\eta_{k,t})$$

where $u_T(W_T)=u(W)$, $W_{t+1,k}=(W_t+s_t)\eta_{k,t}$, $W_0$ given.

An effective search is used to speed-up the optimization by avoiding having to evaluate all distributions $\eta_{k,t}$. The work required for this recursion is independent of the number of assets and, like the general recursion above, linear in the number of stages.

This fast approach is very well suited for solving the problem with a restricted autoregressive return process, where the error terms of the restricted vector autoregression are assumed distributed as multivariate normal.

For estimating the asset return distributions, we used historical monthly time series from January 1974 to December 2004 for stocks and from January 1986 to December 2004 for bonds, based on the data available from the Datastream Access database. Stocks were classified into US Stocks (represented by the MSCI US index) and international stocks (represented by the MSCI EAFE&C index). Bonds were distinguished into US Corporate Bonds (represented by the Salomon Brothers US Corp Bnd index) and US Gvnt Bonds (represented by the GP Morgan US Gov Bnd index). For cash we used 3 month Treasury notes (represented by the GP Morgan US 3M index). For obtaining the i.i.d. distributions, we estimated the correlation matrix using directly the historical data points for each time series from January 1986 to December 2004. We estimated separate correlation matrices for representing normally and lognormally distributed returns. The estimates for the correlation matrices and the means and standard deviations are presented in Table 1. However, for corporate bonds we lowered the historical expectation of 9.49% to 9.0% per annum, reflecting a more appropriate number, since expected corporate bond returns appeared as too high during this period and were overly dominating stocks.

In addition to using the historical mean returns directly, we also estimated a constant growth rate for each asset class. By fitting a constant growth rate to the data we accounted for the dips at the beginning and end of the time series of stock returns. Using a linear regression on the $1+\ln(R_{i,t}^C)$ compounded returns, the least square problem $$\min(a_i+b_i t-1-\ln(R_{i,t}^C))^2$$

results in an intercept $a_i$ and a coefficient $b_i=(1+\ln(\bar{r}_i))$, from which the growth rate of $\bar{r}_i$ for each asset class i can be obtained. (The latter could be used as forward-looking unconditional expected returns.)

Assuming either normal or lognormal asset returns distributions does not take into account properly the higher moments of the joint return distributions of the asset classes. We therefore used a bootstrapping procedure to capture the true co-movements of the asset classes. In order to do so, we subtracted from each historical time series its historical mean and divided by its historical standard deviation to obtain the vector of residuals $\epsilon_t$. With $\bar{r}^H$ and $\sigma^H$ representing the historical vectors of means and standard deviations, respectively, and $\epsilon_t=(R_t-\bar{r}^H)/\sigma^H$, the returns distribution is represented as $R_t=\bar{r}+\sigma\epsilon_t$. For generating one yearly return observation via the bootstrapping scheme, we sampled 12 independent observations with replacement from the historical monthly residuals, and combined them into a corresponding yearly return by compounding, multiplying by the standard deviation, and adding the (forward looking unconditional) mean. For the discussion below we used the more conservative historical mean estimates, rather than the one obtained by the regression, and the variances were estimated directly from the monthly historical time series.

We remark that estimating the means of stock returns, given the data at hand, may not be very accurate. For example, our estimates for the annual means based on 374 monthly historical data have an estimated standard deviation of about 2.8%. Estimates of standard deviations and correlations are more accurate. The regression procedure provides a good way to estimate means. The regression results for stocks, while larger than the historical estimates, are within the confidence interval obtained for the historical mean estimates.

For the effect of estimation errors on optimal portfolio choice see, e.g., Chopra and Ziemba (1993) [13] and on turnover Chopra (1993) [14], showing that estimation errors in the means have a significantly larger effect than estimation errors in the variances and co-variances. Simulating estimation error by adding zero mean i.i.d normal distributions to the data, and comparing certainty equivalent cash (wealth) in a single-period mean-variance optimization of 10 randomly selected stocks of the Dow Jones industrial average, for a risk tolerance of 50, errors in the mean estimate resulted in a 11 times larger loss of certainty equivalent cash as errors in the variances, and errors in the variances resulted in 2 times larger loss than errors in the covariances. The effects were shown to increase with increasing risk tolerance and with increasing magnitude of errors. Already earlier, Kallberg and Ziemba (1981) [40] and (1984) [42] concluded that errors in the mean estimate matter most. The effect of errors in the estimates of means relative to variances and covariances on certainty equivalent wealth obviously must increase with larger risk tolerance, since at a risk tolerance of zero, where only variances and covariances enter the optimization problem, exclusively errors in variances and covariances matter, and at an infinite risk tolerance, where only means enter the optimization problem, exclusively errors in mean estimates have an influence. Michaud (1989) [52] showed that noisy forecasts in mean-variance optimization may lead to suboptimal portfolios, where assets with positive estimation error in the mean forecasts are significantly over-weighted and assets with negative estimation error are significantly under-weighted in the "optimal" portfolio, and proposed an approach based on re-sampling (bootstrapping) to counteract this effect. As a practical approach to counter estimation error, Connor (1997) [16] proposed for linear regression based forecasting models to use Bayesian adjusted priors to shrink mean estimates with large observed estimation errors.

A different approach for obtaining unconditional means is to use an assumed mean-variance efficient portfolio, e.g., a broad index, and to infer the unconditional means from the standard deviations of returns, by viewing the portfolio as the optimal solution of a corresponding mean-variance problem with an appropriate risk aversion coefficient. This procedure of Grinold (1999) [29] is called "grapes from wine", and represents an efficient way to calibrate mean returns. Besides estimating standard deviations based on historical time series, also implied volatilities based on observed option prices could be used.

In order to demonstrate dynamic investment policies obtained from our dynamic portfolio choice model, we discuss as an illustrative example a very typical investment situation. An investor has a current wealth of $100 k and plans to contribute $15 k per year for the next 20 years. What is the distribution of wealth at the end of the investment horizon, reflecting various reasonable assumptions about the investor's risk aversion profile? We discuss four cases: (A) using the CARA utility function, (B) using increasing relative risk aversion but decreasing absolute risk aversion, (C) using decreasing relative risk aversion and decreasing

TABLE 1

Data Estimates for normal and log normal distributions

|  | US Stocks | Int Stocks | Corp Bnd | Gvnt Bnd | Cash |
|---|---|---|---|---|---|
| Historical means and standard deviations |  |  |  |  |  |
| Mean | 10.80 | 10.37 | 9.49 | 7.90 | 5.61 |
| STD | 15.72 | 16.75 | 6.57 | 4.89 | 0.70 |
| Regression-based means and standard deviations |  |  |  |  |  |
| Mean | 14.1 | 12.5 | 9.24 | 7.92 | 5.77 |
| STD | 15.72 | 16.75 | 6.57 | 4.89 | 0.70 |
| Correlation matrix for normal model |  |  |  |  |  |
| US Stocks | 1.00 | 0.601 | 0.247 | 0.062 | 0.094 |
| Int Stocks | 0.601 | 1.00 | 0.125 | 0.027 | 0.006 |
| Corp Bnd | 0.247 | 0.125 | 1.00 | 0.883 | 0.194 |
| Gvnt Bnd | 0.062 | 0.027 | 0.883 | 1.00 | 0.27 |
| Cash | 0.094 | 0.006 | 0.194 | 0.27 | 1.00 |
| Correlation matrix for log-normal model |  |  |  |  |  |
| US Stocks | 1.00 | 0.609 | 0.236 | 0.05 | 0.083 |
| Int Stocks | 0.609 | 1.00 | 0.124 | 0.02 | −0.002 |
| Corp Bnd | 0.236 | 0.124 | 1.00 | 0.884 | 0.195 |
| Gvnt Bnd | 0.05 | 0.02 | 0.884 | 1.00 | 0.271 |
| Cash | 0.083 | −0.002 | 0.195 | 0.271 | 1.00 | absolute risk aversion, and (D) using a quadratic penalty of under-performing a target.

Figure 4B:
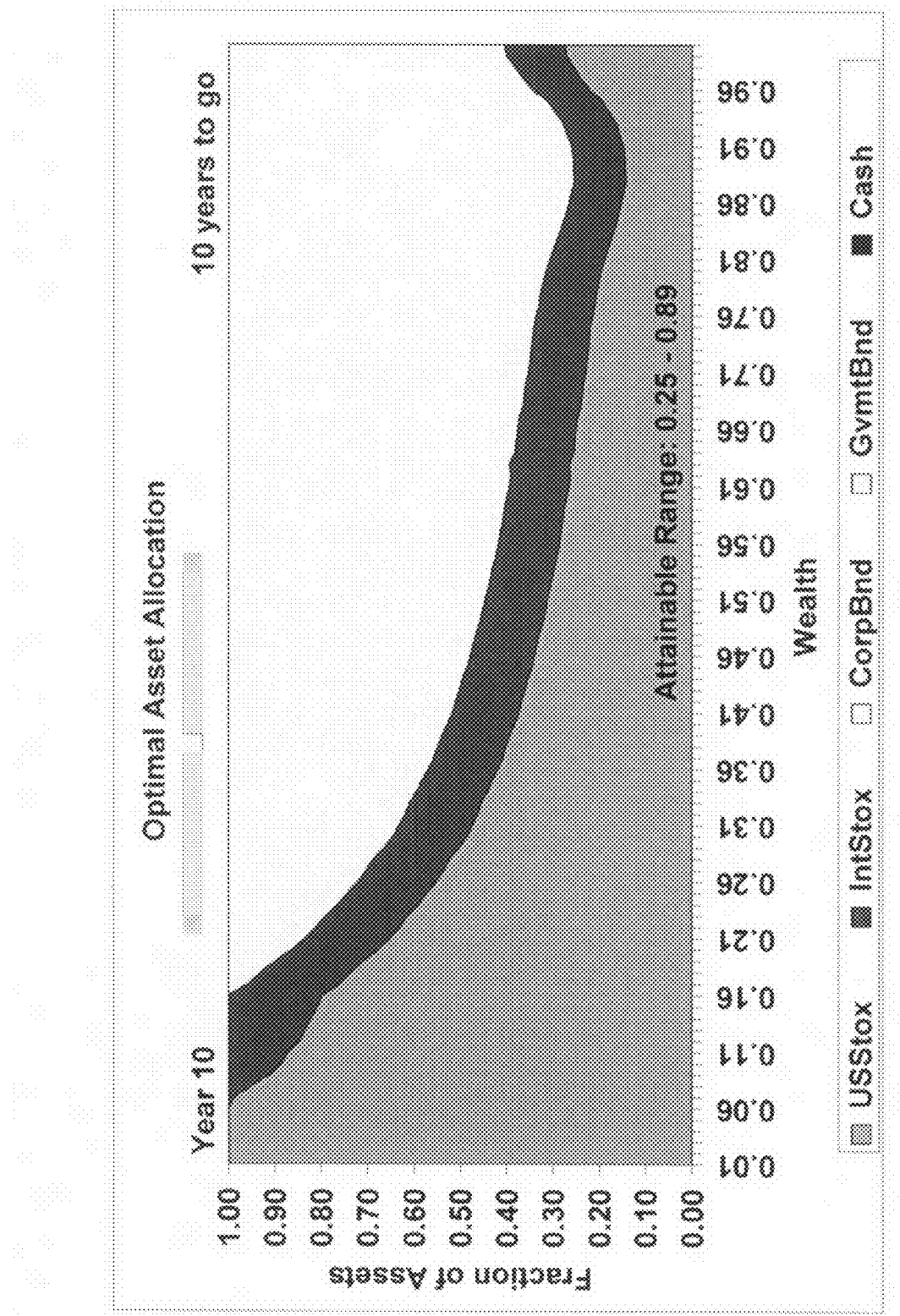
Figure 4C:
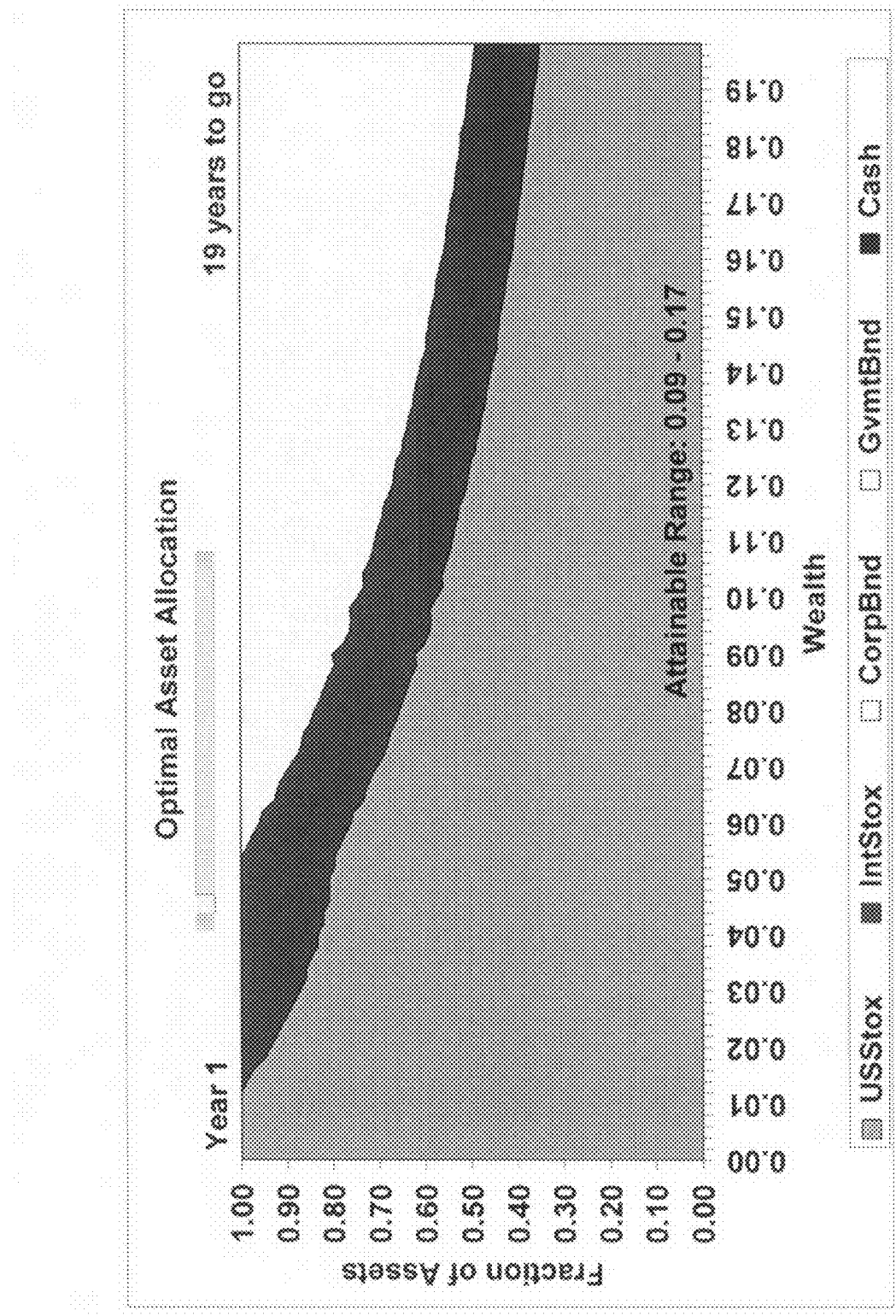

For the exponential utility function (case A), we assumed an absolute risk aversion coefficient of $\lambda=2$. FIG. 4 presents the optimal asset allocation (as a function of wealth) at various times, e.g., for one year (top), 10 years (middle) and 19 years (bottom) to go. The optimal asset allocation is not constant but varies significantly with the investment horizon and the wealth already accumulated. The case of one year to go is special because it shows the results for different wealth levels of a single-period optimization with the investor's original utility function. All other period allocations represent the result for using the implied utility function from the dynamic programming algorithm. In the last rebalancing period, the more money that is in the investor's account the less risk he/she takes, and accordingly the fraction of stocks decrease with increasing account value. When the account is under-performing a certain wealth level the optimal strategy prescribes to invest entirely in stocks, where the amount to be put internationally versus domestically varies with account value. This may be a significant strain on the investor, but the problem could be corrected by using a constraint restricting the maximum exposure to stocks. If there was no borrowing constraint, we know from analytical solutions for HARA policies that the optimal investment would prescribe for low wealth levels to borrow funds and use this money to buy more than 100% stocks, thus attempting to leverage the funds available. However, this would not be practical in a low-wealth situation, since such a strategy would quickly exceed margin requirements and thus would not be implementable. This demonstrates the importance of considering a borrowing constraint as part of the investment problem.

The dependence of the optimal asset allocation on wealth changes every year, as one can see by comparing the optimal asset allocation for only one year to go with the ones for 10 years to go and for 19 years to go. For very high wealth levels and long remaining horizons (e.g., 19 years to go) a small amount of cash enters the optimal portfolio. FIG. 4 for the optimal asset allocation strategy also displays the attainable wealth range, obtained by simulation. The attainable range is defined by the wealth that is exceeded (left) or not exceeded (right) with 99.9% probability, respectively. For example, in year 19 the attainable range is between $0.55 and $3.21 million, in year 10 between $0.25 and $0.89 million, and in year 1 (after the first year of investment) between $0.09 and $0.17 million, including the cash flow at the beginning of the period.

Figure 5A:
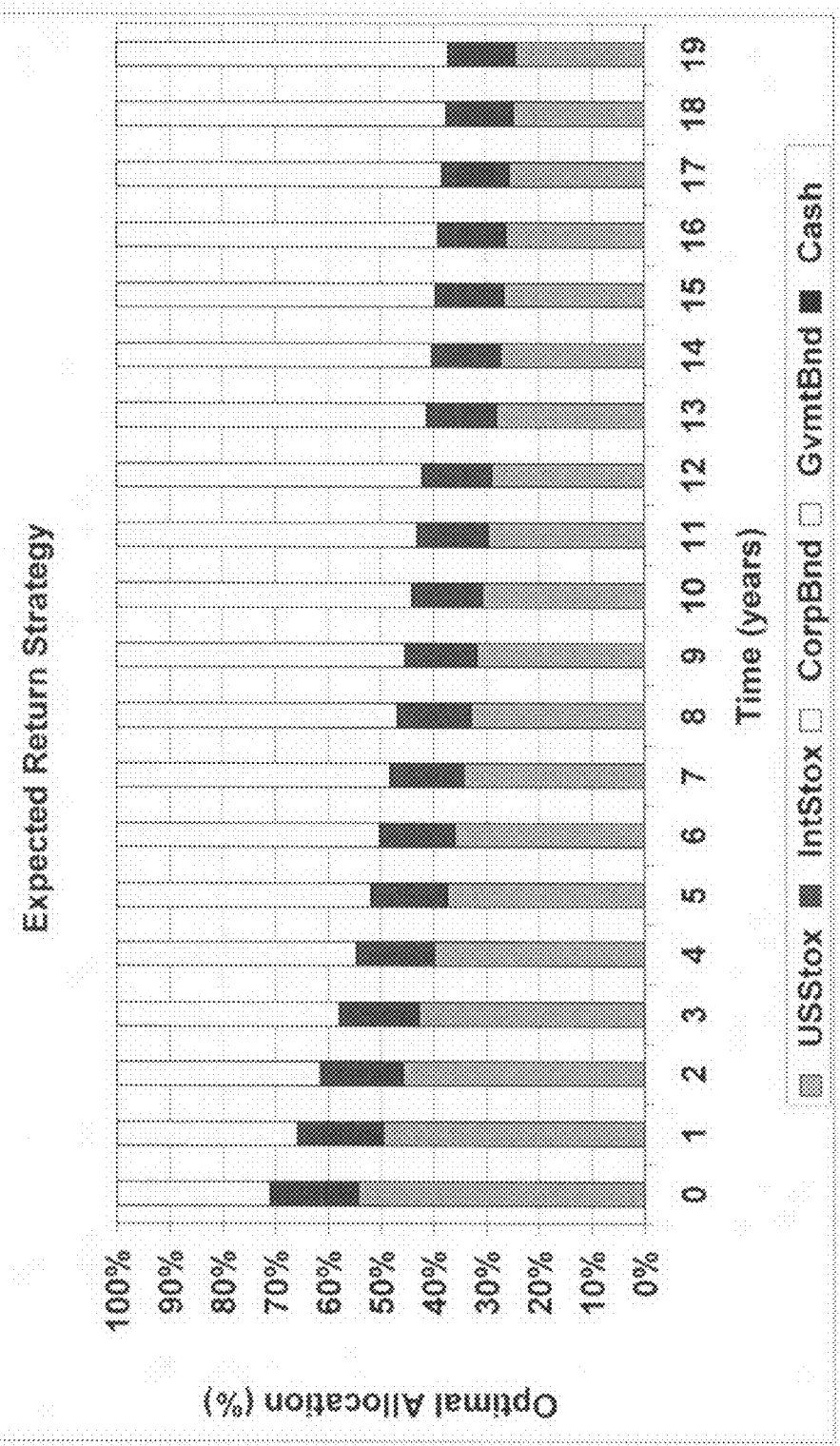
FIG. 5 illustrates the investment example of initial $100 k plus $15 k per year, 20-year horizon with exponential utility and depicts the simulations.
Figure 5B:
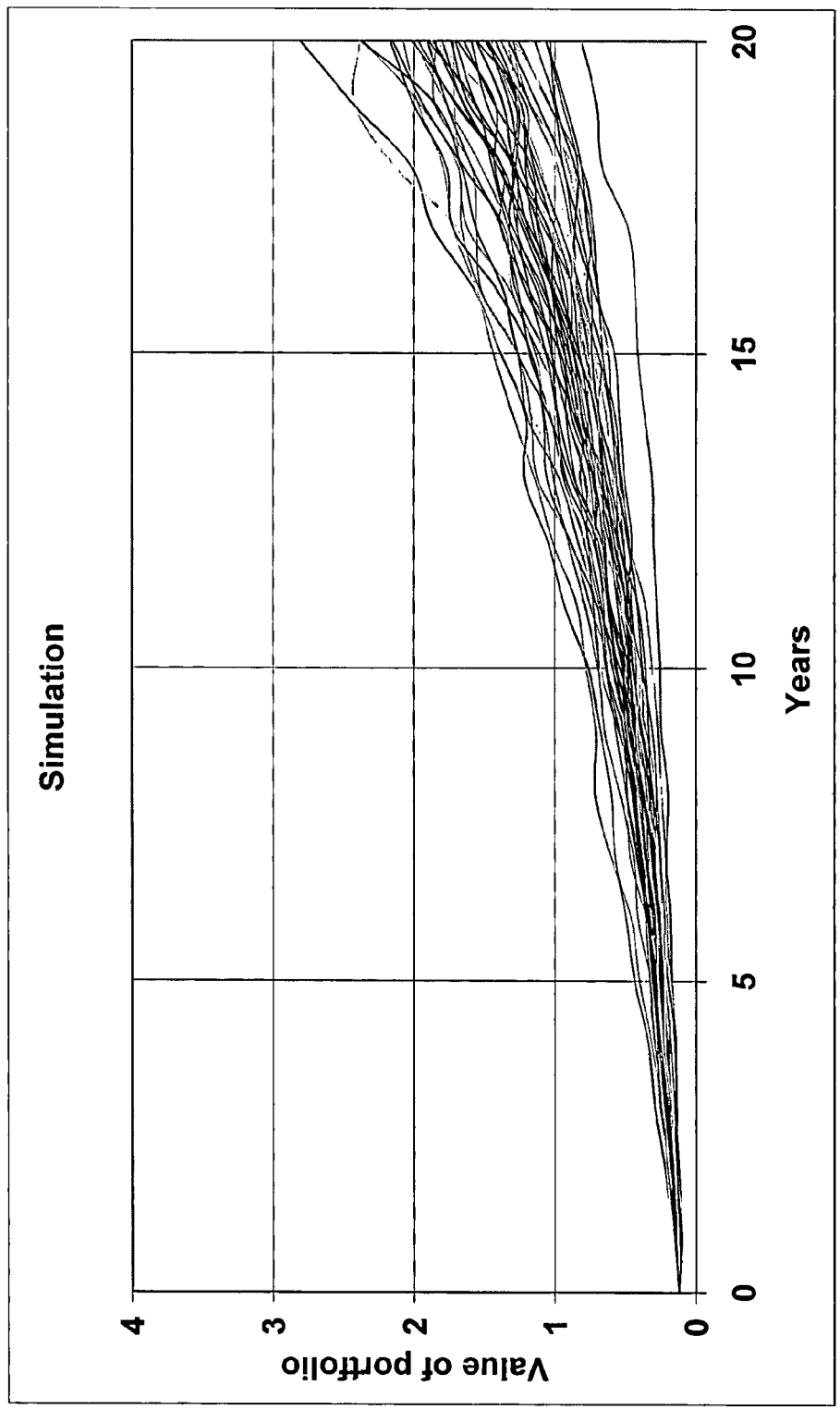
Figure 5C:
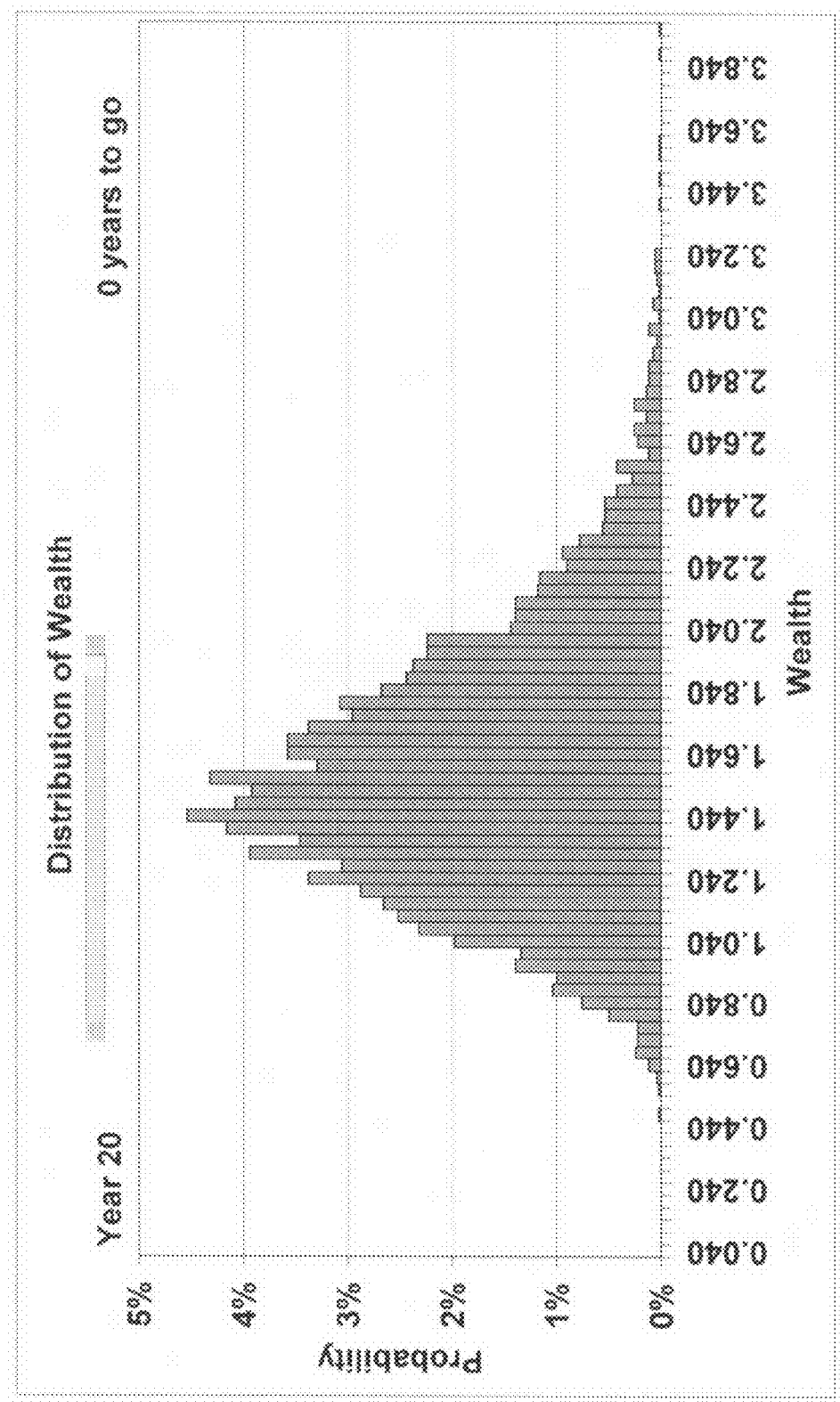

FIG. 5 (top) represents the expected value strategy, i.e., the optimal investment strategy implemented over time, assuming every year that the expected returns would be realized. At (the current) period zero, the optimal portfolio is 54% US stocks, 17% international stocks, and 29% corporate bonds. Cash and government bonds are not part of the initial portfolio. One can observe that from the optimal allocation at the outset of approximately 71% stocks and 29% bonds, the allocation changes gradually to approximately 37% stocks and 63% bonds at year 19, when the last portfolio decision is to be made. This path is similar to strategies that investment firms tend to prescribe their clients and recently have been implemented as life-cycle funds. The reasoning behind such strategies is to reduce stock allocation as the investment horizon shortens to prevent a possible significant loss without a good prospect of recovery before the end of the investment horizon. However, the strategies of practitioners and life-cycle funds are different to our dynamic strategy in that they do not react to prior performance. We can also view the dynamic strategy by starting from the expected value path, where stock allocation and risk is reduced as the remaining investment horizon shortens. In each period the stock allocation and the risk is reduced if the performance was better than expected (and thus the available wealth is larger), and the stock allocation and the risk is increased if the performance was worse than expected (and thus the wealth is smaller).

FIG. 5 depicts (in the middle) the out-of-sample simulations of wealth over time and (at the bottom) the resulting marginal distribution of wealth at the end of the investment horizon. Table 2 summarizes the statistics of wealth obtained at the end of the investment horizon. The mean wealth is $1.564 million, with a standard deviation of $0.424 million. With 99% probability a wealth of $770,000 is exceeded and with 95% probability a wealth of $943,000. The certainty equivalent wealth is $1.412 million.

Alleged shortcomings of the exponential utility function (constant absolute risk aversion) include that very high stock allocations at very low wealth levels may lead to a too-high risk burden on the investor, and a too-small relative risk aversion at very high wealth levels may lead to overly conservative asset allocations. While both shortcomings can be compensated for with lower and upper bounds on the stock allocation, another way is to model the proper risk aversion of the investor directly.

For the increasing relative risk aversion utility function (case B), we assumed that at a wealth below $W_L=0.25$, the relative risk aversion is $\gamma=2$, increasing linearly with wealth to $\gamma=3.5$ at a wealth of $W_U=3.5$ and then remaining at that level for larger wealth levels. This profile of relative risk aversion was modeled using the piecewise exponential utility representation discussed above, using 200 exponential (CARA) pieces between $W_L$ and $W_U$, and CRRA pieces for wealth levels below $W_L$ and above $W_U$. Besides increasing relative risk aversion, the function exhibits decreasing absolute risk aversion, since the absolute risk aversion decreases from 8 at $W_L$=0.25 to 1 at $W_U$=3.5, and the adjacent CRRA pieces also represent decreasing absolute risk aversion.

Figure 6A:
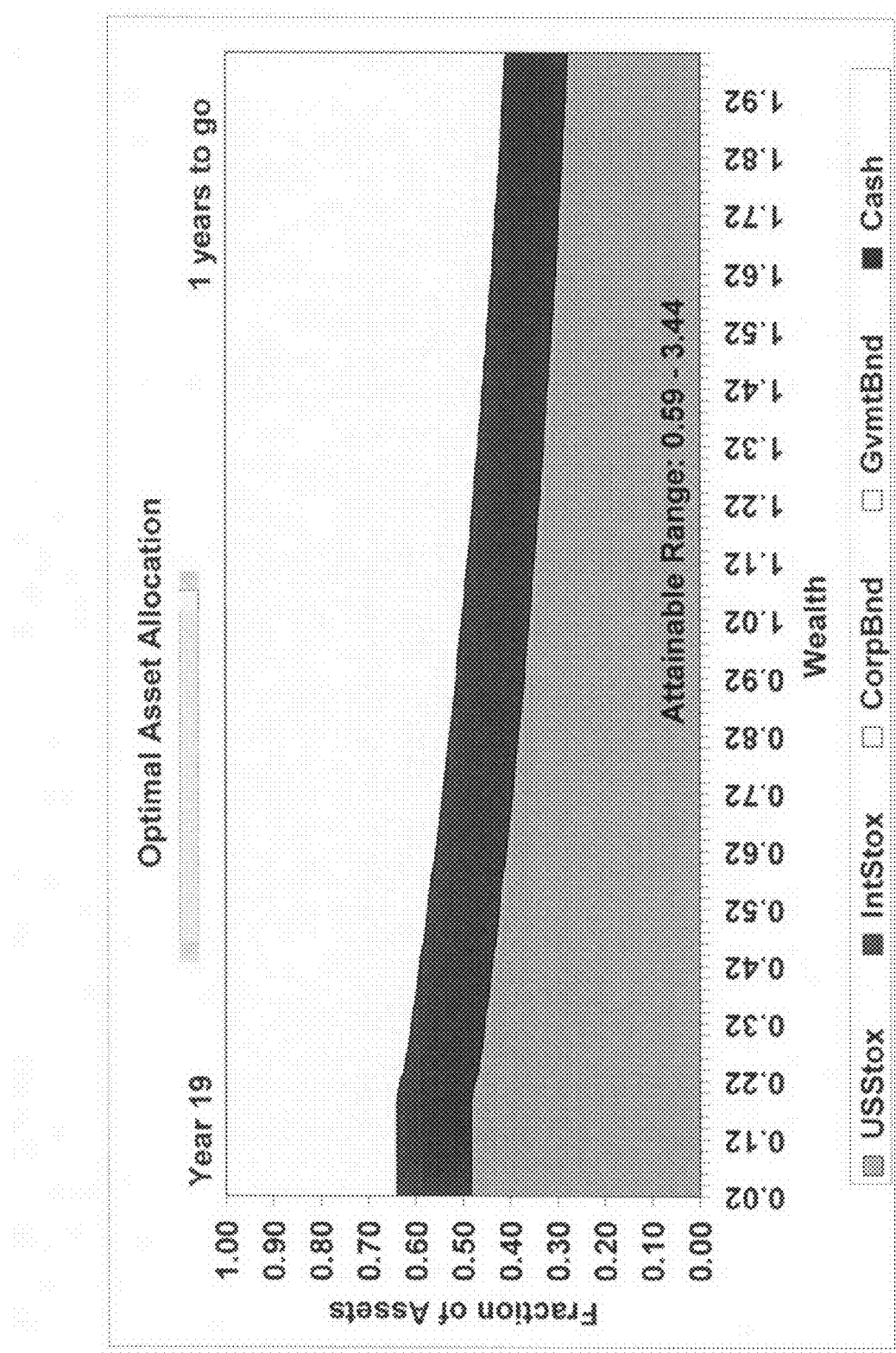
FIG. 6 illustrates the investment example of initial $100 k plus $15 k per year, 20-year horizon with increasing relative risk aversion and depicts the investment strategy.
Figure 6B:
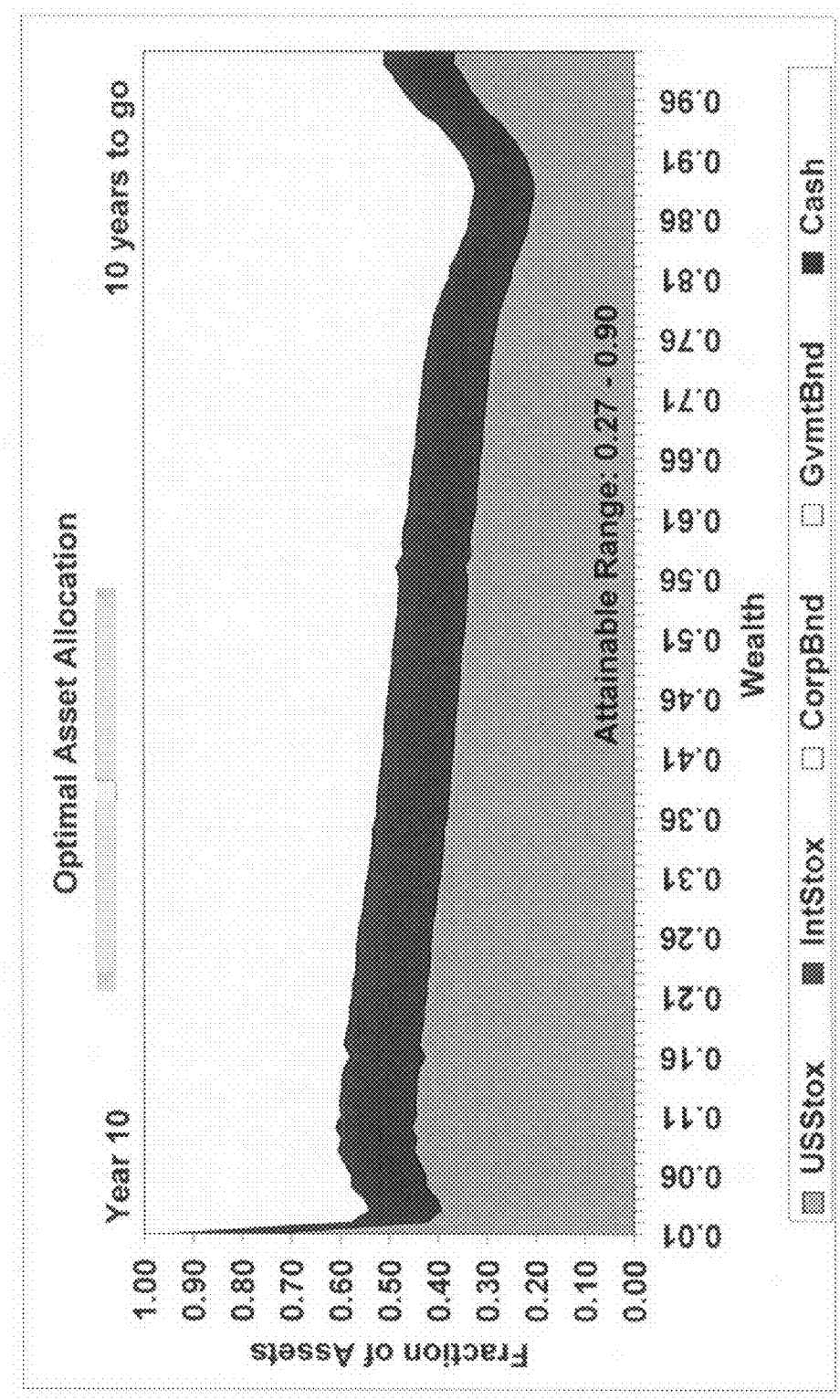
Figure 6C:
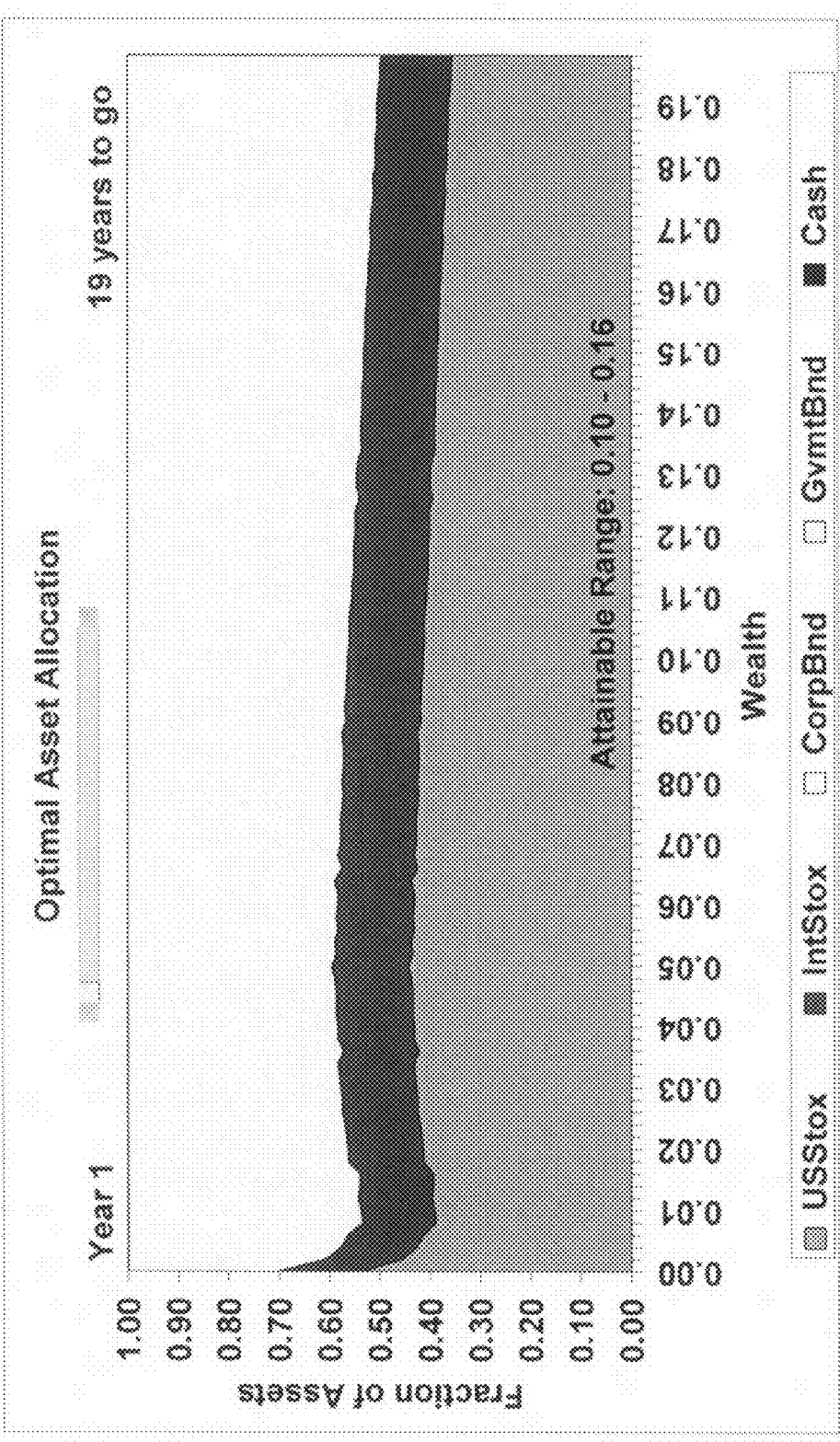

The results for increasing relative risk aversion are similar to the ones for the exponential case, but do not display the aforementioned shortcomings of the exponential utility function. The allocation of stocks at low levels of wealth are reasonable, with a maximum at about 64%, and the stock allocation at very high wealth levels does not become as conservative as in the exponential case. Again, the optimal strategies depend both on wealth level and remaining investment horizon, as FIG. 6 presents for one year (top), ten years (middle) and 19 years (bottom) to go. The assumption of a relative risk aversion bounded between 2 and 3.5 is reflected in the flat response to changes in wealth levels. FIG. 6 also presents the attainable wealth in year 19 between $0.59 and $3.44 million, in year 10 between $0.27 and $0.90 million, and in year 1 between $0.10 and $0.16 million.

Figure 7A:
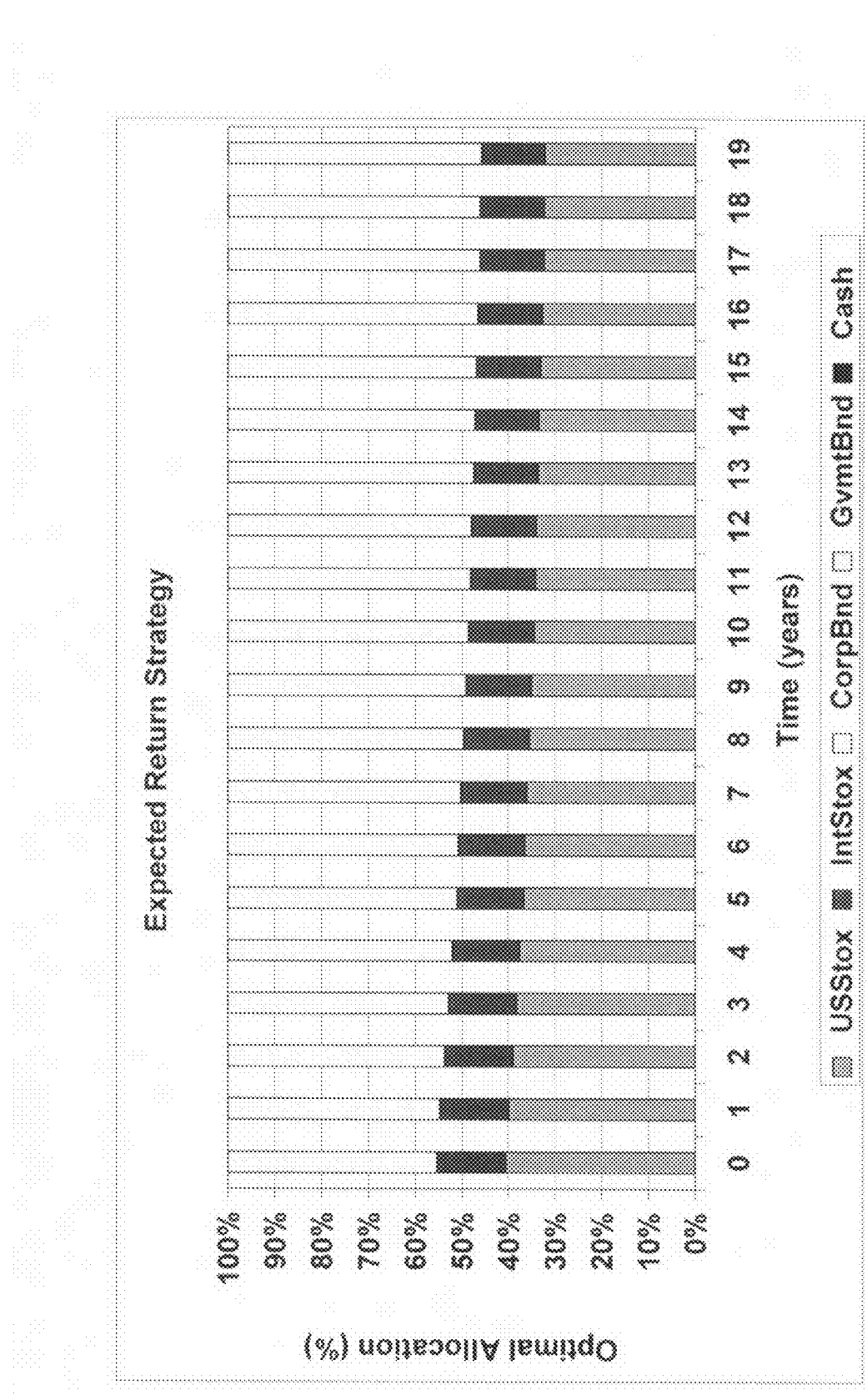
FIG. 7 illustrates the investment example of initial $100 k plus $15 k per year, 20-year horizon with increasing relative risk aversion and depicts the simulations.
Figure 7B:
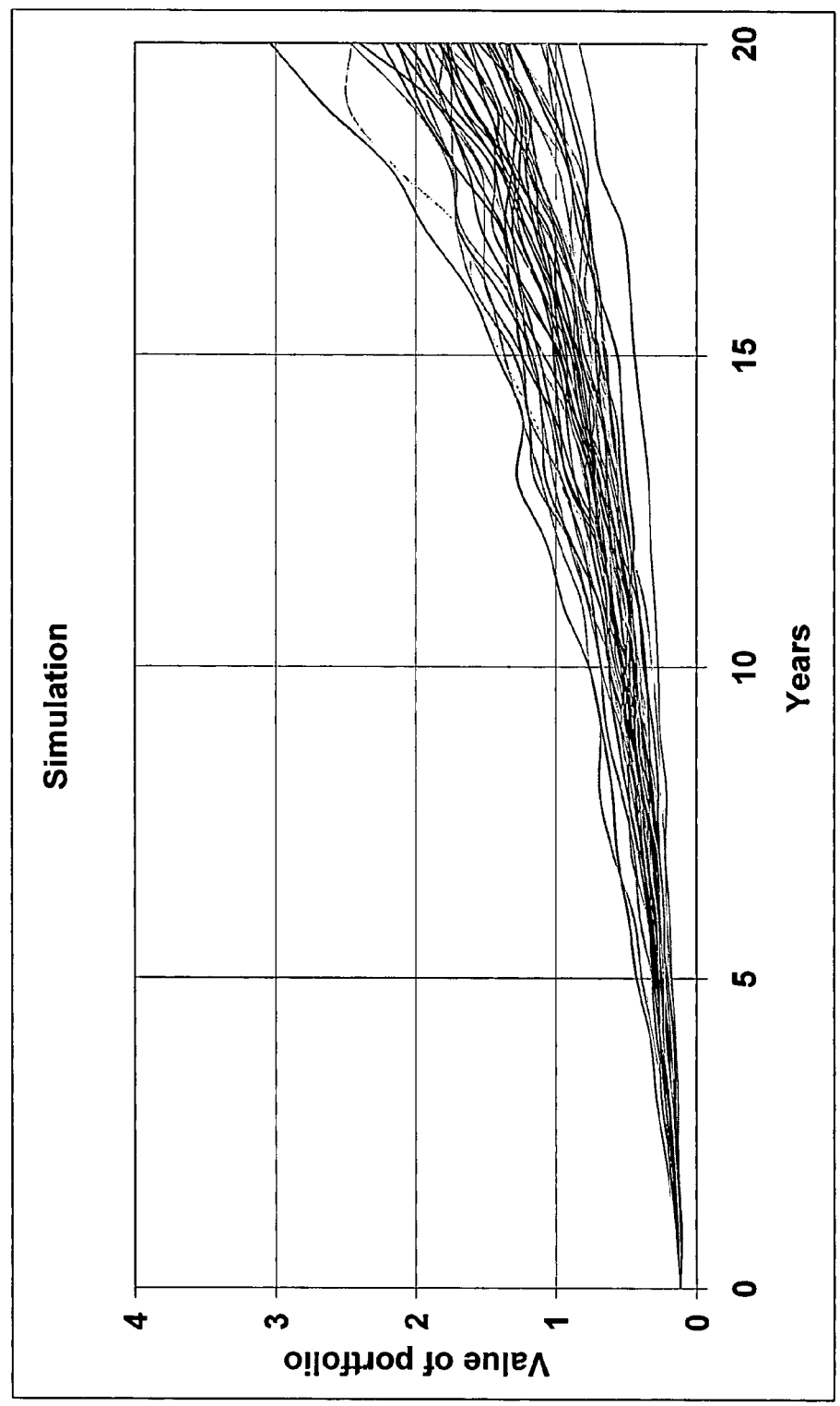

FIG. 7 represents the expected value strategy (top), the out-of-sample simulation of wealth (middle), and the marginal wealth distribution (bottom). The initial investment is 41% US stocks, 15% international stocks, and 44% corporate bonds. As in the exponential utility case above, government bonds and cash are not in the optimal initial portfolio. The expected value strategy calls for an initial optimal stock allocation of about 56%, to be decreased gradually to about 46% the last decision period. Again, we can describe the dynamic strategy in terms of deviation from the expected value strategy. The optimal dynamic strategy calls for a larger stock allocation and more risk compared to the expected value strategy in the case of under-performance (and therefore lower wealth) and smaller stock allocations and less risk in the case of out performance (and therefore larger wealth). The maximum and minimum stock allocation and the associated risk of the portfolio are within reasonable limits, which makes the increasing relative risk aversion strategy very practical for investors wishing to become more conservative at higher levels of wealth.

Not surprisingly, the out-of-sample results in FIG. 7 (middle) are very similar to the exponential case in FIG. 5 (middle) before. For the increasing relative risk aversion strategy, the mean wealth obtained at the end of the investment horizon is $1.575 million with a standard deviation of $0.452 million. With 99% probability a wealth of $771,000 is exceeded and with 95% probability a wealth of $937,000. The certainty equivalent wealth is $1.44 million. The similar return results compared to the exponential utility case, combined with and the lack of undue risk exposure, underlines the practicability of the increasing relative risk aversion strategy.

Figure 8A:
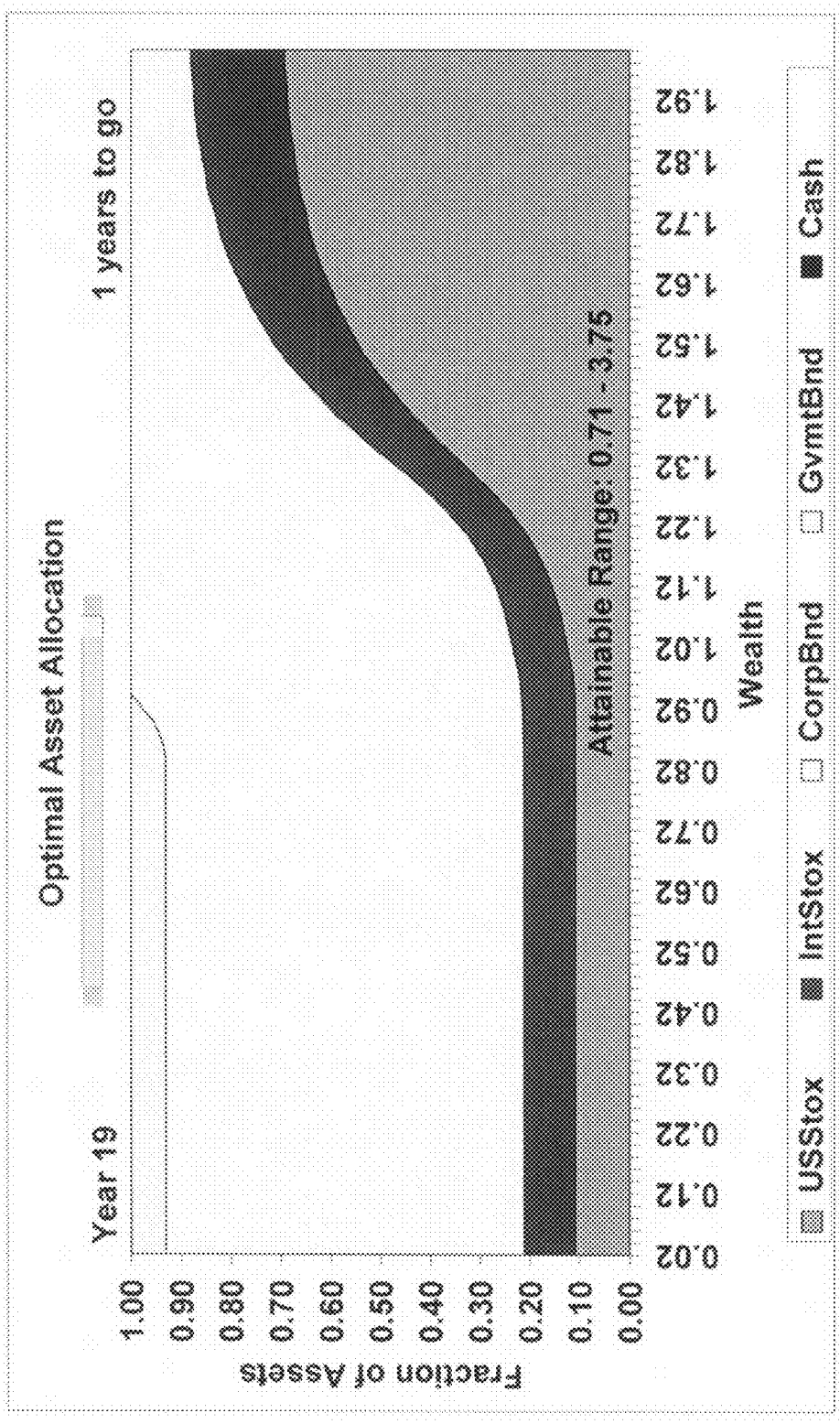
FIG. 8 illustrates the investment example of initial $100 k plus $15 k per year, 20-year horizon with decreasing relative risk aversion and depicts the investment strategy.
Figure 8B:
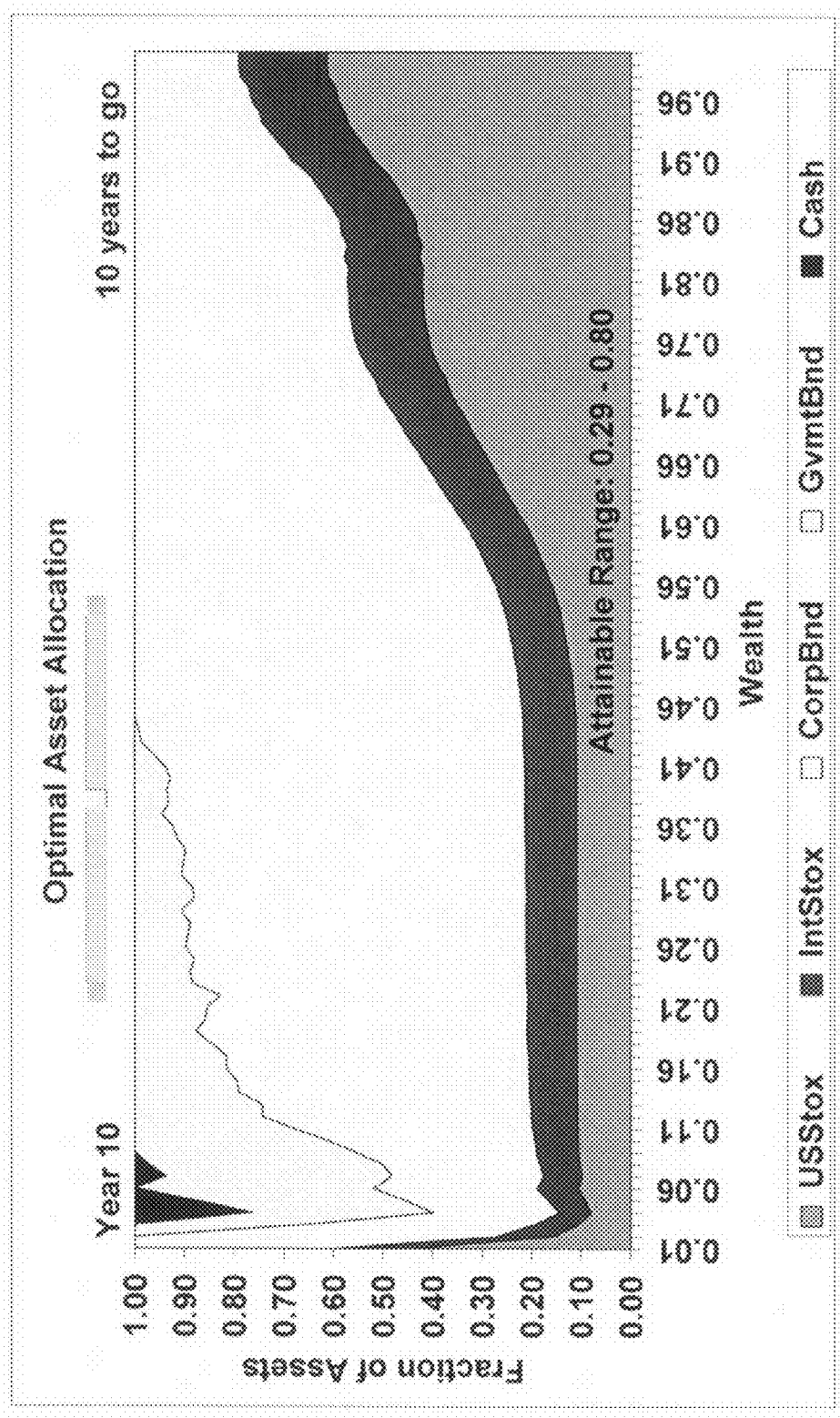
Figure 8C:
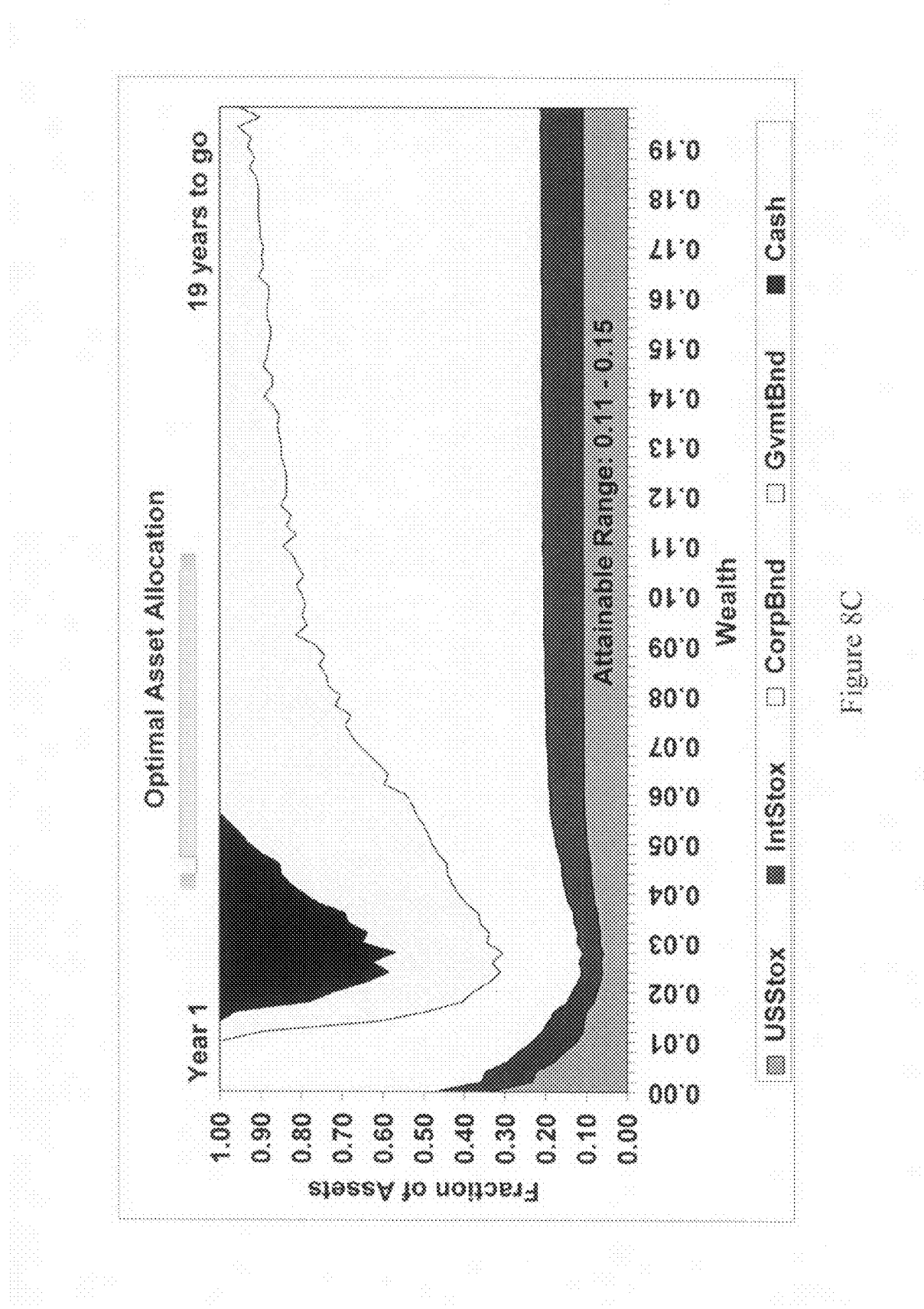

Next, as case (C), we discuss decreasing relative risk aversion, which implies also decreasing absolute risk aversion. We assume that the relative risk aversion is high at $\gamma$=8.0 below a wealth of $W_L$=1.0 and decreases linearly to a low relative risk aversion of $\gamma$=1.01 for wealth levels of $W_H$=1.5 and above. An investor exhibiting this utility function becomes increasingly less risk averse with increasing wealth, but is very risk averse at low levels of wealth. This type of utility function is for investors who want to hedge the downside, e.g., wish not to under-perform a wealth of about $1 million at the end of the investment horizon. FIG. 8 shows the optimal strategy for this utility function for one (top), 10 (middle) and 19 (bottom) years to go. The optimal asset allocation in the last decision period (one period to go) reflects the risk aversion profile: at small levels of wealth the stock allocation is small at about 21% and increases to about 87% stocks at higher levels of wealth. Again, the asset allocation changes with the remaining investment horizon and wealth, where the point of low stock allocations shifts towards higher wealth levels as the remaining investment horizon decreases and the change of allocation becomes less gradual. We also observe very conservative investments at very low wealth levels, but these are out of the range of wealth that can be reasonably obtained. The initial portfolio is 11% US stocks, 10% international stocks, 60% corporate bonds, and 19% government bonds. Cash is not part of the initial portfolio. The expected value strategy in FIG. 9 (top) shows that the stock allocation and thus the risk increases with time starting from about 21% stocks at the initial investment up to 50% stocks at the last decision period in year 19. This reflects the investor's profile as a time path, where he/she is careful at low levels of wealth, but becomes increasingly less risk averse as wealth grows over time. Relative to the expected value path, the strategy prescribes in each period to increase the stock allocation and the risk if the performance was better than expected (and more wealth than expected is available) and to reduce the stock allocation and risk if under-performance occurred (and less wealth than expected is available). FIG. 8 presents the attainable wealth in year 19 between $0.71 and $3.75 million, in year 10 between $ 0.29 and $0.80 million, and in year 1 between $0.11 and $0.15 million.

Figure 9A:
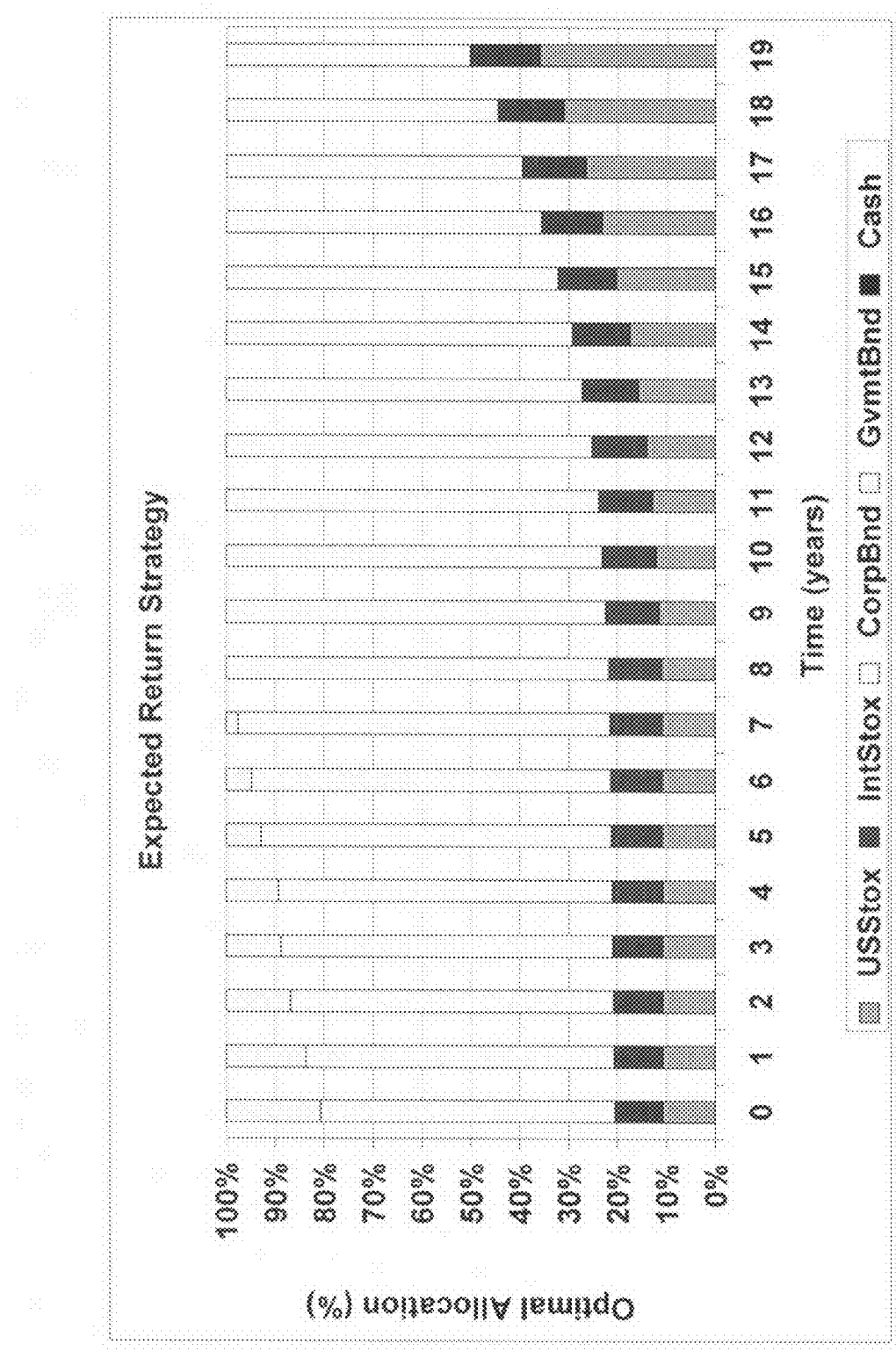
FIG. 9 illustrates the investment example of initial $100 k plus $15 k per year, 20-year horizon with decreasing relative risk aversion and depicts the simulations.
Figure 9B:
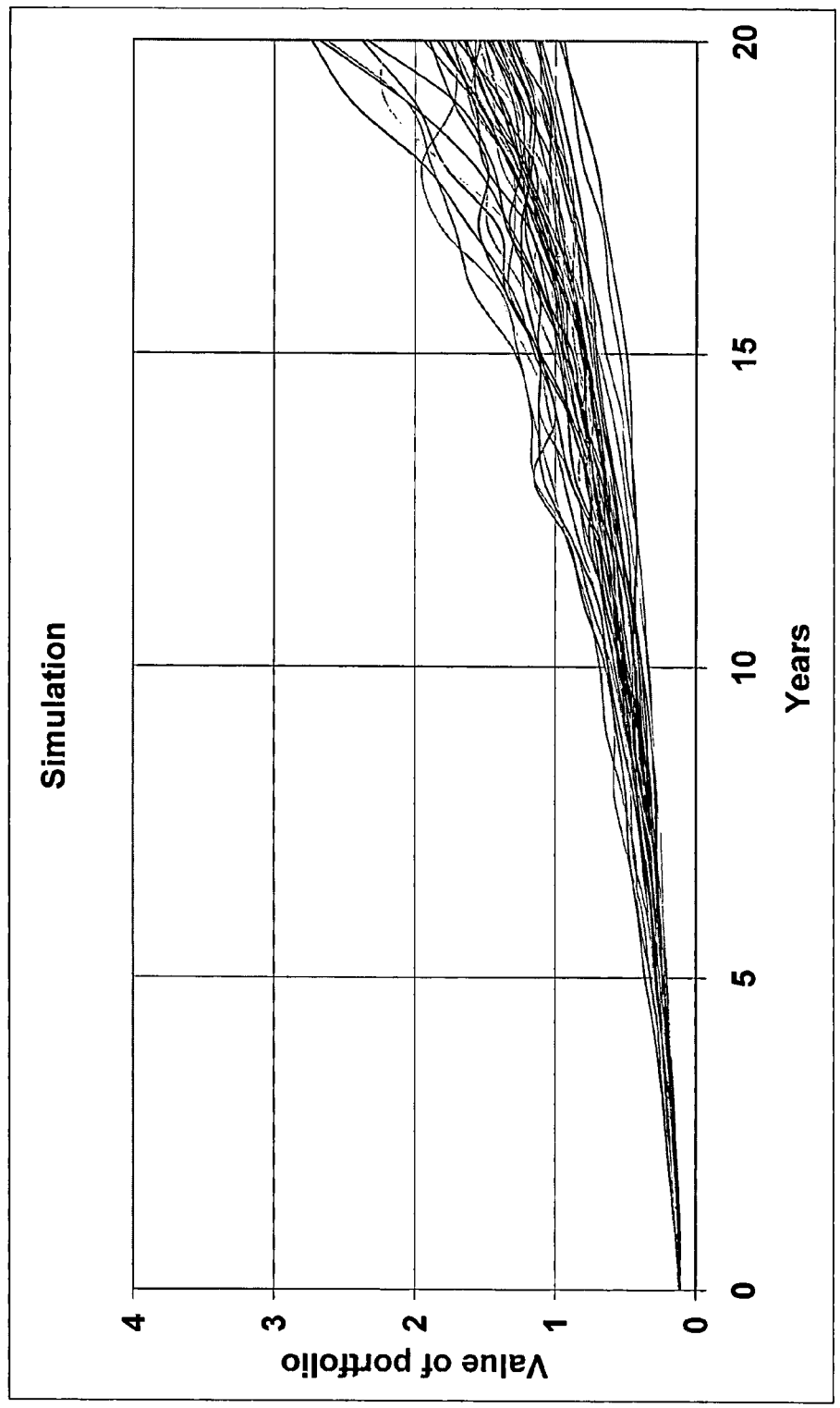
Figure 9C:
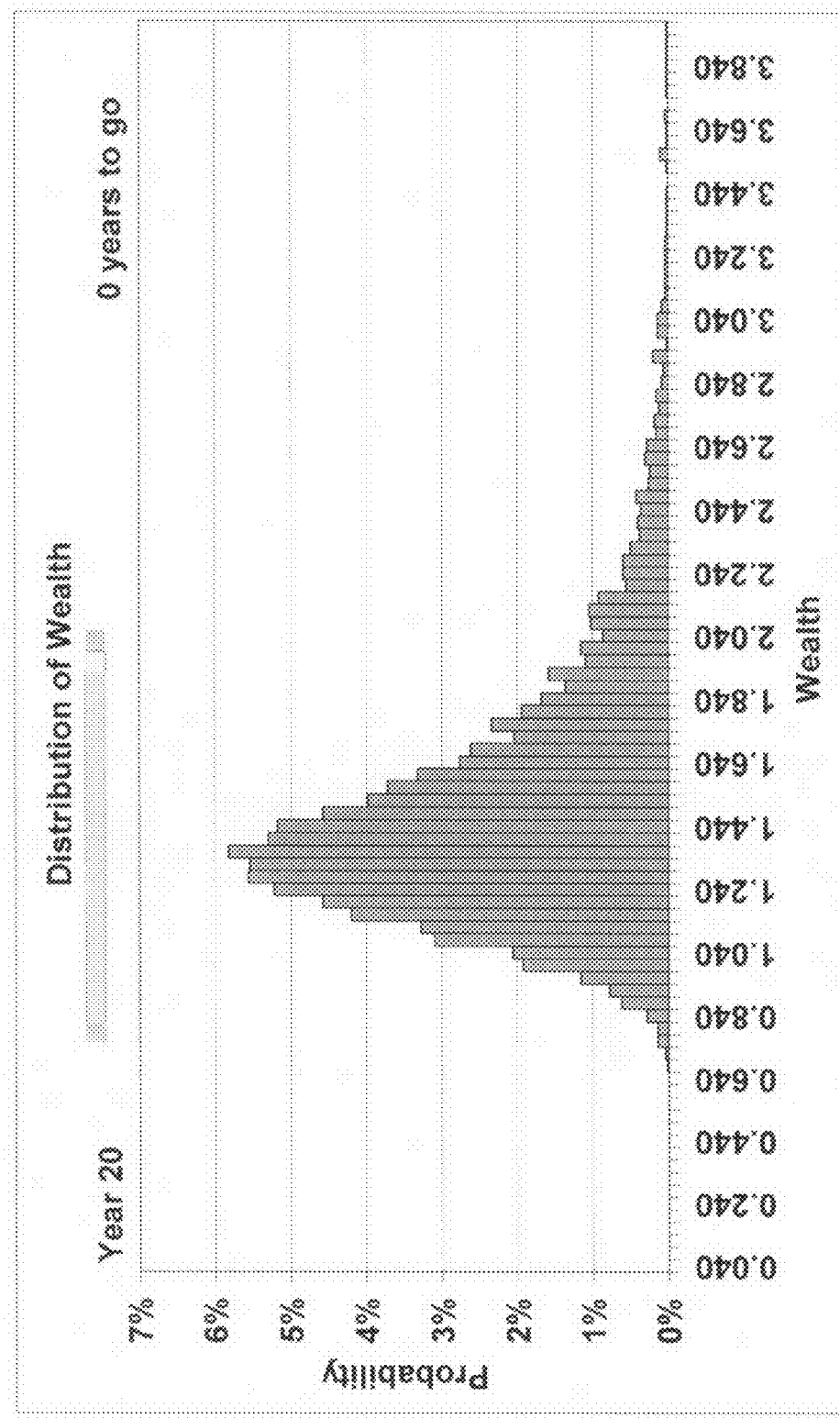

FIG. 9 (in the middle) gives the out-of-sample simulation results, and (at the bottom) the marginal distribution of terminal wealth. In both views, one can observe that the downside is more protected than in the previous cases. The mean wealth obtained at the end of the investment horizon is $1.498 million with a standard deviation of $0.436 million. With 99% probability a wealth of $866,000 is exceeded and with 95% probability a wealth of $998,000. These are reasonable out-of-sample results for an investor wishing to protect his/her downside below $1 million. The certainty equivalent wealth is $1.339 million (Table 2).

The optimal dynamic strategies for increasing and decreasing relative risk aversion behave in a mirrored way. Assuming a crash in the stock market occurred, we can deduce that an investor with increasing relative risk aversion would react by increasing the stock allocation in order to make up for the loss, while the investor with decreasing relative risk aversion would reduce his/her stock allocation in order to further protect the downside. And we know that an investor with constant relative risk aversion (CRRA) would re-balance after the crash back to his/her original asset allocation. We may use this theoretical behavior to help infer the type of utility function that is most appropriate for an investor.

Figure 10A:
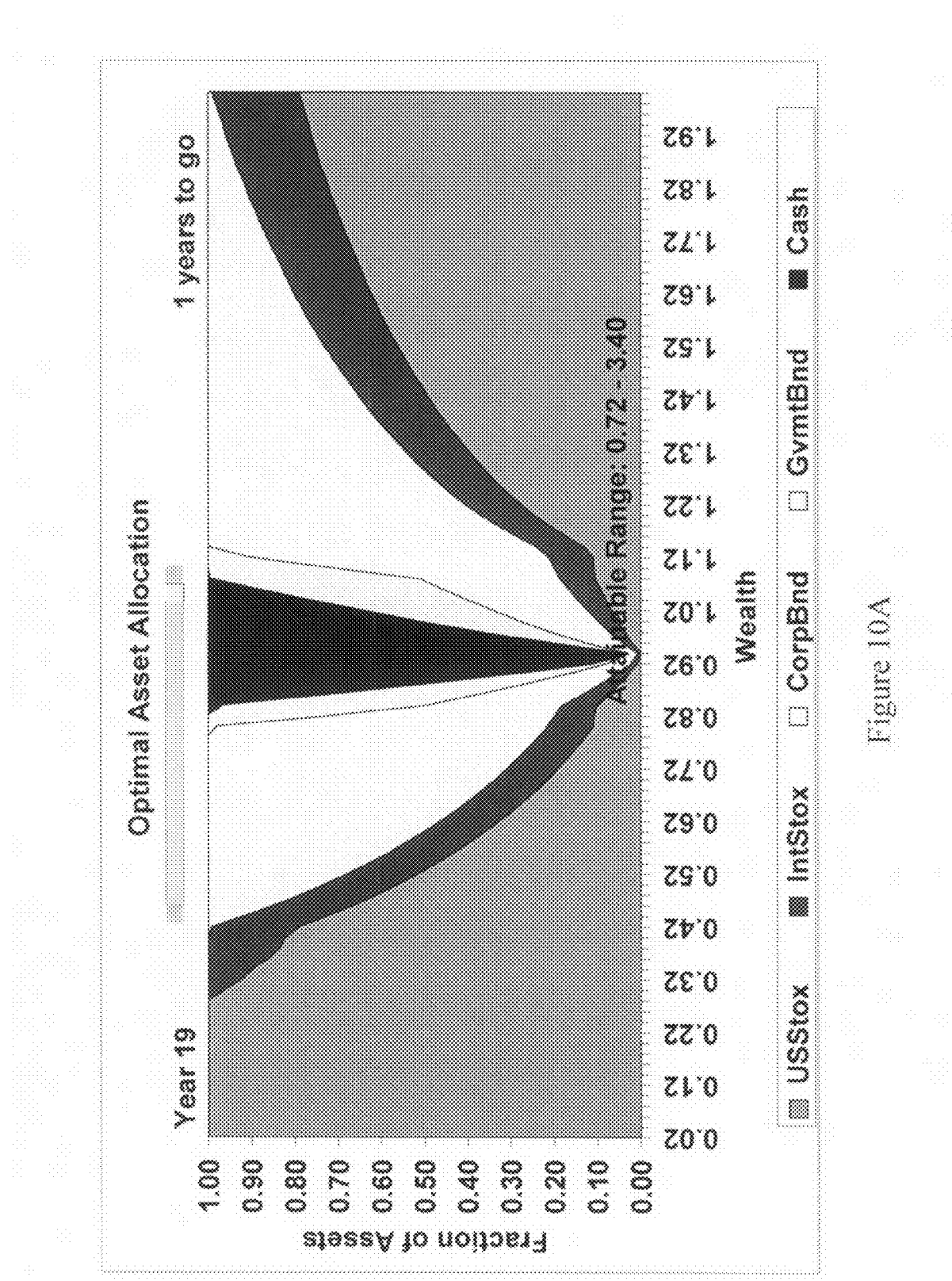
FIG. 10 illustrates the investment example of initial $100 k plus $15 k per year, 20-year horizon with quadratic utility and depicts the investment strategy.
Figure 10B:
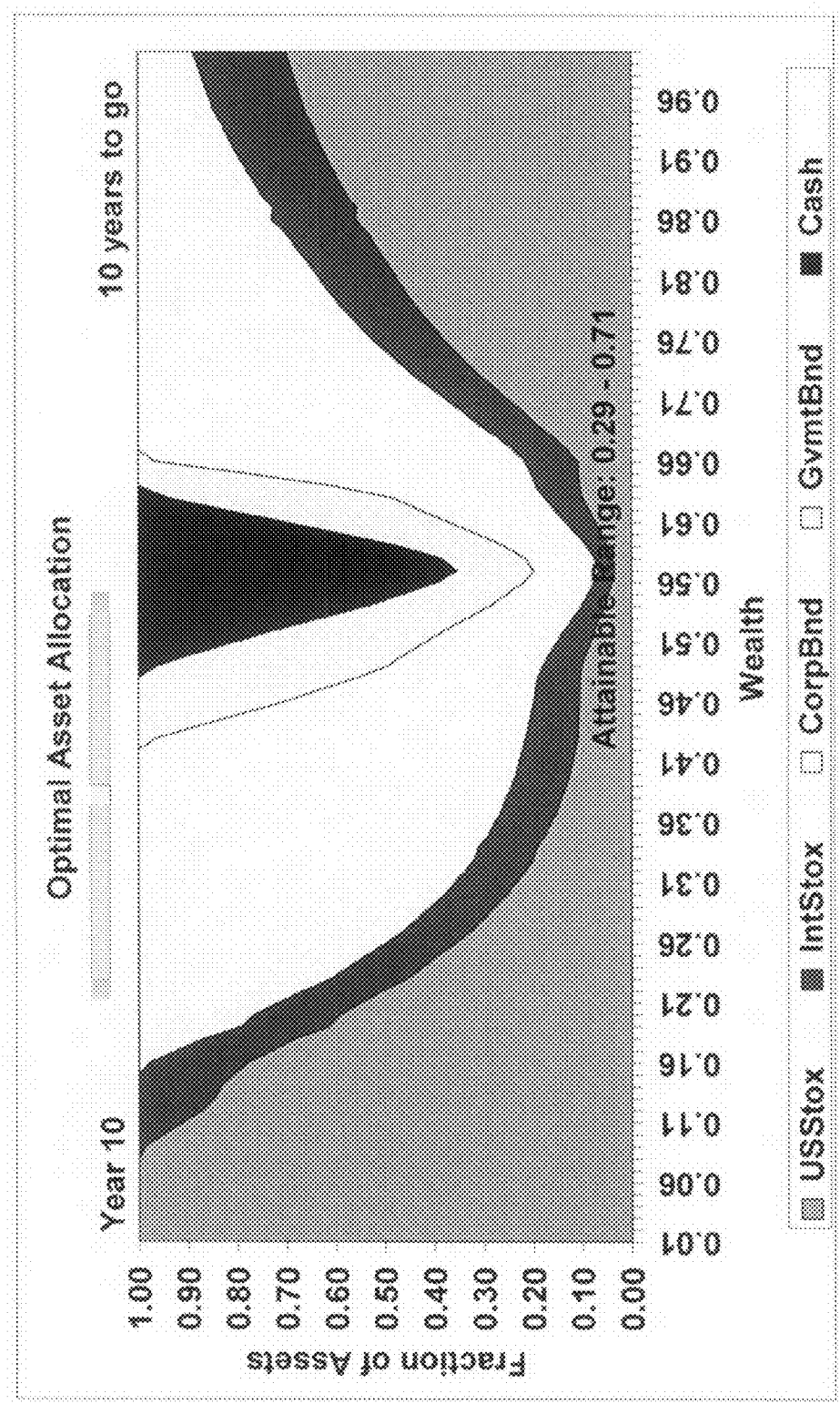
Figure 10C:
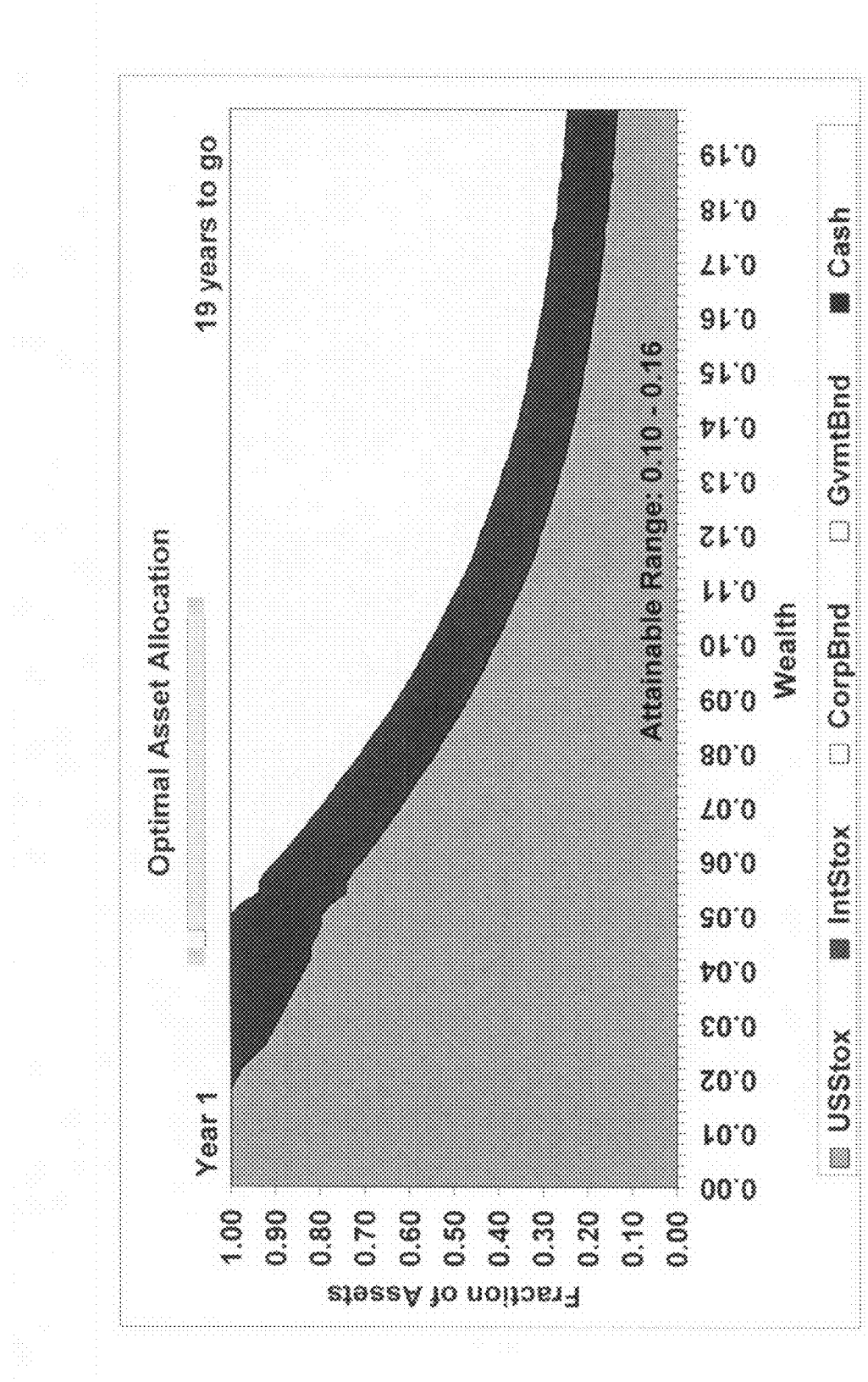

Case (D) reflects risk as a quadratic penalty of under-performing a target wealth. We assumed a target wealth of $1M and traded off risk and expected return using a risk aversion of $\lambda_q/2$=1000. This is an extreme case reflecting an investor wishing to obtain a wealth of $1 million very badly and therefore being prepared to forsake a significant part of the upside. FIG. 10 presents the dynamic investment strategy for one (top), ten (middle) and 19 (bottom) years to go. Looking at the last rebalancing period, the optimal strategy reflects an increasing stock allocation for higher levels of wealth, starting slightly below the target wealth. This "critical" wealth level is where the target can still be reached with very high probability. Reducing wealth from large values, the closer we are to this critical wealth level, the more conservative the investment becomes, up to putting almost the entire portfolio into cash. For wealth levels above the target, stock allocations increase with increasing wealth up to 100%. For wealth levels below the critical level, the strategy becomes more risky with decreasing wealth, with stock allocations also rising up to 100%. This behavior reflects exactly the risk aversion represented by the quadratic downside utility function. For wealth levels above the target, the linear term (representing zero risk aversion) is dominant and leads to increased stock allocations up to 100 percent. For wealth levels below the critical point, the quadratic part of the utility function is dominant. Penalizing under-performance quadratically leads to a relative risk aversion that decreases with larger under-performance and thus increases with larger wealth. Therefore, the quadratic utility function reflects increasing relative risk aversion below the critical wealth and decreasing relative risk aversion above. With longer remaining investment horizons the critical point of reaching the target shifts to the left, and the allocation at that point becomes less conservative. With ten years to go, the critical wealth level is at about $0.58 million and the allocation is at about 65% cash. Interestingly, with 19 years to go, the reachable wealth levels are all below the critical point and the strategy is entirely one of decreasing relative risk aversion, calling for stock allocations from about 60% at low levels of wealth following a bad first year to 30% after an out-performing first year. FIG. 10 represents the attainable wealth in year 19 between $0.72 and $3.40 million, in year 10 between $0.29 and $0.71 million, and in year 1 between $0.10 and $0.16 million.

The initial portfolio is 36% US stocks, 14% international stocks, and 50% corporate bonds. Government bonds and cash are not part of the initial optimal portfolio. The expected return strategy in FIG. 11 (top) confirms this result. Starting at an initial stock allocation of 50%, the stock allocation is reduced gradually through year 13 and then increased from year 14 on. Given the savings rate and the results from the investments, the investor first starts in an under-performing state, then achieves the critical wealth level during year 14, and ends above the critical wealth.

Figure 11A:
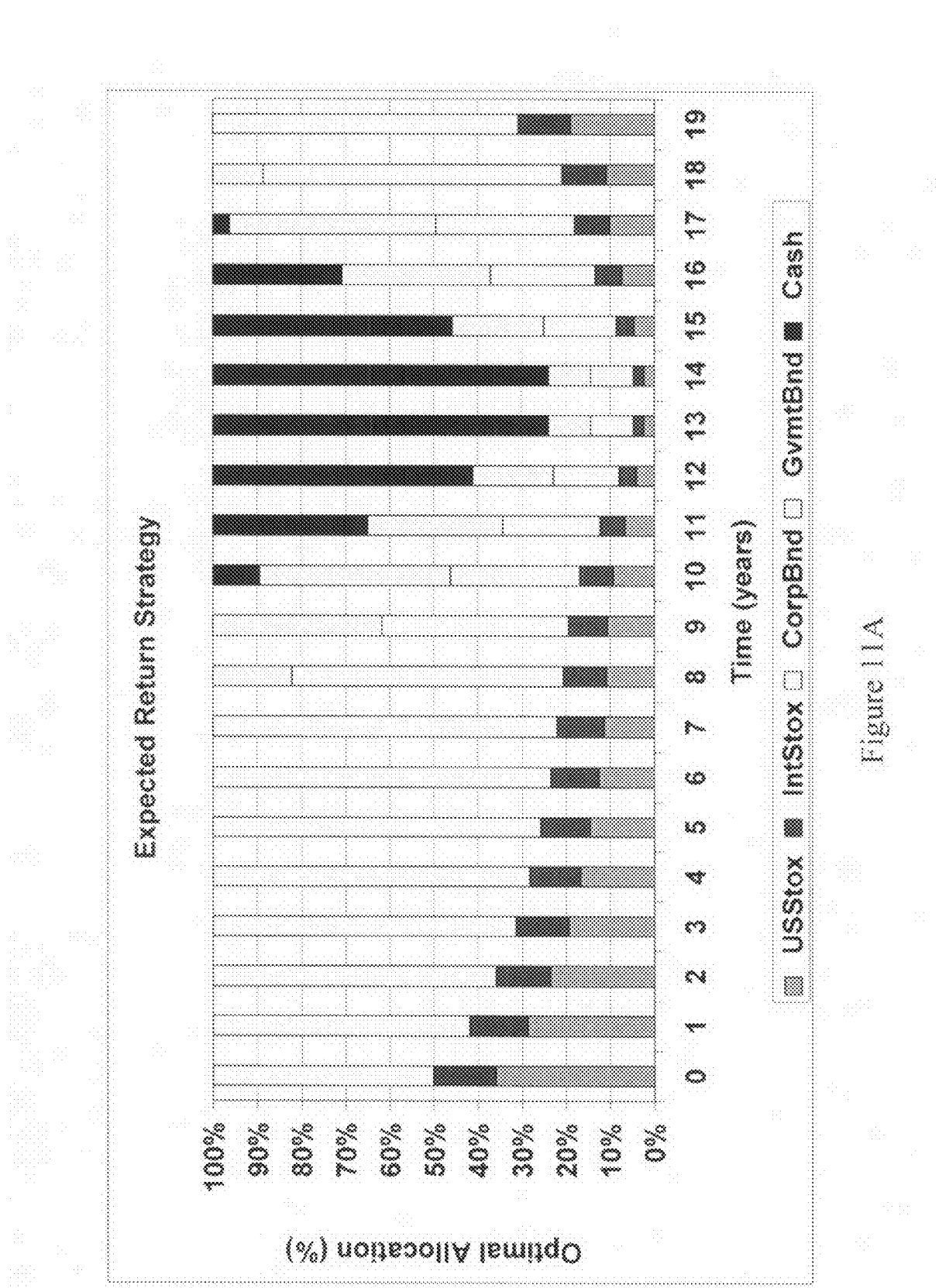
FIG. 11 illustrates the investment example of initial $100 k plus $15 k per year, 20-year horizon with quadratic utility and depicts the simulations.
Figure 11B:
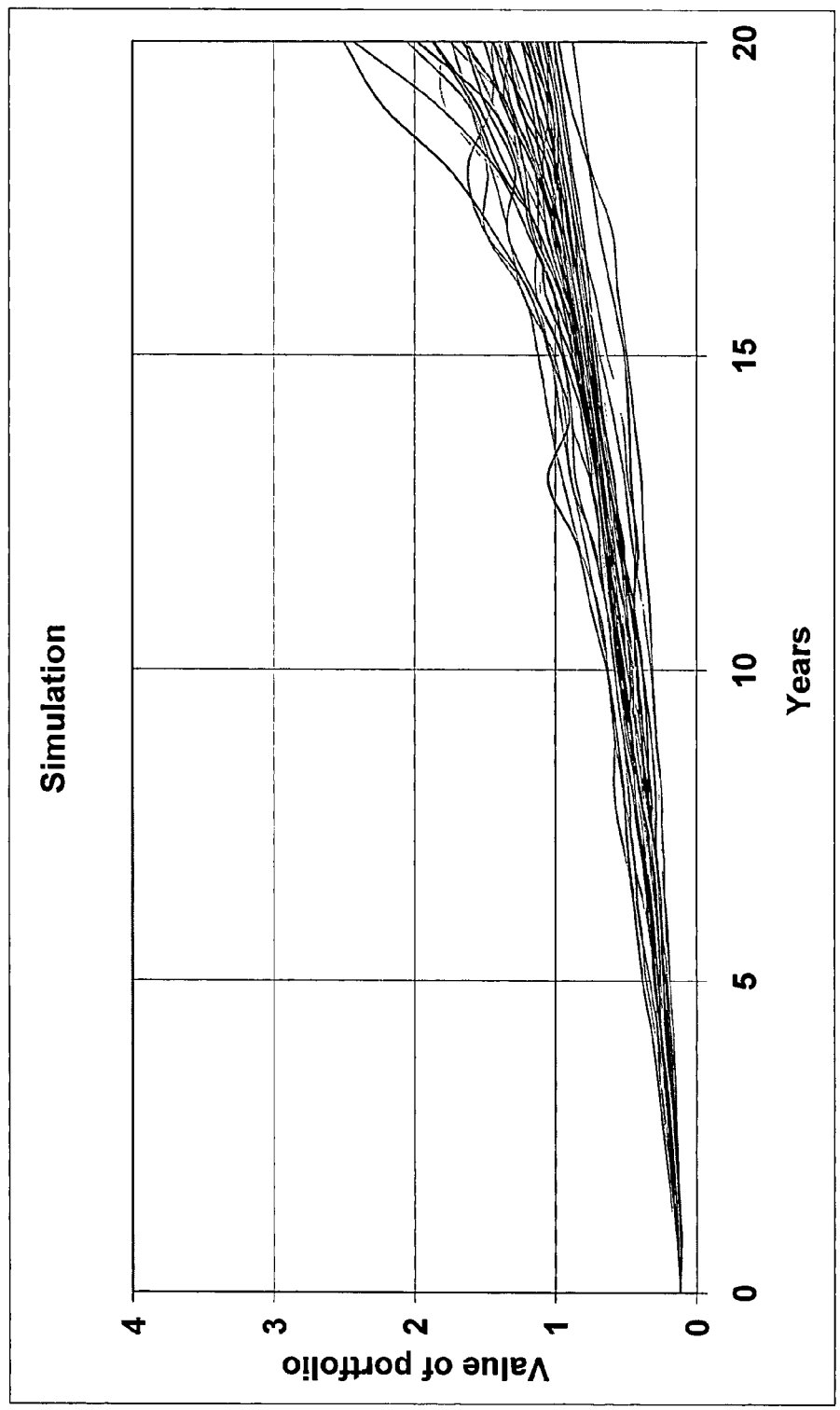
Figure 11C:
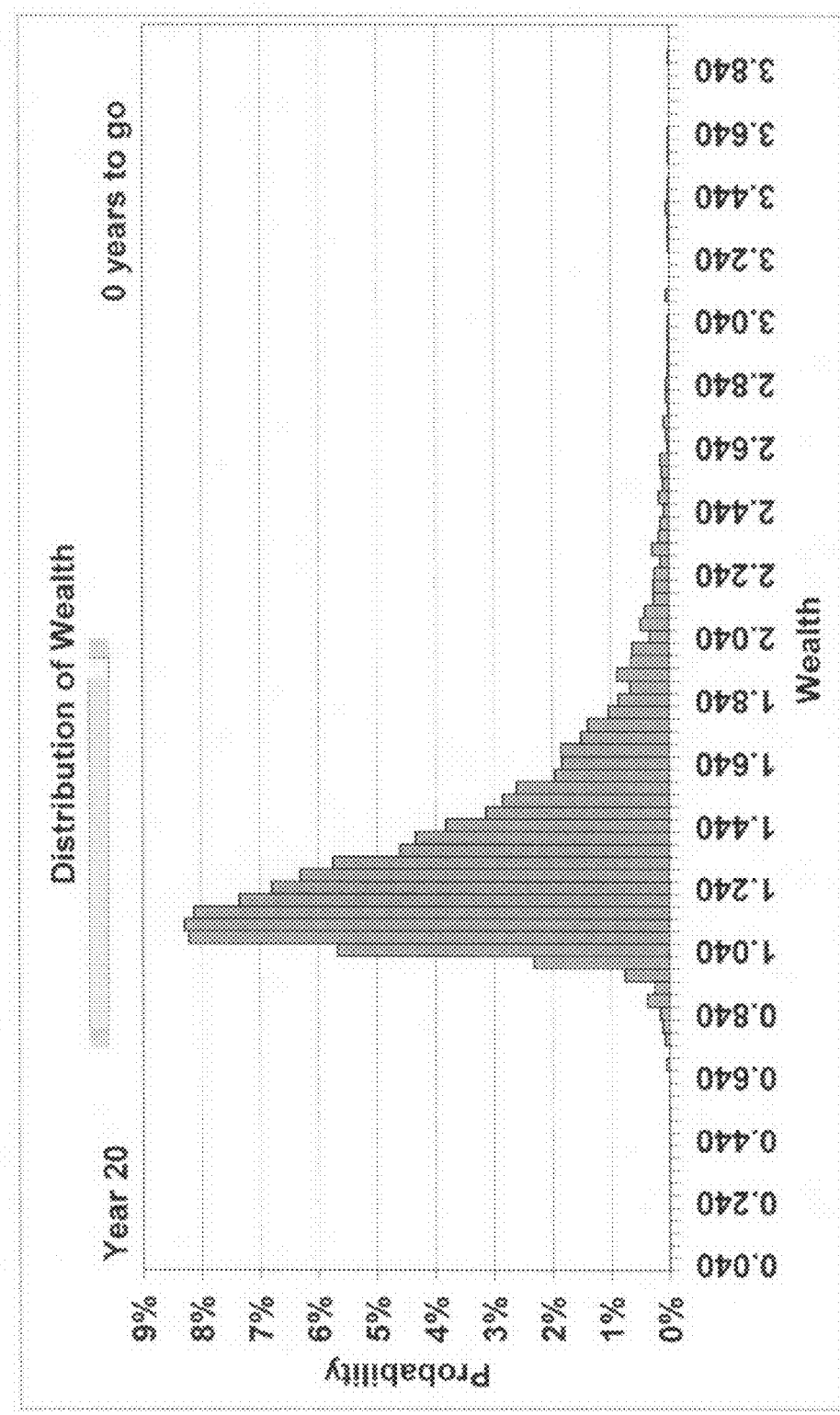

The out-of-sample simulation results in FIG. 11 (middle) show good downside protection and the marginal probability chart (bottom) is very steep on the left reflecting the downside protection the quadratic downside risk function is said to provide. However, even the assumption of a very large risk aversion coefficient does not lead to a zero probability of wealth below $1 million. The mean wealth obtained at the end of the investment horizon is $1.339 million with a standard deviation of $0.347 million. With 99% probability a wealth of $911,000 is exceeded and with 95% probability a wealth of $1.006 million. Thus, the target wealth of $1 million is exceeded with larger than 95% probability. The statistics in Table 2 give a certainty equivalent wealth of $998.000 as the lowest of all four utility functions, reflecting again the low emphasis on the upside displayed by the quadratic downside utility function.

Next we compare dynamic strategies obtained from using the different utility functions with a number of fixed-mix strategies, i.e., (1) US stocks only, (2) cash only, (3) all asset classes equally weighted, (4) risk averse, (5) medium, and (6) risk prone. Except for case

TABLE 2

Out-of-sample simulation results

|  | CEW | Mean | Std | 99% | 95% |
| --- | --- | --- | --- | --- | --- |
| Exponential RA = 2 | 1.412 | 1.564 | 0.424 | 0.770 | 0.943 |
| Increasing RRA | 1.440 | 1.575 | 0.452 | 0.771 | 0.937 |
| Decreasing RRA | 1.339 | 1.498 | 0.436 | 0.865 | 0.998 |
| Quadratic downside | 0.982 | 1.339 | 0.347 | 0.911 | 1.006 |
|  | 1.349 | 1.481 | 0.352 | 0.865 | 0.997 |

(3), all fixed-mix strategies are mean-variance efficient and obtained from solving the single-period Markowitz problem. We intentionally use the five representative mean-variance optimal fixed-mix strategies for comparison, because such portfolios are commonly held in practice. Many aggressive investors hold stocks-only portfolios, and many very conservative investors keep their funds entirely in money market accounts. Investment firms usually offer fund-of-funds portfolios, such as averse (often called conservative), medium (often referred to as dynamic), and prone (often referred to as aggressive), which are sold to investors allegedly according to their risk profile. The equally weighted strategy represents a non-efficient portfolio for comparison.

Table 3 represents the out-of-sample simulation results for the various fixed-mix strategies. Obviously, the largest expected wealth of $1.825 million is obtained by the US Stocks portfolio, and the smallest expected wealth of $0.868 million by the cash-only portfolio. More interestingly, the cash-only portfolio exceeds a wealth of $822,000 with 99% probability, and the medium portfolio exceeds a wealth of $825,000 with 99% probability. The expected wealth of the cash-only portfolio is a mere $868,000 compared to the expected wealth of the medium portfolio of $1.538 million.

The risk-averse strategy exhibits the largest wealth of $869,000 exceeded with 99% probability, with an expected wealth of $1.098 million at the end of the investment horizon. In comparison, the dynamic strategy of decreasing relative risk aversion exhibits a very similar wealth of $865,000 exceeded with 99% probability, but a significantly larger expected wealth of $1.339 million. This represents an increase of 21.95% expected wealth at the same level of (downside) risk. The medium strategy exhibits the largest wealth of $975,000 exceeded with 95% probability among all fixed-mix strategies. The best dynamic strategy on this measure is the quadratic downside risk strategy, which exceeds $1.006 million with 95% probability. However, the quadratic strategy returns a significantly lower expected wealth of $1.339 million, compared with 1.538 million for the medium fixed-mix strategy. The extra downside protection is expensive on the upside. There is no dynamic strategy matching the 95% exceeded wealth of the medium fixed-mix strategy, and therefore we cannot make a statement of out-performance at the same level of 95% exceeded wealth given the strategies at hand.

TABLE 3

Out-of-sample simulation results for various fixed-mix strategies

|  | Mean | Std | 99% | 95% |
| --- | --- | --- | --- | --- |
| US Stocks | 1.825 | 1.065 | 0.469 | 0.660 |
| Cash | 0.868 | 0.019 | 0.822 | 0.834 |
| Equally weighted | 1.349 | 0.301 | 0.799 | 0.920 |
| Averse | 1.098 | 0.110 | 0.869 | 0.930 |
| Medium | 1.538 | 0.407 | 0.825 | 0.975 |
| Prone | 1.663 | 0.639 | 0.677 | 0.852 |

In order to further evaluate the dynamic strategies, we compared the certainty equivalent wealth (CEW) of the dynamic strategies with the corresponding certainty equivalent wealth of each fixed-mix strategy. Table 4 presents the results in terms of certainty equivalent wealth and in the percentage improvement obtained when using the optimal dynamic strategy for each utility function compared to each of the fixed-mix strategies.

A certainty equivalent wealth (CEW) of $1.41193 million is the maximum obtained from a dynamic strategy in the case of the exponential utility function with risk aversion of λ=2.

This utility represents a fairly aggressive investor. The medium strategy would be the best fixed-mix strategy with an CEW of $1.40415 million. The improvement of the dynamic strategy versus the best fixed-mix strategy is 0.55%. The prone strategy would also fit reasonably well this investor, and results in a CEW of $1.38933 million. The improvement of the dynamic strategy versus the prone strategy is 1.63%. The improvements in CEW of the dynamic strategy versus US stocks, cash and averse are 9.61%, 62.79% and 29.93%, respectively.

flat. Using the mean estimates from the regression would result in an increased mean return for stocks, and consequently make the efficient frontier steeper. Thus, the benefits of dynamic asset allocation versus fixed-mix strategies would increase.

In the next investment example, we consider an investment horizon of 10 years. An initial capital of $1 million is to be invested, and there are no further payments made in or out of the account. The capital should be invested so that a minimum return of 2%

TABLE 4

Out-of-sample simulation results for CEW and improvement

|  | Exponential RA = 2 | | Increasing RRA | | Decreasing RRA | | Quadratic | |
|---|---|---|---|---|---|---|---|---|
|  | CEW | Impr. | CEW | Impr. | CEW | Impr. | CEW | Impr. |
| Dynamic | 1.41193 |  | 1.44004 |  | 1.35163 |  | 0.98204 |  |
| US Stocks | 1.28811 | 9.61% | 1.34365 | 7.17% | 0.68918 | 96.12% | 0.87639 | 12.06% |
| Cash | 0.86732 | 62.79% | 0.86728 | 66.04% | 0.86596 | 56.08% | 0.86628 | 13.36% |
| Equally weighted | 1.27082 | 11.10% | 1.28235 | 12.30% | 1.17981 | 14.56% | 0.96254 | 2.03% |
| Averse | 1.08667 | 29.93% | 1.08747 | 32.42% | 1.0605 | 27.45% | 0.97207 | 1.03% |
| Medium | 1.40415 | 0.55% | 1.4292 | 0.76% | 1.34326 | 0.62% | 0.97051 | 1.19% |
| Prone | 1.38933 | 1.63% | 1.43378 | 0.44% | 1.0925 | 23.72% | 0.93699 | 4.81% |

Not surprisingly, the situation is very similar for the increasing relative risk aversion utility function. The dynamic strategy results in a certainty equivalent wealth of $1.44004 million. The prone strategy is the best fixed-mix strategy with a CEW of $1.43378 million, resulting in an improvement of the dynamic strategy versus prone of 0.44%. The medium strategy is surpassed by the dynamic strategy by 0.76%. US stocks, cash only and risk averse are surpassed by the dynamic strategy by 7.17%, 66.04% and 32.42%, respectively.

In the case of decreasing relative risk aversion, the dynamic strategy yields a CEW of $1.35163 million. The best fixed-mix strategy is the medium, with a CEW of $1.34326 million. The improvement of the dynamic strategy versus the medium strategy is 0.62%. The improvements of the dynamic strategy versus US stocks, cash-only, risk-averse and risk-prone are 95.12%, 56.08%, 27.45%, and 23.72%, respectively, showing that none of these strategies are a particularly good fit for this type of utility function.

For the quadratic downside utility function, the dynamic strategy has a CEW of $0.98204 million, while the best fixed-mix performance is the risk-averse strategy with a CEW of $0.97207 million. Thus, the improvement of the dynamic strategy is 1.05% versus the best fixed-mix strategy. The improvements over US stocks, cash-only, medium and risk-prone are 12.06%, 13.36%, 1.19% and 4.81%, respectively.

The equally weighted strategy was never the best fixed-mix strategy for any utility function. For each utility function, the best fixed-mix strategy could be improved upon by about a half percent by the dynamic strategy, except for the quadratic utility function for which the improvement is about one percent. These results confirm that the improvement in certainty equivalent wealth can be significant. However, it also suggests that from a practical perspective a well-selected or numerically optimized fixed-mix strategy can be close in performance to a dynamic strategy when measured in terms of CEW. A possible explanation is that, when we used the historical mean return estimates, the difference in the mean returns between stock and corporate bonds was rather small, and the corresponding mean-variance efficient frontier rather per year is exceeded with 99% probability, and the expected return should be as large as possible. Such an investment situation is often faced by institutional investors. Time horizons may vary. While the problem can be stated as a chance-constrained optimization problem, we will explore empirically whether downside risk protection can be achieved by utility maximization using the quadratic downside risk or the decreasing relative risk aversion utility function.

For the quadratic function we set the target wealth at $1.22 million reflecting the 2% per year minimum return to be exceeded with 99% probability. As in the investment example above, we set the risk aversion at $\lambda_q/2=1000$, in order to heavily penalize any under-performance with respect to the target. For the decreasing relative risk aversion function, we set a high relative risk aversion of $\gamma=8$ below the level $W_L=\$1.22$ million (the target wealth) and a low relative risk aversion of $\gamma=1.01$ above the wealth level $W_H=\$1.5$ million, and assume the relative risk aversion increases linearly in between. For both utility functions, we solved the 10-year horizon problem assuming yearly, quarterly and monthly rebalancing. For quarterly rebalancing a 40-stage problem needed to be solved, and for the monthly rebalancing a 120-stage problem.

Table 5 gives the results for expected wealth, wealth exceeded with 99% probability, and minimum wealth (defined as the level exceeded with 99.9% probability), as well as expected return, return exceeded with 99% probability and minimum return (exceeded with 99.9% probability). Using yearly rebalancing, both utility functions lead to larger returns than 2% per annum with at least 99% probability. The quadratic downside utility function resulted in a very conservative strategy, and even the minimum returns (exceeded with 99.9% probability) met the 2% per year requirement. The expected returns from both strategies are 10.35% per year for the quadratic downside and 10.42% for the decreasing RRA utility function, indicating that the downside-risk-protected strategies are not overly costly on the upside. The results were rather similar for yearly, quarterly and monthly rebalancing for both utility functions; however, more frequent rebalancing allowed for somewhat better downside protection and larger expected returns.

TABLE 5

Out-of-sample simulation results for downside risk protection

| Rebal. | Periods | Exp Wealth | 99% Wealth | Min Wealth | Exp Ret. | 99% Ret. | Min Ret. |
|---|---|---|---|---|---|---|---|
| | | | Quadratic downside risk | | | | |
| yearly | 10 | 2.67628 | 1.31957 | 1.22778 | 10.35% | 2.81% | 2.07% |
| quarterly | 40 | 2.79864 | 1.28774 | 1.22500 | 10.84% | 2.56% | 2.05% |
| monthly | 120 | 2.71229 | 1.36413 | 1.26250 | 10.49% | 3.15% | 2.36% |
| | | | Decreasing RRA | | | | |
| yearly | 10 | 2.69504 | 1.25000 | 1.10000 | 10.42% | 2.26% | 0.96% |
| quarterly | 40 | 2.78378 | 1.26714 | 1.05000 | 10.78% | 2.40% | 0.49% |
| monthly | 120 | 2.76007 | 1.32083 | 1.10000 | 10.69% | 2.82% | 0.96% |

Figure 12A:
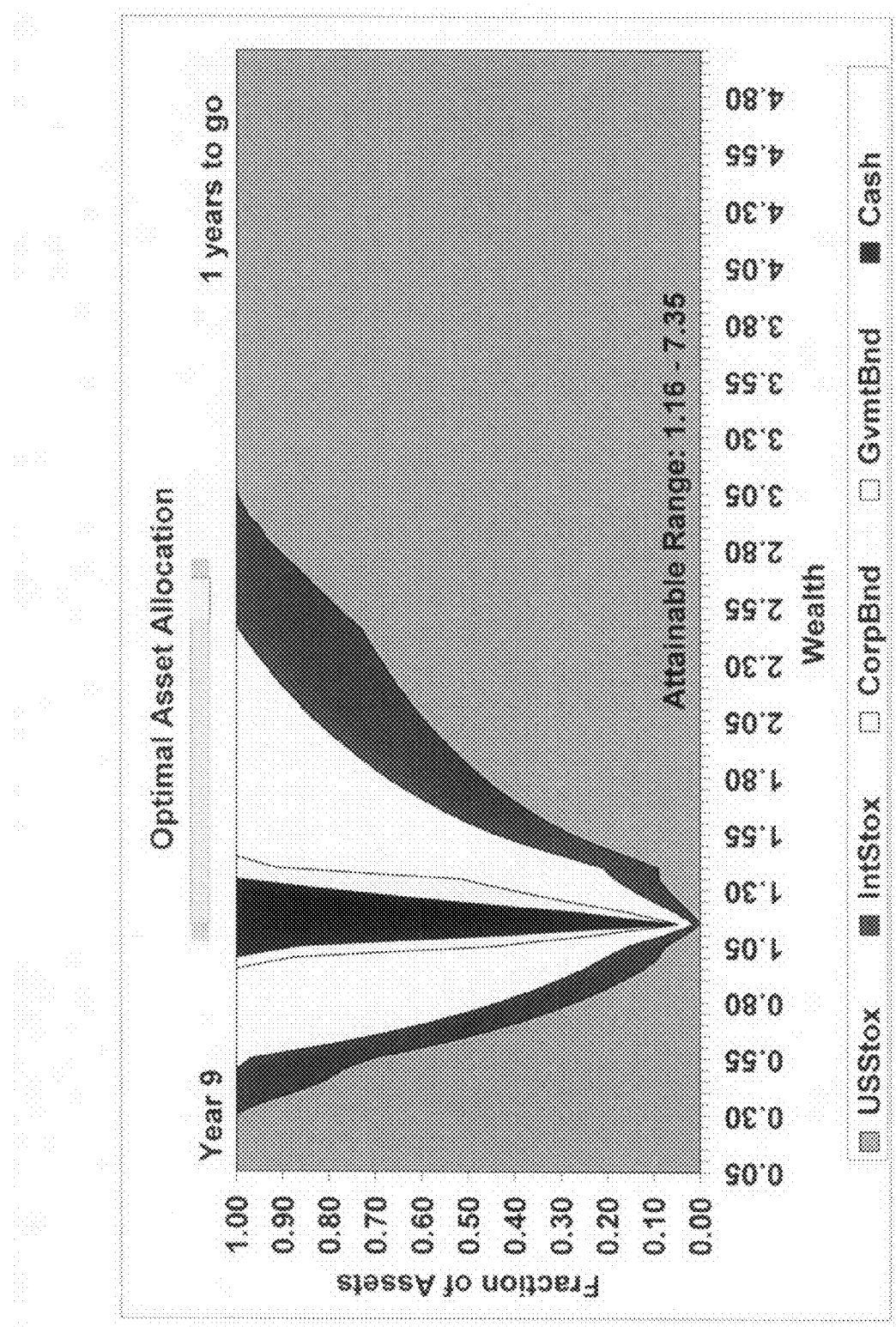
FIG. 12 illustrates the investment example of a 10-year horizon with downside risk, quadratic utility and depicts the investment strategy.
Figure 12B:
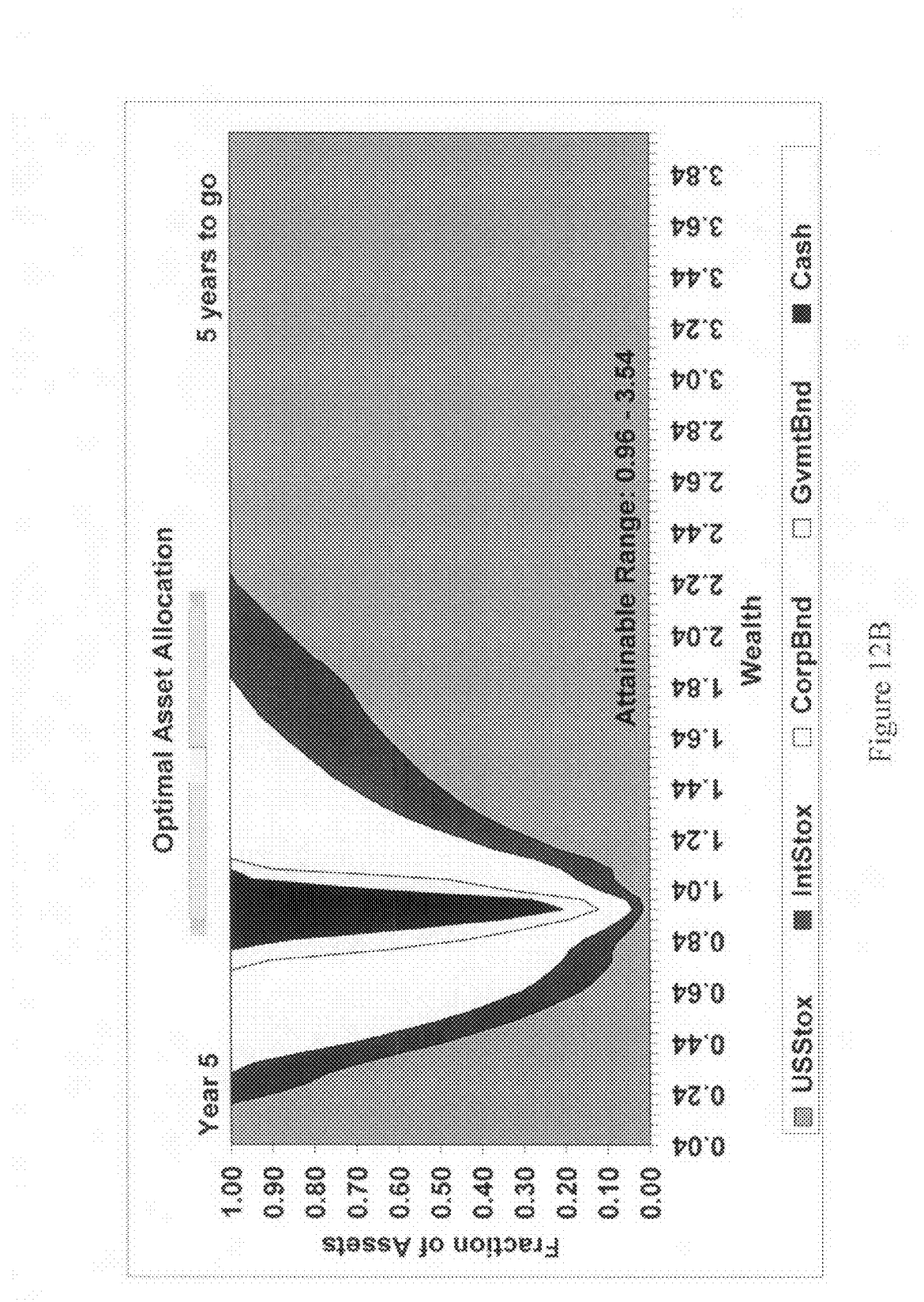
Figure 12C:
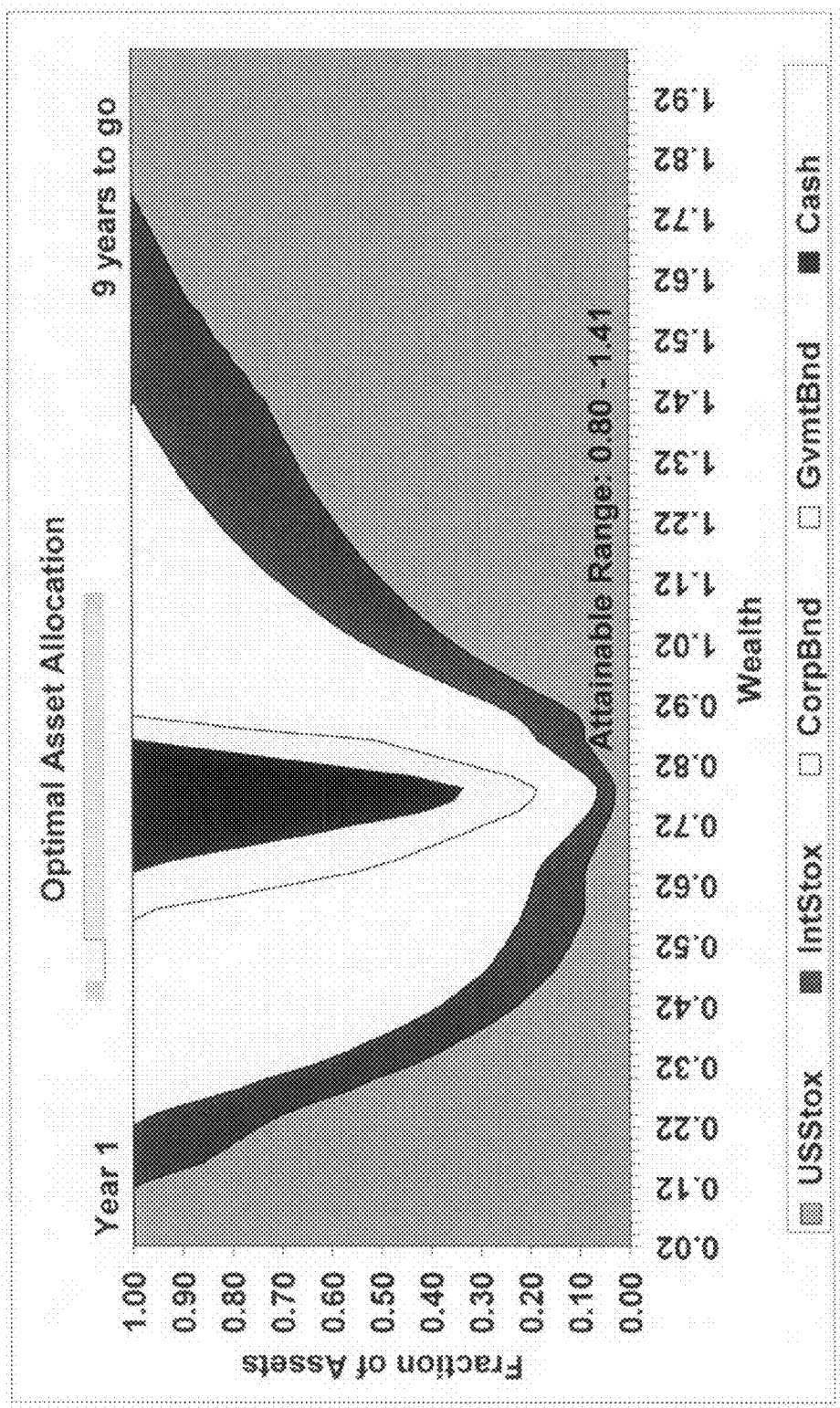
Figure 13A:
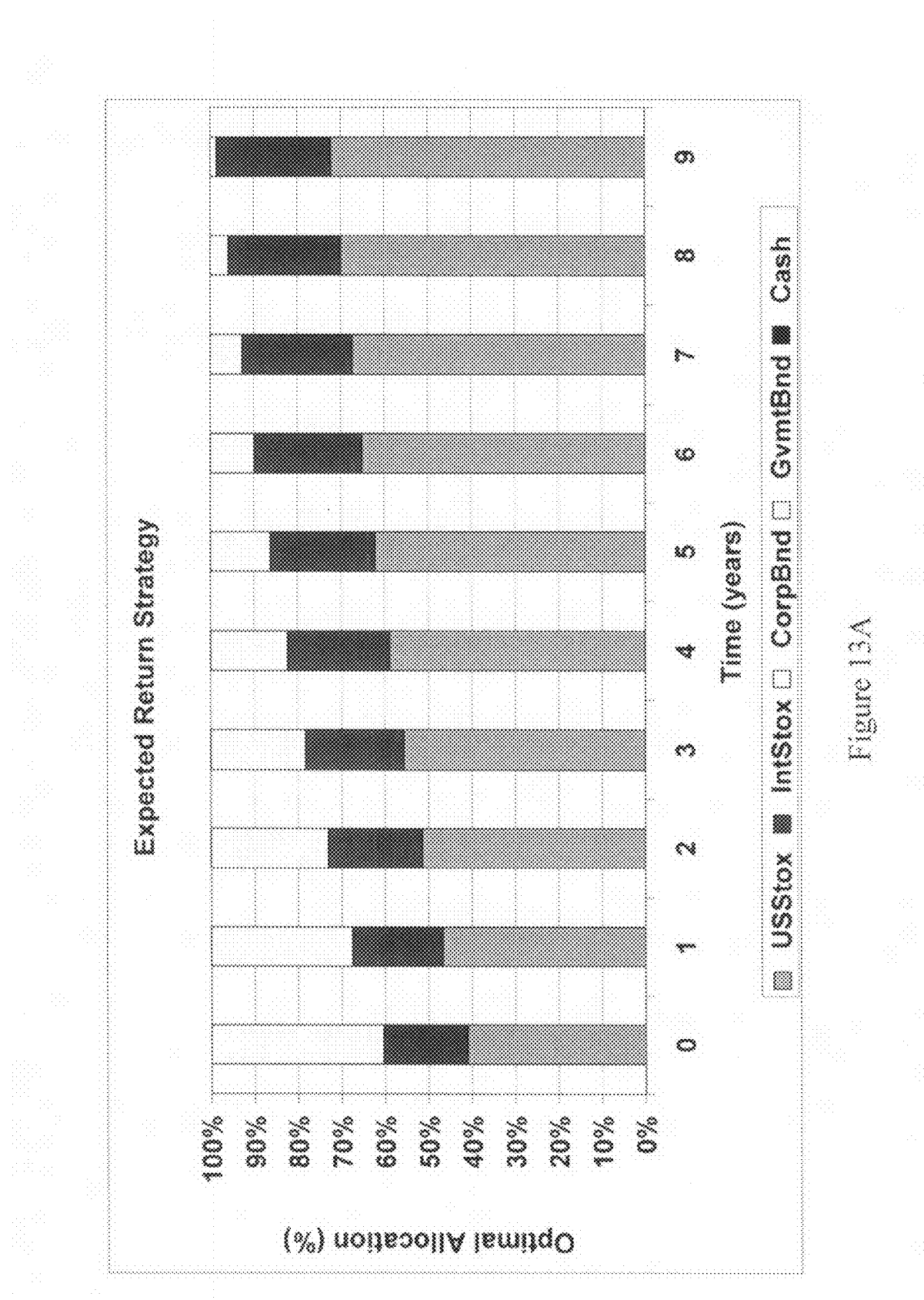
FIG. 13 illustrates the investment example of a 10-year horizon with downside risk, quadratic utility and depicts the simulations.
Figure 13B:
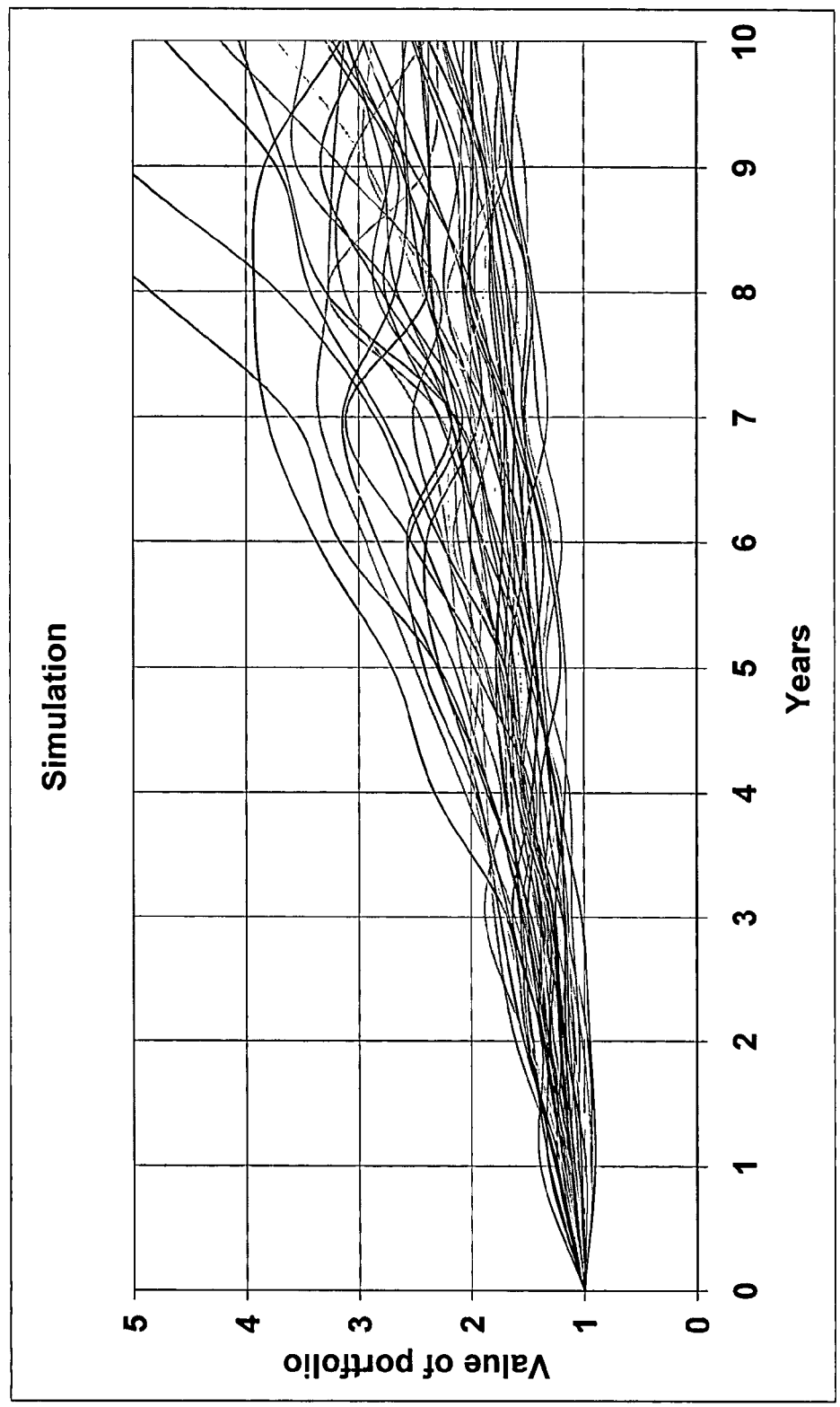
Figure 13C:
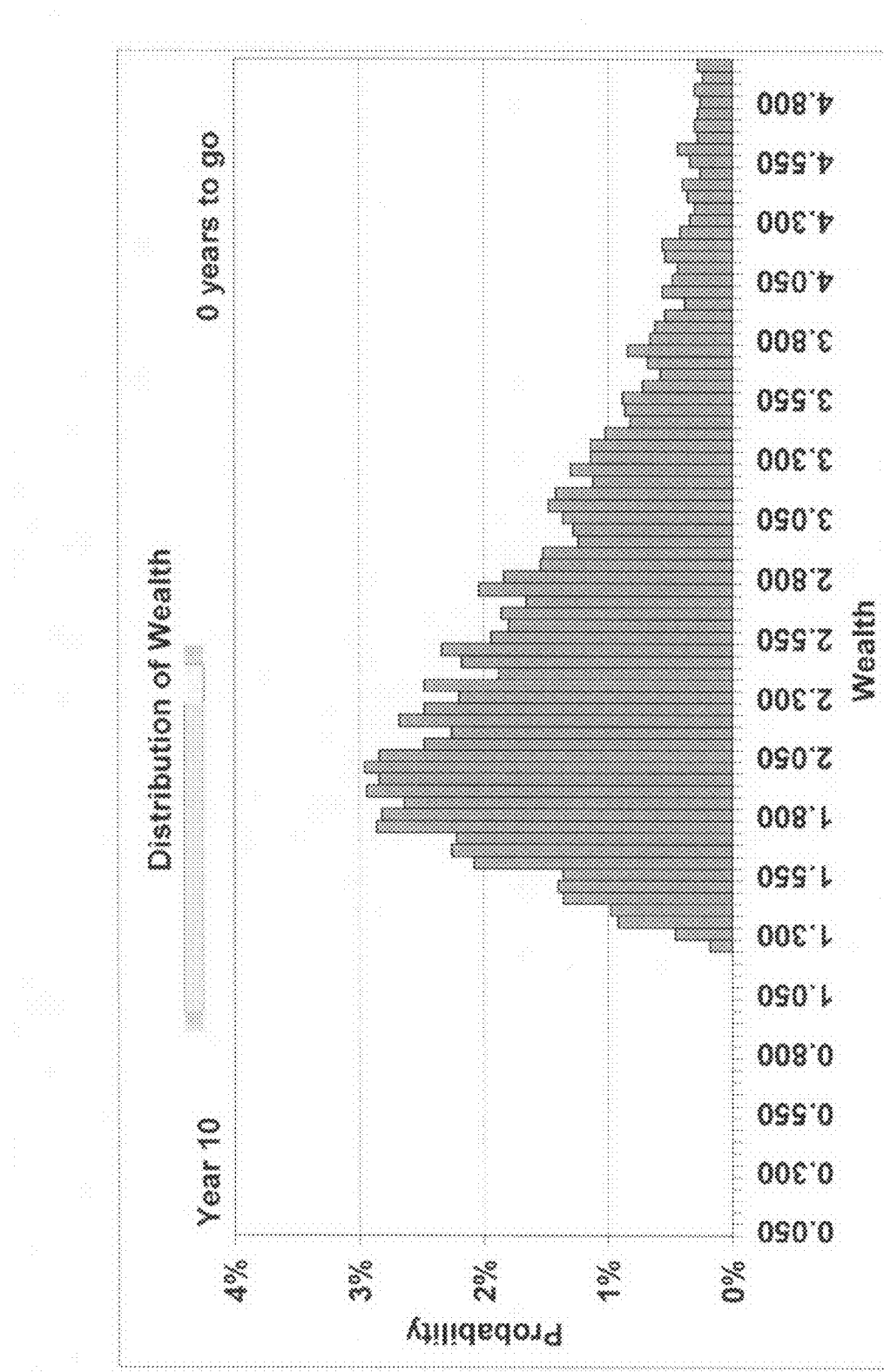

For the quadratic downside risk strategy, FIG. 12 represents the optimal asset allocation for yearly rebalancing with respect to wealth for one (top), five (middle) and nine years to go. For all attainable wealth levels (achieved with 99.9% probability), the optimal asset allocation is entirely on the right side of the critical wealth (with the most conservative asset allocation) and thus exhibits decreasing relative risk aversion. The better the performance (and the larger the wealth in the account), the more risk should be assumed and the larger should be the stock allocation. The attainable wealth in year 9 lies between $1.16 and $7.35 million, in year 5 between $0.96 and $3.54 million, and in year 1 between $0.80 and $1.41 million. FIG. 13 (top) represents the expected value strategy (assuming expected returns are realized in every period), (middle) the simulations of wealth over time, and (bottom) the marginal distribution of wealth at the end of the investment horizon for yearly rebalancing. The expected value strategy prescribes to start with an initial asset allocation of 60% stocks and 40% corporate bonds, and then to gradually increase the stock allocation to almost 100% in the last rebalancing period. The marginal distribution is steep on the left side, representing a limited downside, and the minimum wealth (exceeded with 99.9%) of $1.22778 million translates into a minimal annual return of 2.07%.

How well this strategy protects the downside along the way is presented in Table 6, which exhibits the expected wealth, the wealth exceeded with 99% probability, and the minimum wealth (that is exceeded with 99.9% probability), along with corresponding measures for the returns in each year of the investment horizon. The downside protection during the initial periods is rather weak, with the returns exceeded with 99% probability in year one resulting as −11.86% and the minimum return resulting as −20.00%. Only in year five is nominal capital preserved with greater than 99% probability and only in year six with 99.9% probability. In year eight the target return of 2% per year is exceeded with 99% probability, and in year 10 with 99.9% probability. The expected returns increase monotonically as time passes, but only marginally from 10.01% per year in year one to 10.35% in year ten.

TABLE 6

Out-of-sample simulation results for downside risk protection
Quadratic dynamic downside risk

| Period | Exp Wealth | 99% Wealth | Min Wealth | Exp Ret. | 99% Ret. | Min Ret. |
|---|---|---|---|---|---|---|
| 1 | 1.10008 | 0.8814 | 0.8 | 10.01% | −11.86% | −20.00% |
| 2 | 1.21161 | 0.89267 | 0.825 | 10.07% | −5.52% | −9.17% |
| 3 | 1.33354 | 0.92828 | 0.86 | 10.07% | −2.45% | −4.90% |
| 4 | 1.47004 | 0.97231 | 0.9 | 10.11% | −0.70% | −2.60% |
| 5 | 1.62245 | 1.01714 | 0.9616 | 10.16% | 0.34% | −0.78% |
| 6 | 1.79528 | 1.07636 | 1 | 10.24% | 1.23% | 0.00% |
| 7 | 1.98402 | 1.1296 | 1.05333 | 10.28% | 1.76% | 0.74% |
| 8 | 2.19368 | 1.18286 | 1.12 | 10.32% | 2.12% | 1.43% |
| 9 | 2.42128 | 1.25091 | 1.16071 | 10.32% | 2.52% | 1.67% |
| 10 | 2.67628 | 1.31957 | 1.22778 | 10.35% | 2.81% | 2.07% |

We next compare these results to the results of a strategy where the downside is controlled dynamically in every period.

Especially institutional investors are evaluated with regard to their portfolio's performance on a yearly basis. Given the ongoing evaluations, institutional managers may consider implementing a dynamic strategy with limited downside risk not only at the end of the investment horizon but also at every year along the way. Again, using a 10-year investment horizon, we compute a strategy using a discounted additive quadratic downside utility function at every year. For the dynamic quadratic downside risk utility function, the discount factor was chosen as 1% per year and the target wealth in each period was set as $W_{d,t}=1.02^t$, t=1.10 reflecting the desired minimum return of 2% per year. We set the risk aversion coefficient at every period as $\lambda_f=1000$ and $\lambda_q/2=1000$, in order to heavily penalize (linearly and quadratically) any under-performance with respect to the targets in addition to the quadratic downside utility function at the end of the investment horizon.

Figure 14A:
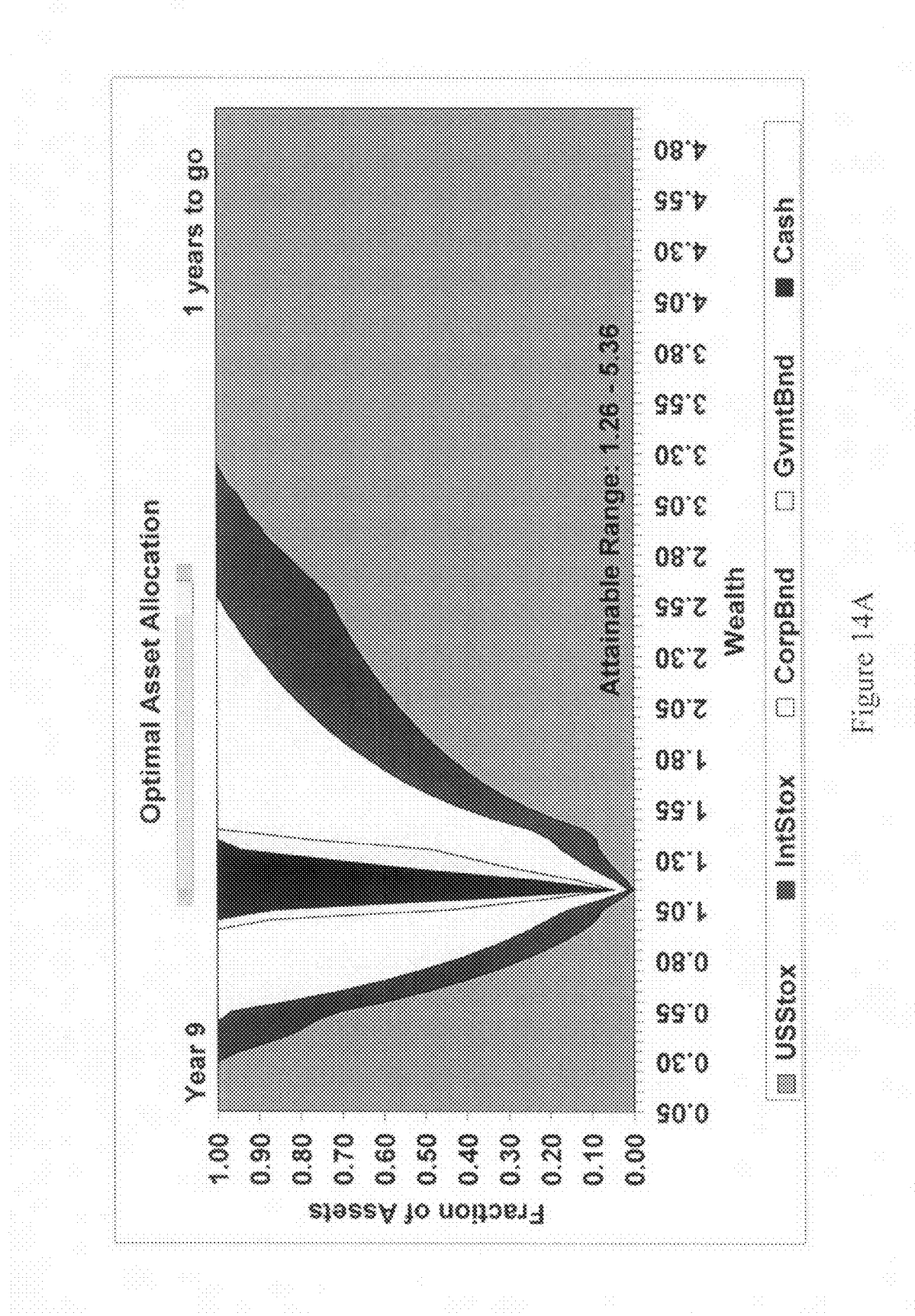
FIG. 14 illustrates the investment example of a 10-year horizon with downside risk at each period, quadratic utility and depicts the investment strategy.
Figure 14B:
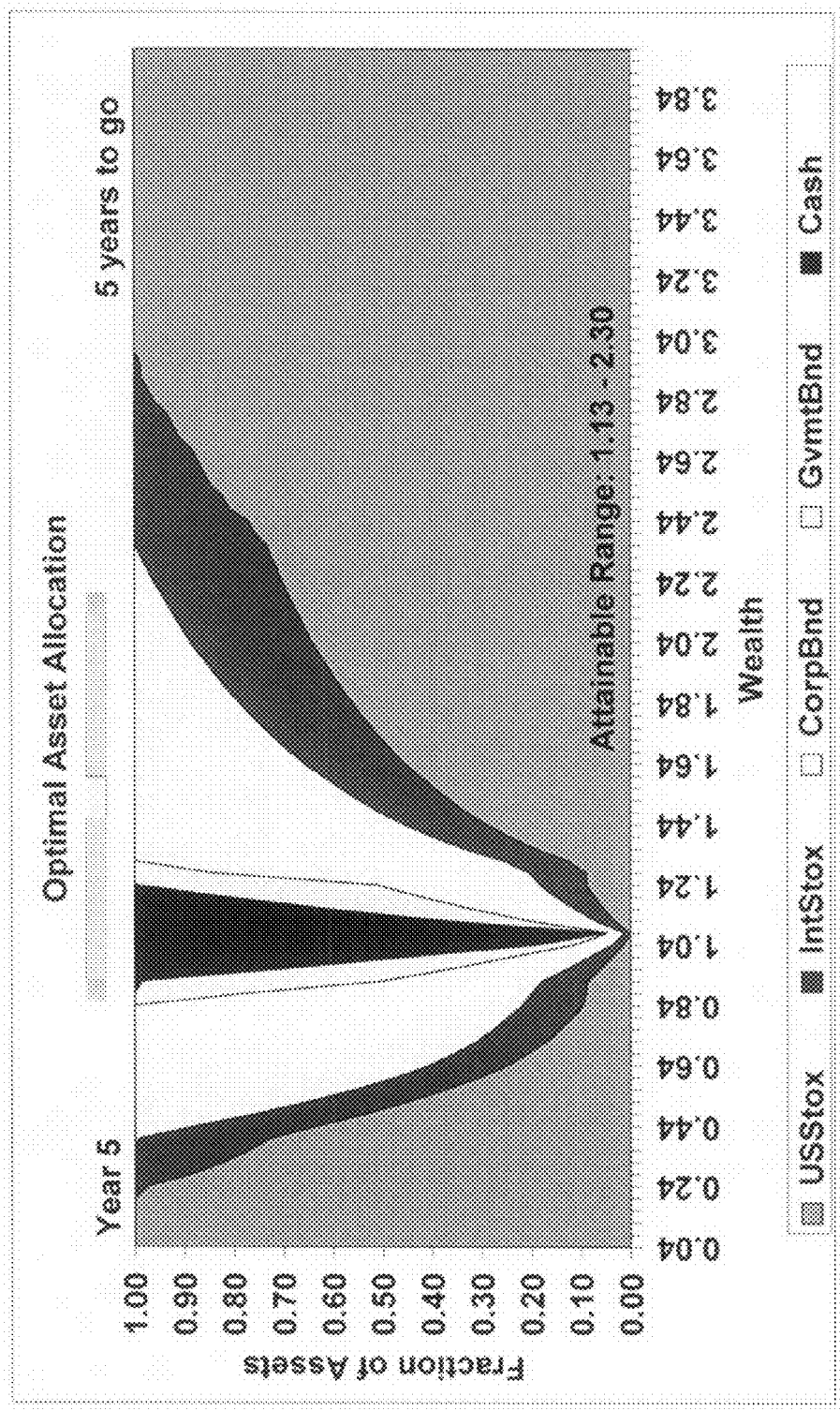
Figure 14C:
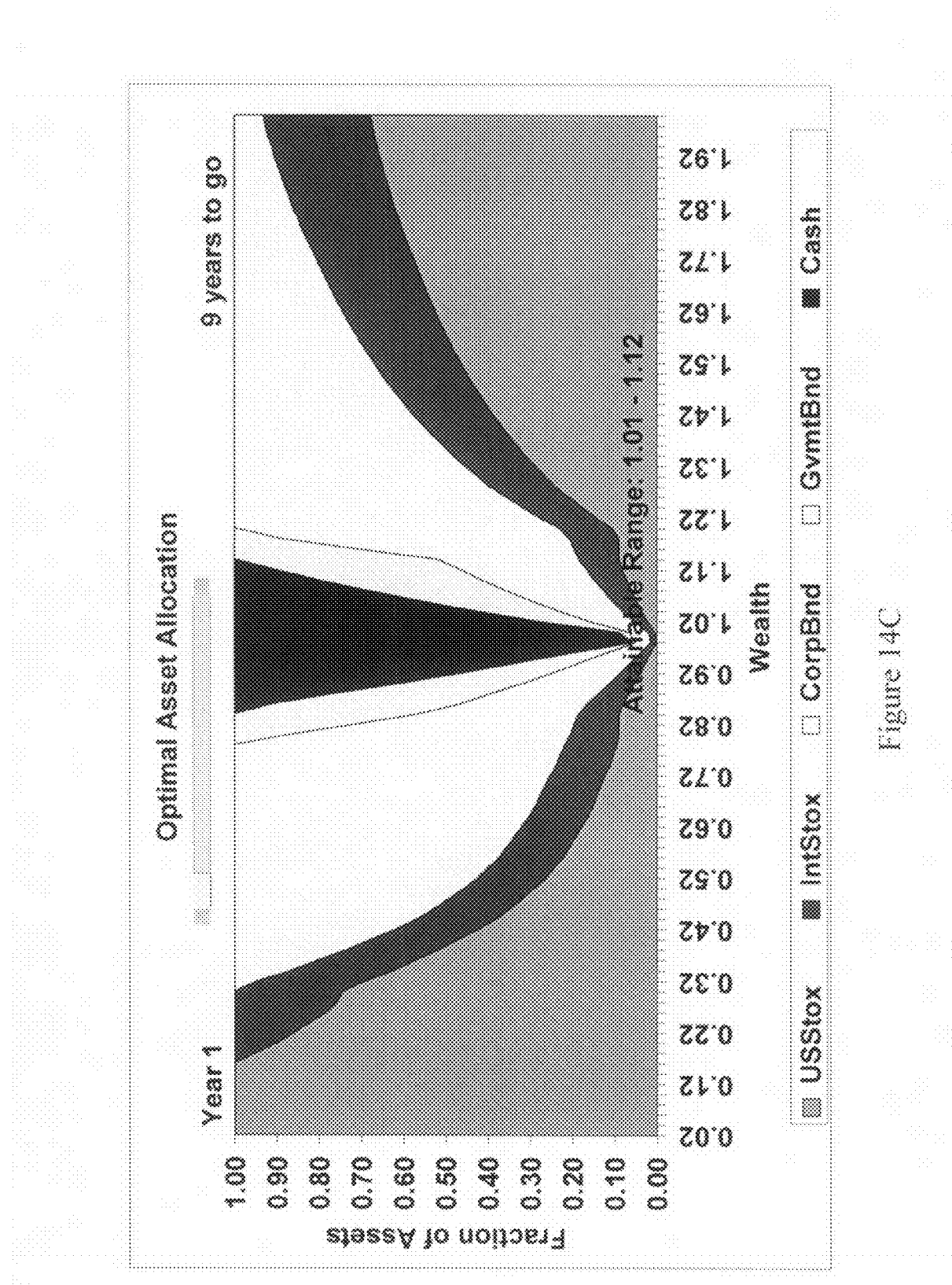

FIG. 14 represents the strategies for one (top), five (middle) and nine (bottom) years to go. The optimal strategy at the last rebalancing period must be identical to that, where only terminal wealth is evaluated. This follows directly from the dynamic programming recursion. At all other years the dynamically controlled downside risk strategy is more conservative, e.g., at five years to go risk and stock allocation increases slower with wealth compared to the uncontrolled case (with downside risk protection only at the end of the investment horizon), and the most conservative allocation at the critical point is more conservative than in the uncontrolled case. For example, in the uncontrolled case at nine years to go, the cash position at the critical point is about 70%, whereas in the controlled case it is about 90%. With downside controls, the attainable wealth in year 9 lies between $1.26 and $5.36 million, in year 5 between $1.13 and $2.30 million, and in year 1 between $1.01 and $1.12 million. This is more narrow range than for the uncontrolled case, reflecting the loss on the upside induced by the protection on the downside.

Figure 15A:
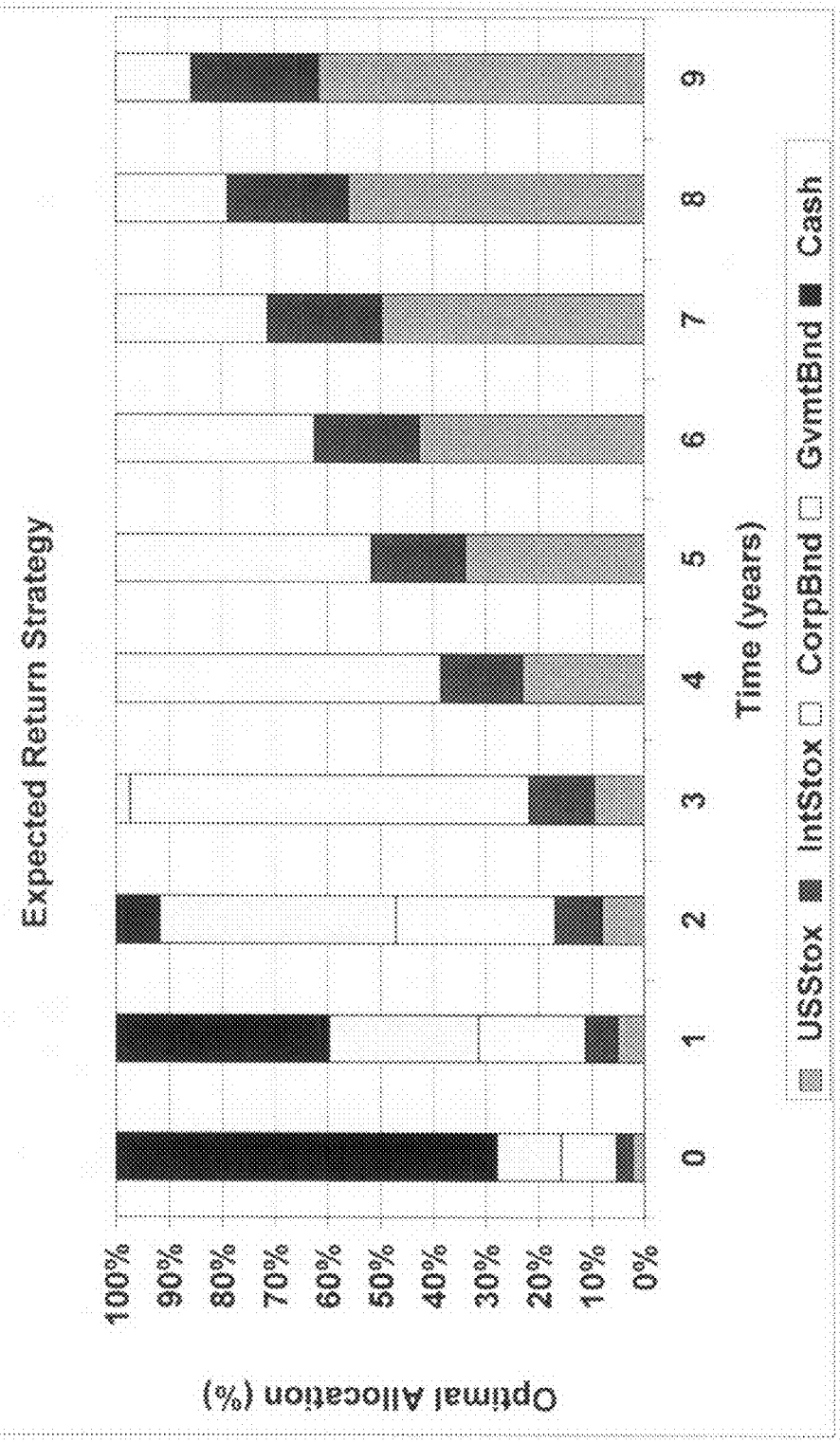
FIG. 15 illustrates the investment example of a 10-year horizon with downside risk at each period, quadratic utility and depicts the simulations.
Figure 15B:
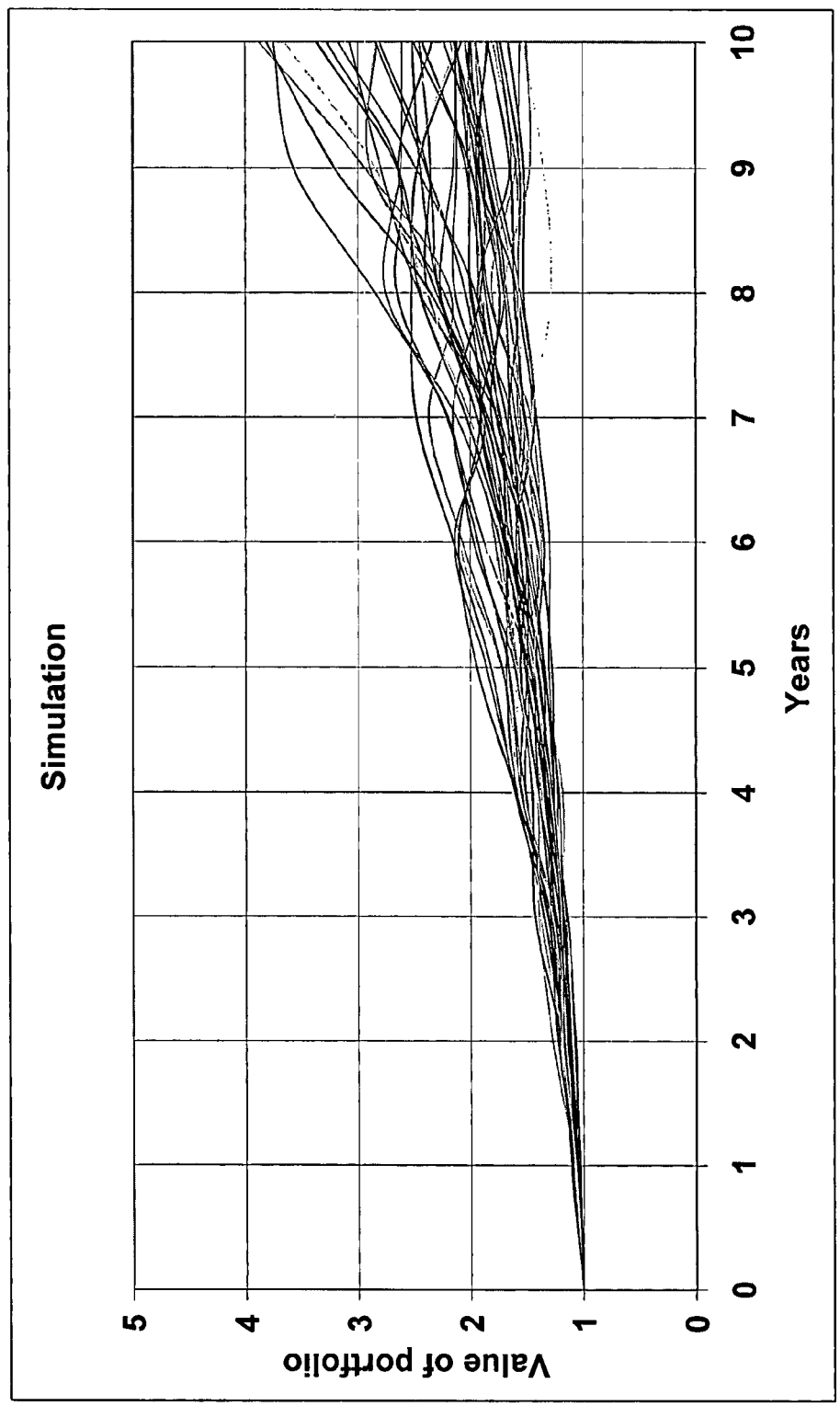
Figure 15C:
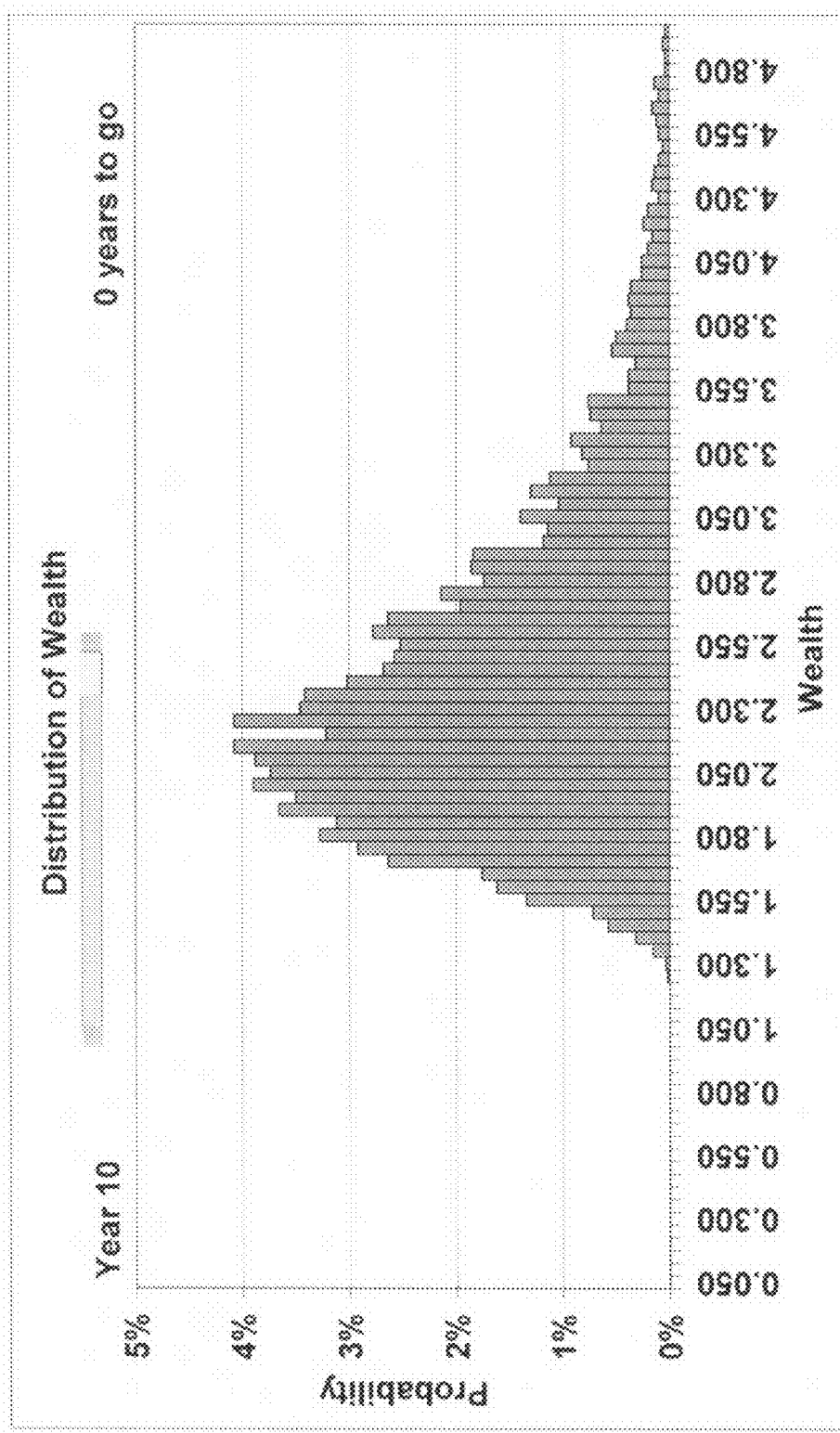

FIG. 15 (top) represents the expected value strategy, (middle) the simulations of wealth, and (bottom) the marginal probability distribution of terminal wealth. The expected value strategy under downside control prescribes to start with a stock allocation of 5% and to increase it up to about 85% in year nine. This is significantly more conservative than in the uncontrolled case. Comparing the wealth simulations, one can readily observe that the downside is more protected along the way than in the uncontrolled case.

Table 7 presents the statistics for each year of the investment horizon. (The last line of year 10 represents the terminal statistics.) The marginal distribution of final wealth displays a minimum wealth (exceeded with 99.9% probability) of $1.3125 million, which translates into a 2.76% annual return. Compared to the uncontrolled case above, the downside is much better protected along the way, e.g., in every period the return exceeded with 99% probability is greater than 2%, and the minimum return (exceeded with 99.9% probability) exceeds 2% from year three on. The expected return is smaller compared to the unconstrained case and increases monotonically from 6.58% to 9.22%, which confirms that the dynamically downside-controlled strategy is overall more conservative than when only the terminal distribution is considered in the optimization.

These are very encouraging results. All out-of-sample simulations were performed using bootstrapping from the historical monthly observations and thus represent possible fat tails in the asset returns distribution.

As an example of an optimization, a sample size of $|S_t^i|=2000$ of annual returns for each period. The sample is based on bootstrapping from the monthly returns, thus we used 24,000 sampled monthly observations to compute the annual returns sample. In each period for the out-of-sample evaluation, we used a sample size of $|S_t^o|=5000$ of annual returns, also obtained by bootstrapping monthly returns. The computations were carried out using the fast method, precalculating the efficient frontier parameterized at 2000 points. After computing the optimal strategy, we simulated 5000 paths based on bootstrapping monthly returns. The following Table 8 presents the optimization time in CPU seconds (on a Pentium 4 3.4 MHz and 2 GB of RAM) for the different time horizons and utility functions used. It takes about 11 seconds to optimize a 20-period problem with yearly rebalancing, thus solving a 20-stage stochastic dynamic program. The computation time was about 8 seconds for a 10-year horizon with yearly rebalancing, about 17 seconds for quarterly rebalancing and 41 seconds for monthly rebalancing. In the latter, a 120 stage stochastic dynamic program was solved in 41 seconds.

The fast computations for yearly rebalancing also permit the calculations to be performed on-line to help investment advisors find the best asset allocation strategies for their clients, individual and institutional.

TABLE 8

Computation times in elapsed CPU seconds

| Rebalancing | Horizon | Periods | Utility | |
|---|---|---|---|---|
| | | | Exponential | Increasing RRA |
| yearly | 20 | 20 | 10.53 | 10.92 |
| | | | Quadratic | Decreasing RRA |
| yearly | 20 | 20 | 10.48 | 11.81 |
| | | | Quadratic | Decreasing RRA |
| yearly | 10 | 10 | 6.58 | 7.79 |
| quarterly | 10 | 40 | 15.85 | 17.06 |
| monthly | 10 | 120 | 41.35 | 41.35 |

TABLE 7

Out-of-sample simulation results for dynamic downside risk protection at every period
Quadratic dynamic downside risk

| Period | Exp Wealth | 99% Wealth | Min Wealth | Exp Ret. | 99% Ret. | Min Ret. |
|---|---|---|---|---|---|---|
| 1 | 1.06575 | 1.02225 | 1.00533 | 6.58% | 2.23% | 0.53% |
| 2 | 1.14561 | 1.06108 | 1.032 | 7.03% | 3.01% | 1.59% |
| 3 | 1.24271 | 1.09137 | 1.06222 | 7.51% | 2.96% | 2.03% |
| 4 | 1.35621 | 1.13641 | 1.095 | 7.91% | 3.25% | 2.29% |
| 5 | 1.48549 | 1.176 | 1.12667 | 8.24% | 3.30% | 2.41% |
| 6 | 1.63401 | 1.22638 | 1.152 | 8.53% | 3.46% | 2.39% |
| 7 | 1.79975 | 1.27385 | 1.2 | 8.76% | 3.52% | 2.64% |
| 8 | 1.9845 | 1.32121 | 1.23 | 8.94% | 3.54% | 2.62% |
| 9 | 2.18661 | 1.37778 | 1.26 | 9.08% | 3.62% | 2.60% |
| 10 | 2.41527 | 1.43966 | 1.3125 | 9.22% | 3.71% | 2.76% |

The system is Web-based and the optimizations and simulations are carried out on-line in real time. The system is user friendly, easy to use, and also facilitates graphical output and downloadable tables for spreadsheets, providing all necessary statistical information. It permits an adviser to quickly devise customized (regarding risk preference and time horizon) optimized forward-looking dynamic strategies. While the foregoing description has been with reference to particular embodiments of the present invention, it will be appreciated by those skilled in the art that changes to these embodiments may be made without departing from the principles and spirit of the invention. Accordingly, the scope of the present invention can only be ascertained with reference to the appended claims.

What is claimed is:

1. A method for dynamic asset allocation for optimization of a given portfolio of assets using a known initial wealth level as well as a given investor risk aversion with respect to wealth at the end of the investor's investment horizon, comprising the steps of:

approximating the investor's risk aversion function with respect to wealth by computing absolute risk aversions $\alpha_i$ by one or more computers, that represent a function of risk aversion versus wealth by determining coefficients of a piecewise exponential function with K pieces, where each piece represents a certain absolute risk aversion $\alpha_i$, where i=1, ..., K, K<∞, for a preselected number of discrete absolute risk aversions, using an exponential function $\hat{W}_i \leq W \leq \hat{W}_{i+1}$, $u_i(W)=a_i-b_i\exp(-\alpha_i W)$, where $\hat{W}_i$, i=1, ..., K, are discrete wealth levels representing the borders of each piece i such that below each $\hat{W}_i$ the risk aversion is $\alpha_i$ and above $\hat{W}_i$ to $\hat{W}_{i+1}$ the risk aversion is $\alpha_{i+1}$ for all i=1, ..., K, the coefficients of the pieces i being identified by matching function values and first derivatives at intersections $\hat{W}_i$, where the first derivative with respect to wealth is $u_1'(W_i)=b_i\alpha_i\exp(-\alpha_i W_i)$ and at each wealth level $\hat{W}_i$ the risk aversions $\alpha_i$ and $\alpha_{i+1}$ are obtained as the solution to the following two equations:

$$a_i - b_i e^{-\alpha_i \hat{W}_i} = a_{i+1} - b_{i+1} e^{-\alpha_{i+1} \hat{W}_i}$$

$$b_i \alpha_i e^{-\alpha_i \hat{W}_i} + b_{i+1} \alpha_{i+1} e^{-\alpha_{i+1} \hat{W}_i}$$

from which the coefficients $a_{i+1}$ and $b_{i+1}$ are calculated as $$b_{i+1} = b_i \frac{\alpha_i}{\alpha_{i+1}} e^{(\alpha_{i+1}-\alpha_1)\hat{W}_i}$$

$$a_{i+1} = a_i - b_i \left(1 - \frac{\alpha_i}{\alpha_{i+1}}\right) e^{-\alpha_i \hat{W}_i},$$

where $a_1=0$ and $b_1=1$ and the piecewise exponential function spans a range of attainable wealth levels ranging between $\hat{W}_1$ to $\hat{W}_{1+1}$;

computing $a_{i+1}$ and $b_{i+1}$ for each i=1, ..., K starting from $a_1=0$ and $b_1=1$ and given the computed risk aversions $\alpha_i$ by one or more computers;

outputting risk aversion versus wealth by one or more computers to directly provide an accurate representation for an entire monetary range applicable to the investor; and determining asset allocation by one or more computers, using the given investor risk level by matching the given investor risk level to the outputted risk aversion to provide the corresponding outputted attainable wealth level.

2. The method of claim 1, further comprising the steps of:
setting the piecewise absolute risk aversions by one or more computers to fit the risk aversion of a given investor, whose relative risk aversion changes linearly with respect to wealth between wealth $\hat{W}_0$ and wealth $\hat{W}_K$, and is constant below $\hat{W}_0$ and above $\hat{W}_K$;

setting a relative risk aversion by one or more computers, increasing or decreasing from $\gamma_0$ at $\hat{W}_0$, to $\gamma_K$ at $\hat{W}_K$, for a constant rate of change $\Delta$ in relative risk aversion by setting $$\gamma_{i+1} = \gamma_i + \Delta,$$

where $$\Delta = \frac{(\gamma_K - \gamma_0)}{(\hat{W}_K - \hat{W}_0)}$$

and $$\alpha_i = \gamma_i / \hat{W}_i;$$

representing constant relative risk aversion below $\hat{W}_0$ and above $\hat{W}_K$ by one or more computers by appending to the piecewise exponential representation on each side a constant relative risk aversion (CRRA) piece represented by a power function $$u(W) = c\frac{W^{1-\gamma}-1}{1-\gamma} + d, \gamma > 0, \gamma \neq 1,$$

with its first derivative $u'(W)=cW^{-\gamma}$; and
calculating the parameters of the power function by one or more computers as $$c = b\alpha e^{-\alpha\hat{W}} \hat{W}^\gamma$$

$$d = a - be^{-\alpha\hat{W}} - c\frac{\hat{W}^{1-\gamma}-1}{1-\gamma},$$

where in the formula for obtaining $c_0$ and $d_0$ for the lower CRRA piece $\alpha=\alpha_1$ and $\hat{W}=\hat{W}_0$, $a=a_1$, $b=b_1$, and for obtaining $c_K$ and $d_K$ for the upper CRRA piece $\alpha=\alpha_K$ and $\hat{W}=\hat{W}_K$, $a=a_K$, $b=b_K$, where the formulas arise from setting at the intersections at $\hat{W}_0$ and $\hat{W}_K$ the function value and first derivative of the power piece equal to the function value and first derivative of the adjacent exponential piece, respectively, to produce a smooth, monotonically increasing and concave utility function that approximates arbitrarily closely, depending on the number of pieces used, the function of relative risk aversion representing the investor.

3. The method of claim 2, further comprising the steps of:
applying Monte Carlo sampling by one or more computers to estimate the expected utility of a single-period utility maximizing problem of each period according to the equation:

$$\hat{\hat{u}}_t(W_t) = \max\frac{1}{|S_t^i|}\sum_{\omega \in S_t^i} \hat{u}_{t+1}((W_t+s_t)R_t^\omega x_t)$$

$$e^T x_t = 1$$

$$Ax_t = b, l \leq x_t \leq u,$$

where $R_t^\omega$, $\omega \in S_t^i$ and $R_t^\omega$, $\omega \in S_t^0$, t=1, ..., T-1, T<∞, are independent samples of return distributions for each period t and in which the sample $S_t^i$ includes in-sample returns used for generating single-period utility maximization problems and the sample $S_t^0$ represents an out-of-sample return used for evaluating the obtained solution, so that two different samples are used, one for optimizing and the other for evaluating to prevent optimization bias, where $$\hat{u}_t(W_t) = \frac{1}{|S_t^0|}\sum_{\omega \in S_t^0}\hat{u}_{t+1}((W_t+s_t)R_t^\omega x_t),$$

where $\hat{u}_T(W_T)=U(W)$, $W_0$ given, and where $\hat{\hat{u}}(.)$ represents the in-sample estimate and $\hat{u}(.)$ represents the out-of-sample estimate of a utility-to-go function;

solving the dynamic optimization problem by one or more computers, using a backward dynamic programming recursion, conditioning on wealth, starting at period T-1 by segmenting $W_t$ into K discrete wealth levels, $W_{T-1}^k$, k=1, ..., K, K<∞, and solving the period T−1 problem K times using sample $S_{T-1}^i$ to obtain solutions $\hat{x}_{T-1}^k$;

evaluating the obtained solutions by one or more computers, by computing $$\hat{u}_{T-1}^k = \frac{1}{|S_{T-1}^0|} \sum_{\omega \in S_{T-1}^0} \hat{u}_T((W_{T-1}^k + s_{T-1})R_{T-1}^\omega x_{T-1})$$

and obtaining for each value $W_{T-1}^k$ a corresponding value of $\hat{u}_{T-1}^k$, which pairs represent K points of the Monte Carlo estimate of the value function ($U_{T-1}(W_{T-1})$); and interpolating between the values by one or more computers, using an interpolation technique, to obtain a smooth functional form.

4. The method of claim 3 wherein the value function $u_{T-1}(W_{T-1})$ in period T−1 is the induced utility function for the period T−2 single-period optimization, and the steps are repeated until all optimizations in period 1 are done, and where in period 0, the initial wealth is known and the final optimization is conducted using the period 1 value function as implied utility function $u_1(W_1)$.

5. The method of claim 4 wherein in each period in the backward recursion, a different independent sample of a plurality of samples is used for the evaluation, so that the sampling error is small and cancels out over the different rebalancing periods and the sampling-resampling procedure is a part of the solution algorithm to prevent the dynamic recursion from carrying forward and accumulating sampling bias when solving for a significant number of periods.

6. The method of claim 3 wherein there is serial dependency of asset returns, further comprising the steps of comparing a return $R_t|R_{t-1}$ to a previous period return by one or more computers according to the equation:

$$u_t(W_t, R_{t-1}) = \max E u_{t+1}((W_t + s_t)R_t|R_{t-1} x_t)$$

$$e^T x_t = 1$$

$$A x_t = b, \; l \leq x_t \leq u,$$

in which $$R_t = C + A R_{t-1} + \epsilon,$$

where C is an intercept vector and A is an n×n matrix of coefficients obtained from n least-squares regressions and where $$u_T(W_T) = u(W), W_{t+1} = (W_t + s_t) R_t|R_{t-1} x_t, W_0 \text{ and } R_{-1} \text{ given.}$$

7. The method of claim 3 wherein for multivariate normally distributed asset returns, the dynamic programming recursion is:

$$u_t(W_t) = \max E u_{t+1}((W_t + s_t)\eta_{k,t})$$

where $\eta_{k,t}$ is defined as the return distribution of the kth allocation point ($\mu_{k,t}, \sigma_{k,t}$) on the mean-variance efficient frontier in period t, such that $\eta_{k,t} = N(\mu_{k,t}, \sigma_{k,t})$, and where $u_T(W_T) = u(W)$, $W_{t+1,k} = (W_t + s_t)\eta_{k,t}$, $W_0$ given; and further comprising the step of:

searching a pre-computed set of mean-variance efficient solutions by one or more computers, for the one maximizing the utility or value-to-go function to speed up the optimization by avoiding having to evaluate all distributions $\eta_{k,t}$.

8. A non-transitory computer readable storage medium for dynamic asset allocation for optimization of a given portfolio of assets using a known initial wealth level as well as a given investor risk aversion with respect to wealth at the end of the investor's investment horizon, the non-transitory computer readable storage medium including instructions executed by a processor, the instructions comprising:

instructions to approximate the investor's risk aversion function with respect to wealth by computing absolute risk aversions $\alpha_i$ that represent a function of risk aversion versus wealth by determining coefficients of a piecewise exponential function with K pieces, where each piece represents a certain absolute risk aversion $\alpha_i$, where i=1, ..., K, K<∞, for a preselected number of discrete absolute risk aversions, using an exponential function $\hat{W}_i \leq W \leq \hat{W}_{i+1}$, $u_i(W_i) = a_i - b_i \exp(-\alpha_i W_i)$, where $\hat{W}_i$, i=1, ..., K, are discrete wealth levels representing the borders of each piece i such that below each $\hat{W}_i$ the risk aversion is $\alpha_i$ and above $\hat{W}_i$ to $\hat{W}_{i+1}$ the risk aversion is $\alpha_{i+1}$ for all i=1, ..., K, the coefficients of the pieces i being identified by matching function values and first derivatives at intersections $\hat{W}_i$, where the first derivative with respect to wealth is $u_i'(\hat{W}_i) = b_i \alpha_i \exp(-\alpha_i W_i)$ and at each wealth level $\hat{W}_i$ the risk aversions $\alpha_i$ and $\alpha_{i+1}$ are obtained as the solution to the following two equations:

$$a_i - b_i e^{-\alpha_i \hat{W}_i} = a_{i+1} - b_{i+1} e^{-\alpha_{i+1} \hat{W}_i}$$

$$b_i \alpha_i e^{-\alpha_i \hat{W}_i} = b_{i+1} \alpha_{i+1} e^{-\alpha_{i+1} \hat{W}_i}$$

from which the coefficients $a_{i+1}$ and $b_{i+1}$ are calculated as $$b_{i+1} = b_i \frac{\alpha_i}{\alpha_{i+1}} e^{(\alpha_{i+1} - \alpha_i)\hat{W}_i}$$

$$a_{i+1} = a_i - b_i \left(1 - \frac{\alpha_i}{\alpha_{i+1}}\right) e^{-\alpha_i \hat{W}_i},$$

where $a_1 = 0$ and $b_1 = 1$ and the piecewise exponential function spans a range of attainable wealth levels ranging between $\hat{W}_1$ to $\hat{W}_{1+1}$;

instructions to compute $a_{i+1}$ and $b_{1+1}$ for each i=1, ..., K starting from $a_1 = 0$ and $b_1 = 1$ and given the computed risk aversions $\alpha_i$;

instructions to output risk aversion versus wealth to directly provide an accurate representation for an entire monetary range applicable to the investor; and instructions to determine asset allocation using the given investor risk level by matching the given investor risk level to the outputted risk aversion to provide the corresponding outputted attainable wealth level.

9. The non-transitory computer readable storage medium of claim 8, further comprising:

instructions to set the piecewise absolute risk aversions to fit the risk aversion of a given investor, whose relative risk aversion changes linearly with respect to wealth between wealth $\hat{W}_0$ and wealth $\hat{W}_K$, and is constant below $\hat{W}_0$ and above $\hat{W}_K$;

instructions to set a relative risk aversion increasing or decreasing from $\gamma_0$ at $\hat{W}_0$, to $\gamma_K$ at $\hat{W}_K$, for a constant rate of change $\Delta$ in relative risk aversion by setting $$\gamma_{i+1} = \gamma_i + \Delta,$$

where $$\Delta = \frac{(\gamma_K - \gamma_0)}{(\hat{W}_K - \hat{W}_0)}$$

and $$\alpha_i = \gamma_i / \hat{W}_i;$$

instructions to represent constant relative risk aversion below $\hat{W}_0$ and above $\hat{W}_K$ by appending to the piecewise exponential representation on each side a constant relative risk aversion (CRRA) piece represented by a power function $$u(W) = c\frac{W^{1-\gamma} - 1}{1 - \gamma} + d, \gamma > 0, \gamma \neq 1,$$

with its first derivative $u'(W) = cW^{-\gamma}$; and
instructions to calculate the parameters of the power function as $$c = b\alpha e^{-\alpha \hat{W}} \hat{W}^{\gamma}$$

$$d = a - be^{-\alpha \hat{W}} - c\frac{\hat{W}^{1-\gamma} - 1}{1 - \gamma},$$

where in the formula for obtaining $c_0$ and $d_0$ for the lower CRRA piece $\alpha = \alpha_1$ and $\hat{W} = \hat{W}_0$, $a = a_1$, $b = b_1$, and for obtaining $c_K$ and $d_K$ for the upper CRRA piece $\alpha = \alpha_K$ and $\hat{W} = \hat{W}_K$, $a = a_K$, $b = b_K$, where the formulas arise from setting at the intersections at $\hat{W}_0$ and $\hat{W}_K$ the function value and first derivative of the power piece equal to the function value and first derivative of the adjacent exponential piece, respectively, to produce a smooth, monotonically increasing and concave utility function that approximates arbitrarily closely, depending on the number of pieces used, the function of relative risk aversion representing the investor.

10. The non-transitory computer readable storage medium of claim 9, further comprising:
instructions to apply Monte Carlo sampling to estimate the expected utility of a single-period utility maximizing problem of each period according to the equation:

$$\hat{\hat{u}}_t(W_t) = \max \frac{1}{|S_t^i|} \sum_{\omega \in S_t^i} \hat{u}_{t+1}((W_t + s_t) R_t^\omega x_t)$$

$$e^T x_t = 1$$

$$A x_t = b, l \leq x_t \leq u,$$

where $R_t^\omega$, $\omega \in S_t^i$, and $R_t^\omega$, $\omega \in S_t^0$, $t=1, \ldots, T-1$, $T<\infty$, are independent samples of return distributions for each period t and in which the sample $S_t^i$ includes in-sample returns used for generating single-period utility maximization problems and the sample $S_t^0$ represents an out-of-sample return used for evaluating the obtained solution, so that two different samples are used, one for optimizing and the other for evaluating to prevent optimization bias, where $$\hat{u}_t(W_t) = \frac{1}{|S_t^0|} \sum_{\omega \in S_t^0} \hat{u}_{t+1}((W_t + s_t) R_t^\omega x_t),$$

where $\hat{u}_T(W_T) = U(W)$, $W_0$ given, and where $\hat{\hat{u}}(.)$ represents the in-sample estimate and $\hat{u}(.)$ represents the out-of-sample estimate of a utility-to-go function;
instructions to solve the dynamic optimization problem using a backward dynamic programming recursion, conditioning on wealth, starting at period T-1 by segmenting $W_t$ into K discrete wealth levels, $W_{T-1}^k$, $k=1, \ldots, K$, $K<\infty$, and solving the period T-1 problem K times using sample $S_{T-1}^i$ to obtain solutions $\hat{x}_{T-1}^k$;
instructions to evaluate the obtained solutions by computing $$\hat{u}_{T-1}^k = \frac{1}{|S_{T-1}^0|} \sum_{\omega \in S_{T-1}^0} \hat{u}_T((W_{T-1}^k + s_{T-1}) R_{T-1}^\omega x_{T-1})$$

and obtaining for each value $W_{T-1}^k$ a corresponding value of $\hat{u}_{T-1}^k$, which pairs represent K points of the Monte Carlo estimate of the value function $(U_{T-1}(W_{T-1}))$; and
instructions to interpolate between the values, using an interpolation technique, to obtain a smooth functional form.

11. The system of claim 10 wherein the value function $u_{T-1}(W_{T-1})$ in period T-1 is the induced utility function for the period T-2 single-period optimization, and further comprising instructions to complete all optimizations in period 1, and where in period 0, the initial wealth is known and the final optimization is conducted using the period 1 value function as implied utility function $u_1(W_1)$.

12. The non-transitory computer readable storage medium of claim 11 wherein in each period in the backward recursion, a different independent sample of a plurality of samples is used for the evaluation, so that the sampling error is small and cancels out over the different rebalancing periods and the sampling-resampling procedure is a part of the solution algorithm to prevent the dynamic recursion from carrying forward and accumulating sampling bias when solving for a significant number of periods.

13. The non-transitory computer readable storage medium of claim 10 wherein there is serial dependency of asset returns, further comprising instructions to compare a return $R_t | R_{t-1}$ to a previous period return according to the equation:

$$u_t(W_t, R_{t-1}) = \max E u_{t+1}((W_t + s_t) R_t | R_{t-1} x_t)$$

$$e^T x_t = 1$$

$$A x_t = b, l \leq x_t \leq u,$$

in which $$R_t = C + AR_{t-1} + \epsilon,$$

where C is an intercept vector and A is an n×n matrix of coefficients obtained from n least-squares regressions and where $u_T(W_T) = u(W), W_{t+1} = (W_t + s_t) R_t | R_{t-1} x_t, W_0$ and $R_{-1}$ given.

14. The non-transitory computer readable storage medium of claim 10 wherein for multivariate normally distributed asset returns, the dynamic programming recursion is:

$$u_t(W_t) = \max E u_{t+1}((W_t + s_t) \eta_{k,t})$$

where $\eta_{k,t}$ is defined as the return distribution of the kth allocation point $(\mu_{k,t}, \sigma_{k,t})$ on the mean-variance efficient frontier in period t, such that $\eta_{k,t} = N(\mu_{k,t}, \sigma_{k,t})$, and where $u_T(W_T) = u(W)$, $W_{t+1,k} = (W_t + s_t) \eta_{k,t}$, $W_0$ given; and further comprising:
instructions to search a pre-computed set of mean-variance efficient solutions for the one maximizing the utility or value-to-go function to speed up the optimization by avoiding having to evaluate all distributions $\eta_{k,t}$.

* * * * *